(12) United States Patent
Joo et al.

(10) Patent No.: US 12,255,333 B2
(45) Date of Patent: *Mar. 18, 2025

(54) HIGH PERFORMANCE ELECTRODES, MATERIALS, AND PRECURSORS THEREOF

(71) Applicant: CORNELL UNIVERSITY, Ithaca, NY (US)

(72) Inventors: Yong Lak Joo, Ithaca, NY (US); Ling Fei, Ithaca, NY (US)

(73) Assignee: Cornell University, Ithaca, NY (US)

( * ) Notice: Subject to any disclaimer, the term of this patent is extended or adjusted under 35 U.S.C. 154(b) by 431 days.

This patent is subject to a terminal disclaimer.

(21) Appl. No.: 17/711,709

(22) Filed: Apr. 1, 2022

(65) Prior Publication Data

US 2022/0223867 A1 Jul. 14, 2022

Related U.S. Application Data

(63) Continuation of application No. 15/775,776, filed as application No. PCT/US2016/061412 on Nov. 10, 2016, now Pat. No. 11,302,920.

(Continued)

(51) Int. Cl.
| | |
|---|---|
| H01M 4/587 | (2010.01) |
| B05B 5/03 | (2006.01) |
| H01M 4/04 | (2006.01) |
| H01M 4/13 | (2010.01) |
| H01M 4/139 | (2010.01) |
| H01M 4/36 | (2006.01) |
| H01M 4/38 | (2006.01) |
| H01M 4/48 | (2010.01) |
| H01M 4/485 | (2010.01) |
| H01M 4/62 | (2006.01) |

(Continued)

(52) U.S. Cl.
CPC ............... *H01M 4/587* (2013.01); *B05B 5/03* (2013.01); *H01M 4/0419* (2013.01); *H01M 4/13* (2013.01); *H01M 4/139* (2013.01); *H01M 4/366* (2013.01); *H01M 4/386* (2013.01); *H01M 4/483* (2013.01); *H01M 4/485* (2013.01); *H01M 4/623* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 5,873,523 A | 2/1999 | Gomez et al. |
| 11,302,920 B2 * | 4/2022 | Joo ..................... H01M 4/0419 |

(Continued)

FOREIGN PATENT DOCUMENTS

WO 2014160045 A1 3/2014

OTHER PUBLICATIONS

Zhou, et al., "Spin-Coated Silicon Nanoparticle/Graphene Electrode as a Binder-Free Anode for High-Performance Lithium-Ion Batteries," Nano Res. 2012, 5(12), all enclosed pages cited.

*Primary Examiner* — Zhongqing Wei
(74) *Attorney, Agent, or Firm* — Hodgson Russ LLP

(57) ABSTRACT

Provided herein are high performance electrodes, electrode materials comprising a plurality of active electrode material-containing particles secured within one or more graphenic web, and precursors thereof. Also provided herein are processes of generating the same by an electrospray process.

19 Claims, 22 Drawing Sheets

Related U.S. Application Data

(60) Provisional application No. 62/354,366, filed on Jun. 24, 2016, provisional application No. 62/312,871, filed on Mar. 24, 2016, provisional application No. 62/254,392, filed on Nov. 12, 2015, provisional application No. 62/254,405, filed on Nov. 12, 2015, provisional application No. 62/254,418, filed on Nov. 12, 2015.

(51) Int. Cl.
  H01M 10/0525 (2010.01)
  H01M 4/02 (2006.01)

(56) References Cited

U.S. PATENT DOCUMENTS

| | | |
|---|---|---|
| 2003/0215717 A1 | 11/2003 | Miyaki |
| 2005/0029442 A1 | 2/2005 | Takats et al. |
| 2011/0008673 A1 | 1/2011 | Ugaji et al. |
| 2011/0143018 A1 | 6/2011 | Peng et al. |
| 2012/0064409 A1* | 3/2012 | Zhamu .................. H01M 4/133 252/502 |
| 2013/0344392 A1 | 12/2013 | Huang et al. |

\* cited by examiner

A

B

HIGH PERFORMANCE ELECTRODES, MATERIALS, AND PRECURSORS THEREOF

CROSS-REFERENCE

This patent application is a continuation of U.S. application Ser. No. 15/775,776, filed May 11, 2018, which is a U.S. National Phase entry of International Application No.: PCT/US2016/061412, filed Nov. 10, 2016; which claims the benefit of U.S. Provisional Patent Application No. 62/254,418, filed Nov. 12, 2015; and U.S. Provisional Patent Application No. 62/312,871, filed Mar. 24, 2016; and U.S. Provisional Patent Application No. 62/354,366, filed Jun. 24, 2016; each of which is incorporated herein by reference in their entirety.

FIELD OF THE INVENTION

The field relates to electrodes, particularly negative electrodes in lithium ion batteries, cells and batteries comprising the same, and the manufacturing thereof.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In lithium ion batteries, lithium ions generally move from the negative electrode to the positive electrode during discharge and vice versa when charging. In the as-fabricated and discharged state, lithium ion batteries often comprise a lithium compound (such as a lithium metal oxide) at the cathode (positive electrode) and another material, generally carbon, at the anode (negative electrode).

SUMMARY OF THE INVENTION

Provided in certain embodiments herein are systems and processes for manufacturing electrode materials and/or electrodes, including thin layer electrodes, such as battery electrodes and/or electrode materials (e.g., lithium ion battery negative electrode materials and/or electrodes) (e.g., the thin layer electrode comprising a carbon and silicon). In some instances, such materials and/or electrodes have excellent capacities, good capacity retention, high volumetric energy density (and high overall density), and/or other advantages that are discussed herein. Alternate approaches to achieving higher performance materials and electrodes have had extremely limited and incremental success, with some attempts resulting in catastrophic failure, and/or development of un-scalable, and non-commercializable products and processes. In some embodiments, provided herein are products and processes suitable for high throughput manufacturing and production, including roll-to-roll processing, of high performance materials and electrodes, such as described in more detail herein.

In certain embodiments, provided herein is a process for manufacturing an electrode material, the process comprising generating a plume or aerosol from a fluid stock, the fluid stock comprising a conductive (e.g., carbon) inclusion (e.g., a graphene inclusion component) and an active electrode material (e.g., SiOx) inclusion. In specific embodiments, the plume or aerosol is generated using a suitable technique, such as an electrospray technique. In some embodiments, the process further comprises generating the plume or aerosol in the presence of a high velocity gas. In specific instances, the high velocity gas facilitates the fine dispersion of the plume or aerosol particulates, which, in turn, facilitates the controlled and uniform deposition of the inclusion parts on a substrate surface. In some instances, the direction of the flow of the gas and the plume/aerosol are in the same general direction (e.g., having a directional mean within 15 degrees, 10 degrees, 5 degrees, or the like of each other). Also provided herein are the fluid compositions described herein, the aerosols and plumes described herein, and other systems, process steps, intermediates, and the like described herein.

In some embodiments, such systems and processes are configured to facilitate high throughput electrospraying using a single or a banked nozzle system. In specific embodiments, the systems and processes are configured for direct current voltage ($V_{DC}$) or alternating current voltage ($V_{AC}$) electrospraying, such as gas-controlled, direct current voltage or alternate current voltage ($V_{AC}$) electrospraying. In some embodiments, processes and systems provided herein are suitable for and/or configured to manufacture electrode precursor materials, electrode materials, uniform electrodes (e.g., on a current collector), such as having uniform thickness, capacity, component distribution, etc., or the like.

In some instances, ejecting of a charged fluid stock from an electrospray nozzle produces a fluid jet, which is disrupted to form a plume comprising a plurality of droplets (or plume particulates). In certain instances, such droplets are in varying states of dryness (e.g., wherein more dry droplets comprise less fluid medium relative to solid inclusion materials) as they move toward a collector, with the droplets near the collector being dryer (i.e., comprising less fluid medium) (or even completely dry) than those droplets near the nozzle. In some instances, the plume comprises (e.g., especially in closest proximity to the collector substrate surface) droplets wherein all fluid medium has been evaporated. In various embodiments, a plume (or portion thereof) provided herein, comprises about 80 wt. % or less fluid, about 60 wt. % or less of a fluid, about 40 wt. % or less of a fluid, about 20 wt. % or less of a fluid, about 10 wt. % or less of a fluid, or about 5 wt. % or less of a fluid. In preferred embodiments, plume droplets (particularly in proximity to the collector substrate surface) are disrupted and small enough to reduce or minimize the number of inclusions included within each droplet. In certain instances, reducing and/or minimizing the number of inclusions in each droplets facilitates good distribution of inclusions throughout the plume, particularly in proximity to the collector. In some instances, good distribution of inclusions within the plume facilitates good distribution of inclusions as collected on the collector substrate. In particular, silicon containing electrode materials suffer from poor performance characteristics, such as poor capacity retention on cycling, such as due to the formation of solid electrolyte interface (SEI) layers, pulverization, and the like. Controlled and uniform systems whereby silicon materials are protected from electrolyte and pulverization effects are desired (e.g., with carbon (e.g., graphene) components that envelope active electrode material (e.g., silicon and/or silicon oxide containing) particles, minimizing SEI formation and trapping active material particles, such as during cracking and/or breaking during lithiation/delithiation cycling). In certain embodiments, provided herein are compositions and processes suitable for providing such results.

Other spray techniques are generally insufficient to adequately disrupt and break apart the droplets of the plume and are insufficient to provide good distribution of the inclusion materials in the plume and on the collector substrate so as to provide dispersions with good uniformity, particularly in systems comprising multiple inclusion types, such as an active electrode material inclusion type and a carbon (e.g., graphene component (used interchangeably herein with "graphenic component")) inclusion type. Instead, typical spray techniques have been observed to produce particle agglomerations, including co-agglomerations with poor dispersion uniformity and control, without which active electrode/carbon systems, particularly comprising a silicon active electrode material, exhibit poor, insufficient, or non-existent performance characteristics.

In certain instances, processes herein comprise generating a plume or aerosol (e.g., electrospraying a fluid stock) with a high velocity gas (e.g., ≥0.1 m/s, ≥0.5 m/s, ≥1 m/s, ≥5 m/s, ≥10 m/s, ≥20 m/s, ≥25 m/s, ≥50 m/s, or other velocities provided herein). In some instances, an electrostatically charged fluid stock is injected into a stream of high velocity gas. In certain instances, the high velocity gas facilitates further disruption (e.g., breaking apart) of the droplets formed during electrospray of the fluid stock. In some embodiments, droplets of the plume comprise (e.g., on average) less than 100 inclusions (e.g., sum of active electrode material component inclusion(s) and graphene component inclusion(s) in the droplets), less than 50 inclusions, less than 20 inclusions, less than 10 inclusions or the like. In specific embodiments, the collector is a distance d away from the electrospray nozzle and the droplets of the plume within d/2, d/3, or d/4 away from the collector comprise (e.g., on average) about 100 inclusions or less, about 50 inclusions or less, about 20 inclusions or less, about 10 inclusions or less, about 5 inclusions or less, about 3 inclusions or less, or the like. In some instances, the good dispersion of the droplets and the low concentration of inclusions per droplets facilitates the formation of a well-dispersed and well-controlled multi-component system, such as described herein.

Provided in specific embodiments herein is a process for manufacturing an electrode material (e.g., silicon-carbon electrode material), an electrode (e.g., silicon-carbon electrode), or a precursor of an electrode material or electrode. In specific embodiments, the electrode material, electrode, or precursor thereof comprises an electrode active material (e.g., silicon, a silicon oxide, or a combination thereof), such as in the form of particles (e.g., nano- and/or micro-scale particles) comprising the same. In specific embodiments, the process comprises electrospraying a fluid stock, or by producing an electrostatically charged plume from a fluid stock (e.g., by electrospraying the fluid stock).

In specific embodiments, electrospraying of the fluid stock or producing an electrostatically charged plume of the fluid stock comprises (i) providing a fluid stock to a first inlet of a first conduit of an electrospray nozzle, the first conduit being enclosed along the length of the conduit by a wall having an interior surface and an exterior surface, the first conduit having a first outlet; and (ii) providing a voltage to the electrospray nozzle (e.g., thereby providing an electric field). In some embodiments, the fluid stock comprises a plurality (i.e., more than one) of active electrode material (e.g., silicon) containing particles, a plurality of carbon inclusions (e.g., (first) graphene components), and fluid medium (e.g., an aqueous medium, such as comprising water). In specific embodiments, the plurality of active electrode material (e.g., silicon) containing particles have at least one average dimension (e.g., overall average dimension or average smallest dimension) of less than 100 micron (μm) (e.g., about 0.5 micron to about 20 micron, such as about 1 micron to about 10 micron) (e.g., less than 50 micron, less than 20 micron, less than 10 micron, 0.2 micron to 10 micron, or less than 0.2 micron (200 nm)) (e.g., the smallest dimension). In some embodiments, the carbon inclusion of the fluid stock and/or the collected (first) composition are oxidized graphene components (e.g., graphene oxide). In certain embodiments, the carbon inclusions (e.g., (first) graphene components) comprise (e.g., on average) at least 50 wt. % carbon (e.g., about 60 wt. % to about 80 wt. % carbon). In further or alternative embodiments, the carbon inclusions (e.g., (first) graphene components) comprise (e.g., on average) about 5 wt. % to about 50 wt. % oxygen (e.g., about 10 wt. % to about 40 wt. % oxygen). In general, wt. % of carbon inclusions as used herein to the weight percentage of an element (e.g., carbon, oxygen, hydrogen, or the like) in the carbon inclusion on an elemental basis.

In certain embodiments, processes and systems described herein are suitable for high throughput of heavily loaded fluid stocks. In addition, in some embodiments, high concentrations of carbon (e.g., graphene) component are preferred in order to facilitate good coverage of the active electrode material, good uniformity of films (e.g., thickness, dispersion, etc.), and/or the like. In certain embodiments, the fluid stock provided herein comprises at least 0.1 wt. % graphene component, at least 0.5 wt. % graphene component, or at least 1 wt. % graphene component, e.g., at least 2 wt. % graphene component, at least 2.5 wt. % graphene component, at least 3 wt. % graphene component, at least 5 wt. % graphene component, or the like (e.g., about 10 wt. % to about 20 wt. %, up to 20 wt. %, up to 15 wt. %, up to 10 wt. %, or the like). In certain preferred embodiments, the fluid stock comprises about 2 wt. % to about 15 wt. % (e.g., about 10 wt. % to about 15 wt. %) graphene component.

In specific embodiments, the fluid stock comprises less than 30 wt. % active electrode material (e.g., silicon) containing particles. In more specific embodiments, the fluid stock comprises less than 20 wt. % active electrode material (e.g., silicon) containing particles. In still more specific embodiments, the fluid stock comprises about 0.2 wt. % to about 10 wt. % active electrode material (e.g., silicon) containing particles. In some instances, such as wherein electrospray processes occur with a gas stream, higher loading of particles and/or carbon inclusions are possible. In certain embodiments, fluid stock comprises about 1 wt. % or more (e.g., about 2.0 wt. % or more) active electrode material (e.g., silicon) containing particles. In specific embodiments, fluid stock comprises about 5 wt. % or more active electrode material (e.g., silicon) containing particles. In more specific embodiments, fluid stock comprises about 5 wt. % to about 20 wt. % active electrode material (e.g., silicon) containing particles. In further or alternative embodiments, the weight ratio of active electrode material (e.g., silicon) containing particles to carbon inclusion (e.g., graphene components) in the fluid stock or other composition herein (e.g., collected and/or thermally treated compositions) is at least 1:10, e.g., at least 1:5, at least 1:3, or at least 1:2 (e.g., up to 10:1). In specific embodiments, the weight ratio of active electrode material (e.g., silicon) containing particles to carbon inclusion (e.g., graphene components) is about 1:10 to about 10:1, about 1:3 to about 5:1, about 1:2 to about 3:1, about 2:3 to about 2:1, or the like (e.g., in the fluid stock, and/or in a composition herein). In more specific embodiments, the ratio is at least 2:3, at least 1:1, or the like. In certain embodiments, at least 50 wt. % of the solid particulates included in the fluid stock comprise active electrode material particulate inclusions and graphenic inclusions (graphene component). In specific embodiments, at least 70 wt. %, at least 80 wt. %, at least 90 wt %, or the like of the solid particulates included in the fluid stock comprise active electrode material particulate inclusions and graphenic inclusions. In preferred embodiments, at least 95 wt. % of the solid particulates included in the fluid stock comprise active electrode material particulate inclusions and graphenic inclusions (graphene component).

In certain embodiment, processes provided herein further comprise collecting a composition (e.g., a deposition or film (e.g., a film being a layer of material, such as prepared by a deposition technique described herein) resulting from the electrospraying of a fluid stock as described herein) on a substrate (e.g., metal foil). In specific embodiments, the composition or deposition (e.g., a precursor for an electrode or electrode material described herein) comprises a plurality of active electrode material (e.g., silicon) containing particles and a plurality of carbon inclusions (e.g., (first) graphene components), such as described in the fluid stock herein. In certain embodiments, the fluid of the fluid stock is partially or completely removed (e.g., by evaporation during the electrospray process). In certain embodiments, the composition or deposition comprises a plurality of the active electrode containing inclusions (e.g., SiOx particles, such as microparticles described herein) secured within a carbonaceous web, such as a graphenic web comprising a plurality of graphenic inclusion components.

Any suitable substrate is optionally utilized. In some instances, the substrate is a grounded substrate or positioned between a plume generating nozzle and a grounded surface. In certain embodiments, the substrate has a surface that is positioned in opposing relation to a plume generating nozzle outlet (e.g., there is "line of sight" between the nozzle outlet and the substrate surface). In specific embodiments, the opposing substrate is directly opposing the nozzle (e.g., configured orthogonal to nozzle conduit configuration, such as illustrated in FIG. 2). In other specific embodiments, the opposing substrate is angled or offset from directly opposing the nozzle. In some embodiments, the substrate is affixed to or is a part of a conveyor system. In specific embodiments, the substrate is attached to a conveyor belt or is a part of a conveyor belt. In some instances, the substrate is a metal (e.g., a foil, such as of copper, aluminum, or the like) or other current collector type material (e.g., wherein a process herein is utilized to manufacture an anode material directly on a current collector), or on a substrate from which the electrode material is readily removed (e.g., wherein a process herein is utilized to manufacture anode powder materials).

In some embodiments, processes provided herein further comprise chemically and/or thermally treating the collected composition (e.g., such as to at least partially de-oxygenate the highly oxygenated first graphene component (e.g., graphene oxide)). In certain embodiments, a process described herein comprises thermally treating (e.g., to at least 100° C.) the collected composition to provide a second (e.g., thermally treated) composition. In specific embodiments, the second composition comprises a plurality of active electrode material (e.g., silicon) containing particles and a plurality of carbon inclusions (e.g., (second) graphene components), wherein the carbon inclusions of the second (thermally treated) composition comprise a greater weight percentage of carbon and a lower weight percentage of oxygen than do the carbon inclusions of the fluid stock. In certain embodiments, the carbon inclusions of the treated (second) composition are oxidized graphene components that have been reduced. In specific embodiments, the carbon inclusions (e.g., (second) graphene components) of the (e.g., thermally) treated composition comprise about 90 wt. % or more carbon and about 0.1 wt. % to about 10 wt. % oxygen. In certain embodiments, chemical and/or thermal treatment is optionally performed while the collected composition is on the substrate, or after removal of the collected composition from the substrate.

In certain embodiments, an electrospray process described herein is a gas assisted or gas controlled electrospray process. In some embodiments, a fluid stock provided herein is electrosprayed with a gas stream. In specific embodiments, a fluid stock described herein is injected into a gas stream during electrospraying. In some embodiments, a process of producing of an electrostatically charged plume from a fluid stock further comprises providing a pressurized gas to a second inlet of a second conduit of a nozzle described herein. In specific embodiments, the second conduit has a second inlet and a second outlet, and at least a portion of the first conduit being positioned inside the second conduit (i.e., at least a portion of the second conduit being positioned in surrounding relation to the first conduit). In certain embodiments, the gap between the outer wall of the inner conduit and the inner wall of the outer conduit is small enough to facilitate a high velocity gas at the nozzle, such as to facilitate sufficient disruption of the charged fluid (jet) ejected from the nozzle (e.g., such as to provide plume or aerosol dispersions described herein). In some embodiments, the conduit gap is about 0.01 mm to about 30 mm, such as about 0.05 mm to about 20 mm, about 0.1 mm to about 10 mm, or the like. In certain embodiments, the gas stream (e.g., at the second outlet) has a high velocity, such as a velocity of at least 1 m/s, e.g., at least 5 m/s, at least 10 m/s, at least 20 m/s, or more.

In some instances, a process provided herein comprises compressing of a collected and/or thermally treated composition described herein. In certain embodiments, the collected and/or thermally treated composition is compressed such as to provide a compressed composition having a density of about 0.5 g per cubic centimeter (g/cc) or greater, such as about 0.5 g/cc to about 2 g/cc (e.g., 0.7 g/cc to 2 g/cc). In various embodiments, the collected, thermally treated, and/or compressed compositions have a thickness of about 1 mm or less, or about 200 micron or less (e.g., on the substrate).

In some embodiments, a collected (first) composition comprises a plurality of active electrode material containing (e.g., silicon-containing) particles and a plurality of carbon inclusions (e.g., (first and/or oxidized) graphene components). In certain embodiments, a composition (e.g., pre- and/or post-thermally treated composition) provided herein comprises active electrode material containing particles secured within a carbonaceous web (e.g., graphenic web). In some embodiments, the web defines one or more pockets (e.g., graphenic pockets) within which one or more of the active electrode material containing particles are configured. In specific embodiments, the collected (first) composition comprises a plurality of graphene envelopes, the graphene envelopes comprising an external surface and an internal surface, the internal surface defining a graphene pocket. In more specific embodiments, one or more of the active electrode material containing (e.g., silicon-containing) particles are configured within the graphene pocket. In certain embodiments, the graphene envelopes comprise one or more of the carbon inclusions of the collected (first) composition (e.g., oxidized graphene component(s)). In specific embodiments, a graphene pocket(s) comprise at least 1 active electrode containing particle configured therewithin (e.g., on average). In more specific embodiments, a graphene pocket comprises, on average, greater than 1 (e.g., at least 1.05) active electrode containing particles configured therewithin. In some embodiments, a graphene pocket(s) comprise 1 to 200 or 1 to 100 active electrode material containing (e.g., silicon-containing) particles configured therewithin (e.g., $1<n\leq 100$, $1.01\leq n\leq 200$, $1.05\leq n\leq 100$, or the like wherein n is the number of active electrode containing particles configured within the envelope) (e.g., on average). In more specific embodiments, the graphene pocket(s) comprise 1-50 (e.g., 1-5, or 2-5) (e.g., $1<n\leq 50$, $1<n\leq 5$, $2\leq n\leq 5$) active electrode material containing (e.g., silicon-containing) particles configured therewithin (e.g., on average).

In some embodiments, a (e.g., thermally) treated (second) composition (e.g., film) comprises a plurality of active electrode material containing (e.g., silicon-containing) particles and a plurality of carbon inclusions (e.g., oxidized graphene components that have been (e.g., thermally) reduced). In certain embodiments, a composition (e.g., pre- and/or post-thermally treated composition) provided herein comprises active electrode material containing particles secured within a carbonaceous web (e.g., graphenic web). In some embodiments, the web defines one or more pockets (e.g., graphenic pockets) within which one or more of the active electrode material containing particles are configured. In specific embodiments, the (e.g., thermally) treated (second) composition comprises a plurality of graphene envelopes, the graphene envelopes comprising an external surface and an internal surface, the internal surface defining a graphene pocket. In more specific embodiments, one or more of the active electrode material containing (e.g., silicon-containing) particles are configured within the graphene pocket. In certain embodiments, the graphene envelopes or pocket walls comprise one or more of the carbon inclusions of the treated (second) composition (e.g., oxidized graphene component(s) that have been (e.g., thermally) reduced). In specific embodiments, a graphene pocket(s) comprise 1-100 active electrode material containing (e.g., silicon-containing) particles configured therewithin (e.g., on average). In more specific embodiments, the graphene pocket(s) comprise 1-50 (e.g., 1-5, or 2-5) active electrode material containing (e.g., silicon-containing) particles configured therewithin (e.g., on average).

In certain embodiments, the active electrode material containing (e.g., silicon-containing) particles have an average aspect ratio of 1 to about 100, such as 1 to about 10. In further or alternative embodiments, active electrode material containing (e.g., silicon-containing) particles have an average dimension (or an average smallest dimension) of about 10 microns or less, e.g., about 200 nm to about 10 micron, or about 1 micron to about 5 micron.

In some embodiments, carbon inclusions (e.g., two-dimensional carbon inclusions, such as graphene components) provided herein have at least one average dimension (e.g., lateral dimension (longest side length), width and/or length) (that is, the measure of the dimension, on average, within the carbon inclusions of the processes or compositions provided herein) that is at least equal to the average dimension (or the average smallest dimension—particularly in instances where higher aspect ratio (e.g., >2, >5, >10, or the like) active electrode material containing particles are utilized) of the active electrode material containing (e.g., silicon-containing) particles. In specific embodiments, carbon inclusions provided herein have at least one average dimension that is >1× (e.g., >1.1×, >1.2×, >1.5×, >2×, >3×, >4×, or the like) the average dimension (or the average of the smallest dimension) of the active electrode material containing particles. In certain embodiments, carbon inclusions (e.g., graphene components) provided herein have at least one average dimension (e.g., width and/or length) that is at least five times (e.g., about 10 times, or about 100 times) the average dimension (or the average smallest dimension) of the active electrode material containing (e.g., silicon-containing) particles. In certain embodiments, the carbon inclusions (e.g., graphene components) have an average thickness of about 100 nm (nanometer) or less, such as about 50 nm or less, about 20 nm or less, about 10 nm or less, or the like. In specific embodiments, the thickness of the carbon inclusion is about 1 nm or about 1 nm to about 10 nm, or about 3-5 nm. In certain embodiments, a carbon inclusion or graphene components described herein comprises one or more layers (e.g., graphene component layers) thereof (e.g., each graphene layer comprising a graphene, graphene oxide, reduced graphene oxide, or the like). In specific embodiments, a graphene component provided herein comprises an average of about 1 to about 25 layers thereof. Similarly, in some embodiments, graphene envelopes described herein comprising such carbon inclusions or graphene components comprise such thicknesses and/or number of layers therein. In some embodiments, the carbon inclusion (e.g., two dimensional carbon inclusions, such as graphene components) has an average dimension (e.g., lateral dimension, width and/or length) of about 0.5 micron or more, about 1 micron or more, about 5 micron or more, about 1 micron to about 100 micron, about 5 micron to about 50 micron, or the like.

In some embodiments, provided herein is a process for manufacturing an electrode (or electrode material), the electrode comprising (a) an inclusion (e.g., micro- and/or nano-structured) comprising an active material (e.g., electrode active material, such as silicon) and (b) a carbon component (e.g., referred to interchangeably herein as a carbon inclusion). In specific embodiments, the process comprises producing an electrostatically charged plume comprising a plurality of (e.g., micro- and/or nano-scale) particles and/or droplets from a fluid stock. In more specific embodiments, such a plume is prepared by providing a fluid stock to a first inlet of a first conduit of an electrospray nozzle (e.g., and applying a voltage to the electrospray nozzle). In specific embodiments, the process comprises applying a voltage to the nozzle (e.g., wall of the first conduit). In more specific embodiments, the voltage provides an electric field (e.g., at the first outlet, such as to expel the fluid stock as a jet and/or plume from the nozzle, e.g., first outlet thereof). In some embodiments, the first conduit is enclosed along the length of the conduit by a wall having an interior surface and an exterior surface, the first conduit having a first outlet. In some embodiments, the fluid stock comprising a nanostructured inclusion comprising an active material (e.g., an electrode active material) and a liquid medium (e.g., water). In more specific embodiments, the fluid stock further comprises a carbon inclusion (e.g., which is the same or different than the carbon component of the electrode and/or electrode material). In some embodiments, the process further comprises collecting a deposition (e.g., film) on a substrate (e.g., a conducting substrate, such as a current collector described herein). In certain embodiments, the deposition comprises (a) a nanostructured inclusion comprising an active material and (b) a carbon component (e.g., a carbon web, such as securing (e.g., wrapping, trapping, and/or enveloping) the inclusion materials (e.g., nanostructured inclusion materials) comprising the active material therein).

In some embodiments, provided herein is an electrode and/or electrode material (e.g., prepared or preparable by a process described herein) comprising inclusions (e.g., comprising active electrode material) coated (or wrapped) with carbon inclusions. In other words, in some embodiments, provided herein is an electrode, electrode material, or precursors thereof comprising nanostructured inclusions (e.g., comprising active electrode material) secured within a carbon web (e.g., the carbon web comprising carbon inclusions, such as those described herein, e.g., graphene and/or analogs thereof).

In certain embodiments, a composition (e.g., pre- and/or post-thermally treated composition) provided herein comprises active electrode material containing particles secured within a carbonaceous web (e.g., graphenic web). In some embodiments, the web defines one or more pockets (e.g., graphenic pockets) within which one or more of the active electrode material containing particles are configured. In some embodiments, a graphenic web is a collection of a plurality of graphenic component sheets (e.g., graphene sheets, graphene oxide sheets, reduced graphene oxide sheets, or combinations thereof) that collectively form a layer having a surface area larger than the surface area of a single sheet. In some instances, the graphenic components overlap, adjoin, abut, or otherwise interact or interface with one another (e.g., through non-covalent forces). In certain embodiments, the carbonaceous (e.g., graphenic) film comprises a continuous web defining a large number of carbonaceous pockets therein. In some embodiments, the continuous web extends throughout the composition, providing a continuous, self-supporting film. In other embodiments, a carbonaceous web forms a coating or wrap around one or more active electrode material containing particles in a single graphenic pocket, such as without having interconnectivity with a second graphenic pocket structure. FIG. 5 and FIG. 19 illustrates graphenic webs having a high degree of interconnectivity between graphenic pockets, whereas FIG. 20 illustrates more isolated graphenic webs that do not have a lot of interconnectivity between graphenic pockets.

As illustrated in the figures (e.g., FIG. 5, FIG. 19, etc.) provided herein good coverage of active electrode materials are provided with a graphenic web. In some embodiments, a film or composition provided herein has an externally exposed surface (e.g., including the top surface and other exposed surfaces of the materials exemplified in the figures herein), the externally exposed surface being comprised primarily of carbonaceous material. In specific instances, the electrode active material (e.g., SiOx) has very little external exposure in the film or composition. In some instances, this is important to maximizing electrode performance characteristics, such as by minimizing pulverization and/or SEI formation. In some embodiments, compositions, films, or (coated) particles provided herein comprise less than 20% electrode active material or SiOx by surface area. In preferred embodiments, compositions, films, or (coated) particles provided herein comprise less than 10% electrode active material or SiOx by surface area. In more preferred embodiments, compositions, films, or (coated) particles provided herein comprise less than 5% electrode active material or SiOx by surface area. In some embodiments, compositions, films, or (coated) particles provided herein is at least 80% graphenic (e.g., characterized by a graphene component described herein) by surface area. In preferred embodiments, compositions, films, or (coated) particles provided herein is at least 90% graphenic by surface area. In more preferred embodiments, compositions, films, or (coated) particles provided herein is at least 95% graphenic by surface area.

Also provided herein are such compositions as described in the processes herein. Such compositions are prepared by any suitable process, such as described herein. In specific embodiments, provided herein are anode materials, anodes, and precursors thereof.

In certain embodiments, provided herein are compositions comprising a plurality of active electrode material (e.g., silicon) containing particles and a plurality of carbon inclusions (e.g., reduced oxidized graphene components, such as for anodes and anode materials, or oxide graphene components, such as for precursors of anodes and anode materials).

Provided in specific embodiments herein is a composition comprising a plurality of active electrode material (e.g., silicon) containing particles and a plurality of carbon inclusions (e.g., graphene components, oxidized graphene components, oxidized graphene components that have been reduced, or the like). In specific embodiments, the carbon inclusions are oxidized graphene components. In other specific embodiments, the carbon inclusions are graphene components (e.g., oxidized graphene components that have been reduced). In some embodiments, the compositions comprise a plurality of silicon-carbon composite domains. In specific embodiments, silicon-carbon composite domains comprise an (e.g., graphene) envelope, the envelope comprising an external surface and an internal surface, the internal surface defining an envelope pocket. In some embodiments, one or more of the plurality of active electrode material (e.g., silicon) containing particles are configured within the envelope pocket. In some embodiments, the envelope comprises one or more of the plurality of carbon inclusions (e.g., graphene components, oxidized graphene components, or the like). In some embodiments, provided herein is composition comprising graphene oxide and a plurality of silicon-containing particles, the graphene oxide configured to form a plurality of graphene oxide envelopes, the plurality of silicon-containing particles being configured within the plurality of graphene oxide envelopes. In some embodiments, provided herein is composition comprising reduced graphene oxide and a plurality of silicon-containing particles, the reduced graphene oxide configured to form a plurality of reduced graphene oxide envelopes, the plurality of silicon-containing particles being configured within the plurality of reduced graphene oxide envelopes. Also provided herein are such envelopes (e.g., graphene envelopes) comprising a plurality of particles (e.g., comprising electrode active material, such as silicon) therein.

In specific embodiments, the carbon inclusions are oxidized graphene components. In more specific embodiments, the oxidized graphene components are graphene oxide (e.g., comprising about 1 to about 25 layers of graphene oxide per inclusion particle). In certain embodiments, the oxidized graphene components comprise at least 10 wt. % oxygen (e.g., about 10 wt. % to about 50 wt. % oxygen). In certain embodiments, the oxidized graphene components comprise about 40 wt. % or more carbon, e.g., about 50 wt. % or more carbon (e.g., about 60 wt. % to about 90 wt. % carbon). In certain embodiments, the oxidized graphene components or graphene components (e.g., reduced graphene oxide) comprise about 10 wt. % oxygen or less, such as about 0.1 wt. % oxygen to about 10 wt. % oxygen.

In some embodiments, active electrode material containing particles used in compositions and processes herein comprise silicon and/or a silicon oxide (SiOx, wherein $0<x\leq2$). In specific embodiments, the silicon-containing particles comprise a sub-stoichiometric silicon oxide (i.e., SiOx, wherein $0<x<2$). In some embodiments, particles described herein as comprising SiOx may comprise both Si and silicon oxide, SiOa (0<a≤2), for an overall x value of 0<x<2, preferably 0<x≤0.5. Disclosures herein to inclusions comprising SiOx include reference to the overall x value of an inclusion (e.g., the inclusions may comprise both elemental silicon (Si) and substoichiometric and/or fully oxidized silicon oxide), unless noted otherwise. In specific embodiments, silicon-containing particles comprise (e.g., on average) about 50 wt % or more silicon (e.g., elemental silicon (Si)). In some embodiments, such particles also comprise SiOx (e.g., wherein 0<x≤2). In specific embodiments such particles comprise both Si and SiOx (e.g., with SiOx being present on the surface of the particles). In certain embodiments, silicon-containing particles comprise (e.g., on average) about 0.1 wt % to about 25 wt % (e.g., about 1 wt. % to about 10 wt. %) SiOx. In certain embodiments, the particles have an average dimension (e.g., overall average dimension) of about 10 nm or more, e.g., about 200 nm or more. In specific embodiments the average dimension is about 200 nm (0.2 micron) to about 20 micron, e.g., about 1 to about 10 micron, about 0.5 micron to about 5 micron, or about 1 micron to about 5 micron. In certain embodiments, the particles have one or more dimension (e.g., length, width, diameter, length, smallest dimension, or the like) having an average size of about 10 nm or more, e.g., about 200 nm or more. In specific embodiments the average dimension is about 200 nm (0.2 micron) to about 20 micron, e.g., about 1 to about 10 micron, about 0.5 micron to about 5 micron, or about 1 micron to about 5 micron. In some embodiments, particles have an average aspect ratio of 1 or more, such as 1 to about 100, 1 to about 10, or the like.

In certain embodiments, carbon inclusions (e.g., graphene components or oxidized graphene components) have a (e.g., average) size (e.g., length, width, or length and width) at least equal to the (e.g., average) size of the smallest dimension (e.g., height, width, length, thickness, or the like) of the particles (e.g., comprising active electrode material (e.g., silicon)). In specific embodiments, the (e.g., average) size of the carbon inclusion(s) (e.g., graphene component(s) or oxidized graphene component(s)) is about 2 to about 20 times greater than the average size of the smallest dimension of the particle(s).

In various embodiments, compositions (e.g., films), webs, envelopes, or the like (e.g., of compositions provided herein) comprise carbon inclusions (e.g., graphene component or oxidized graphene component) and particles (e.g., electrode active material, such as silicon) in a particle to carbon inclusion weight ratio of at least 1:5, e.g., at least 1:3, or at least 1:2. In specific embodiments, the carbon inclusion is an oxidized graphene component and the weight ratio of particles (e.g., comprising silicon) to oxidized graphene component (e.g., graphene oxide) is about 1:5 to about 5:1, e.g., about 1:1 to about 5:1, or about 1:1 to about 3:1. In specific embodiments, ratio of particles (e.g., comprising silicon) to oxidized graphene component (e.g., graphene oxide) is about 3:2 to about 5:1. In certain embodiments, compositions provided herein comprise 20 wt. % or more, about 30 wt. % or more, about 40 wt. % or more, about 50 wt. % or more, or the like of active electrode materials. In certain instances, pre-thermally treated compositions will have lower wt. % that post-thermally treated compositions (e.g., because upon thermal treatment, the carbonaceous inclusion, such as graphene oxide, is reduced, losing oxygen and molecular weight and mass). In certain embodiments, up to about 80 wt %, up to about 85 wt. %, up to about 90 wt. %, up to about 95 wt. % or the like of active material is optionally included. In specific embodiments, pre-thermally treated compositions comprise about 30 wt. % to about 80 wt. % active electrode material (e.g., SiOx). In further or alternative embodiments, post-thermally treated compositions comprise about 50 wt. % to about 95 wt. % electrode active material (e.g., SiOx). In certain embodiments, compositions provided herein comprise 5 wt. % or more, about 10 wt. % or more, about 30 wt. % or more, or the like of carbon inclusion materials (e.g., graphenic component). In some embodiments, up to about 80 wt %, up to about 70 wt. %, up to about 50 wt. %, up to about 30 wt. % or the like of carbon inclusion materials (e.g., graphenic component) is optionally included. In specific embodiments, pre-thermally treated compositions comprise about 20 wt. % to about 80 wt. % carbon inclusion materials (e.g., graphenic component). In further or alternative embodiments, post-thermally treated compositions comprise about 10 wt. % to about 50 wt. % carbon inclusion materials (e.g., graphenic component).

In certain embodiments, envelopes (e.g., graphene envelopes) comprise (e.g., on average) about 1 to about 10 particles (e.g., comprising silicon and/or other active electrode material). In specific embodiments, envelopes (e.g., graphene envelopes) comprise (e.g., on average) about 2 to about 5 particles (e.g., comprising silicon and/or other active electrode material).

In addition, provided herein are the various compositions prepared by, preparable by, or otherwise described in the processes herein. In some instances, provided herein are films, plumes or aerosols, fluid stocks, coated particles and the like described herein. In particular, provided in certain embodiments herein are films described as depositions herein and/or coated particles described in such films. In some embodiments, depositions or films described herein are optionally removed from the substrate in order to form a powder, such as a free flowing powder, comprising active electrode material particles coated with a carbonaceous web (e.g., graphenic web), such as described herein. In some embodiments, such as wherein the carbonaceous web has high interconnectivity between the pockets defined thereby, composition removed from the substrate is further processed, e.g., to reduce particle size within the powder (e.g., by breaking up the carbonaceous web interconnecting various pockets defined within the web) and/or improve the flow characteristics thereof, such as by milling, or otherwise grinding or crushing a material described herein.

In certain embodiments, an anode powder material provided herein (e.g., as prepared by removing a film manufactured according to a process herein from a substrate on which it was deposited) is processed to form an electrode (e.g., a lithium ion battery negative electrode (anode)). In specific embodiments, the powder is combined with a binder and prepared into an electrode (e.g., on a conducting substrate (e.g., current collector)). Any suitable binder is optionally utilized, such as polyvinylidene fluoride (PVDF), styrene butadiene rubber (SBR), ethylene propylene diene monomer (EPDM) rubber, acrylonitrile-butadiene rubber (NBR), or the like. In further or alternative embodiments, the anode material is combined with another active electrode material, such as graphite. In some embodiments, the electrode comprises at least 5 wt. % (e.g., at least 5 wt. %, at least 10 wt. %, at least 15 wt. %, at least 20 wt. %, at least 30 wt. %, at least 50 wt. %, or the like) of the anode material provided herein. Any suitable amount of binder and/or other active material (e.g., graphite) is optionally combined with the active material provided herein (e.g., with the powder thereof). In specific embodiments, binder is present in the electrode in an amount of about 0.1 wt. % to about 10 wt. %. In some embodiments, another active electrode material (e.g., graphite) is present in the electrode in an amount of about 1 wt. % to about 99 wt. % (e.g., about 5 wt. % to about 95 wt. %, about 10 wt. % to about 90 wt. %, or the like).

In specific embodiments, provided herein is a composite particle (e.g., silicon-carbon composite particle) comprising an active electrode material containing particle (e.g., silicon-containing particle) and a carbonaceous web (e.g., graphenic web). In certain embodiments, the web comprises a graphenic component, such as described herein (e.g., comprising at least 50 wt. % carbon and about 0.1 wt. % to about 50 wt. % oxygen). As with the films described herein, in some embodiments, the web defines one or more pocket (the pocket(s) being configured within the web). In preferred embodiments, the web covers the active electrode containing particle well, such as wherein less than 10% (e.g., less than 5%, less than 3%, or the like) of the external surface of the composite particle is characterized by the material of the active electrode material containing particle (e.g., SiOx). In further or alternative preferred embodiments, at least 80% (e.g., at least 90%, at least 95%, at least 97%, or the like) of the external surface of the composite particle comprises graphenic web. In further or alternative embodiments, the particle comprises a large amount of active material in order to maximize or otherwise improve electrode performance characteristics (e.g., capacity). In some embodiments, the composite particle comprises at least 30 wt. % active electrode material (or at least 30 wt. % the particle comprising the same) (e.g., at least 50 wt. %, at least 70 wt. % or the like, such as up to about 95 wt. %). In certain embodiments, small amounts of carbonaceous web component (e.g., graphenic web) can be utilized to coat and protect the active electrode material (e.g., SiOx) and provide good conductivity for a composition comprising the composite particle(s). In some embodiments, the composite particle comprises about 70 wt. % or less carbonaceous (e.g., graphenic) web (e.g., about 50 wt. % or less, about 40 wt. % or less, about 25 wt. % or less, or the like, such as down to about 10 wt. %). In some embodiments, a composite particle described herein comprises exactly one pocket configured therewithin. In other embodiments, a composite particle optionally comprises greater than one pocket configured therewithin (e.g., wherein the carbonaceous web defines and connects multiple pockets). In certain embodiments, the structural characteristics, such as diameter, length, aspect ratio, and the like of the composite particle closely matches the characteristics of the wrapped active particles, particularly when the composite particle comprises a single active particle and a single pocket. As such, in some embodiments, the features of a composite particle is optionally as described herein for the active particle. For example, in some embodiments, a composite particle provided herein has an aspect ratio of 1 to about 100 (e.g., depending on the aspect ratio of the active particle(s) configured within a carbonaceous web thereof). In some embodiments, larger composite particles are also contemplated, such as wherein multiple pockets and/or active particles are present in the composite particle. Other characteristics of the particles and component parts thereof are as described herein for the film and/or depositions provided herein, and vice versa.

In some embodiments, pockets described herein have a volume that is greater than the volume of the particle(s) configured therewithin. In certain instances, pocket volume excess is desirable, particularly when the active electrode material expands during lithiation, such as Si and/or SiOx. In some instances, during expansion, the excess volume allows the particles to expand while reducing the opportunity for the web coating to become displace and/or while reducing the overall volume expansion of the electrode material. In certain embodiments, the void space within the pocket is at least 3% greater (e.g., at least 5% greater, at least 10% greater, at least 20% greater, or the like) than the volume of the active electrode containing particle(s) configured therewithin.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, unless otherwise stated, values and characteristics described for individual components herein also include disclosure of such values and characteristics as an average of a plurality (i.e., more than one) of such components. Similarly, disclosure of average values and characteristics herein also includes a disclosure of an individual value and characteristic as applied to a single component herein.

DETAILED DESCRIPTION OF THE INVENTION

Figure 1:
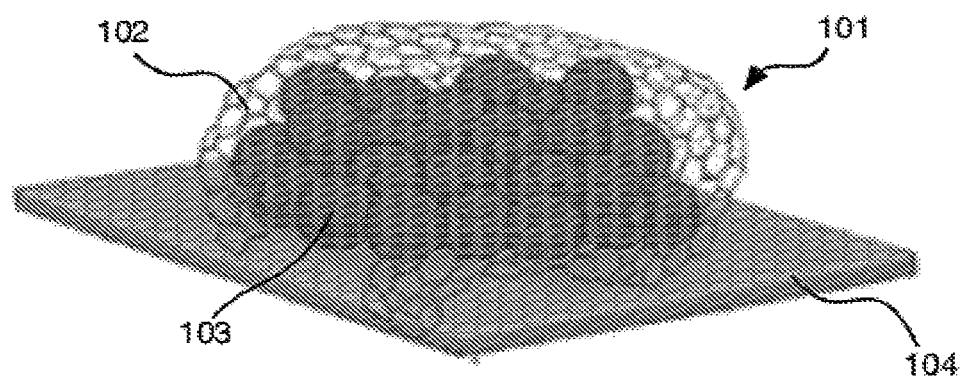
FIG. 1 illustrates an electrode comprising a carbon web securing nanostructures on a substrate.

Provided in certain embodiments herein are systems and processes for manufacturing electrode materials and/or electrodes (e.g., thin layer electrode depositions, such as on a current collector), and other depositions comprising the components described herein. In some embodiments, the electrode comprises an active electrode material (e.g., a silicon-containing material) and carbonaceous material (e.g., a nanostructured carbon) (e.g., a graphene component, such as reduced graphene oxide).

A process for manufacturing a silicon-carbon electrode material, the process comprising electrospraying a fluid stock comprising an active electrode material and a carbon material, such as described herein. In certain embodiments, the process comprises (e.g., the electrospraying comprises) producing an electrostatically charged plume from the fluid stock.

In some embodiments, provided herein is a process for producing an electrode, an electrode material, or an electrode precursor material. In general, the process comprises electrospraying a fluid stock (e.g., comprising a carbon material and an electrode active material in a liquid medium, such as an aqueous medium, e.g., water). In some embodiments, electrospraying of the fluid stock comprises applying a voltage thereto (e.g., applying a direct voltage ($V_{DC}$) or an alternating voltage ($V_{AC}$) to an electrospray nozzle, such as provided herein). In specific embodiments, application of the voltage to the nozzle produces an electric field (e.g., which induces formation of a jet or plume from the fluid stock applied to the nozzle). In various embodiments, the fluid stock is provided to the nozzle at any suitable flow rate, such as about 0.01 mL/min or more, about 0.05 mL/min or more, about 0.1 mL/min or more, about 0.2 mL/min or more, or about 0.01 mL/min to about 10 mL/min.

In specific embodiments, the fluid stock is electrosprayed with a gas (e.g., a controlled gas flow). In certain embodiments, the fluid stock and the gas are ejected from an electrospray nozzle in a similar direction. In some instances, the direction of ejection of the fluid stock and the gas from the electrospray nozzle is within about 30 degrees of one another, or, more preferably within about 15 degrees of one another (e.g., within about 10 degrees or within about 5 degrees of one another). In certain embodiments, the fluid stock and the gas are configured to be ejected from the nozzle in a coaxial or substantially coaxial configuration. In some instances, configurations and processes described herein allow for an enhanced driving force of electrospray, combining the driving forces of electric field gradient with high speed gas. In some instances, configurations provided herein allow for process throughput up to tens or hundreds of times greater than simple electrospray manufacturing and allow for the electrospray of high viscosity and/or highly loaded (e.g., with carbon and silicon inclusion materials described herein) fluids. Moreover, in some instances, such electrospray techniques and systems provided herein allow for the manufacture of highly uniform materials (e.g., electrodes, electrode materials, and electrode precursor materials). By contrast, other or conventional electrospray is not generally of commercial use in many applications because of, e.g., non-uniform deposition of drops and non-uniform dispersion of fillers in and between droplets, especially for high loaded systems. In addition, in some instances, the throughput capabilities of other or conventional electrospray systems are not sufficient to be commercially useful in some applications. However, other suitable techniques (e.g., electrospray techniques utilizing the fluid stocks and/or inclusions provided herein) are optionally utilized in the manufacture of electrodes or depositions described herein, as applicable.

In some instances, electrospray (e.g., using a process and/or system provided herein) of the fluid stock results in the formation of a plume comprising a plurality of droplets (collectively referred to herein so as to encompass, e.g., droplet solutions, droplet suspensions, and/or solid particles in an electrospray plume), or of a jet, which subsequently deforms into a plume comprising a plurality of droplets. In certain instances, electrospray (e.g., using a process and/or system provided herein) of a fluid stock, such as provided herein, results in the formation of a plume comprising a plurality of droplets. In some instances, the processes described herein results in the formation of small droplets (e.g., micron- or nano-scale droplets) having highly uniform size distributions (e.g., especially relative to standard electrospray techniques). In certain instances, this uniformity allows for much greater control of deposition formation, such as thickness, thickness uniformity, compositional uniformity (e.g., in composites), and the like. In certain embodiments, films provided herein have an average thickness ($d_f$) that is about 10 mm or less, such as about 5 mm or less, about 2 mm or less, or about 1 mm or less. In certain embodiments, such as wherein the film is utilized as a direct deposit electrode, the thickness of the film is about 500 micron (micrometer, μm) or less, such as about 250 micron or less, about 200 micron or less, about 100 micron or less, about or the like (e.g., down to about 1 micron, about 5 micron, about 10 micron, 25 micron, 50 micron, 100 micron, or the like). In certain embodiments, the films provided herein have good thickness uniformity, such as wherein the thinnest portion of the film is $>d_f/10$, $>d_f/5$, $>d_f/4$, $>d_f/3$, $>d_f/2$, or the like. In further or alternative embodiments, the thickest portion of the film is $<10\times d_f$, $<5\times d_f$, $<3\times d_f$, $<2\times d_f$, $<1.5\times d_f$, $<1.2\times d_f$, or the like. In preferred embodiments, the minimum thickness of the film is greater than 0.9 $d_f$ (more preferably greater than 0.95 $d_f$) and the maximum thickness of the film is less than 1.1 $d_f$ (more preferably, less than 1.05 $d_f$).

Figure 2:
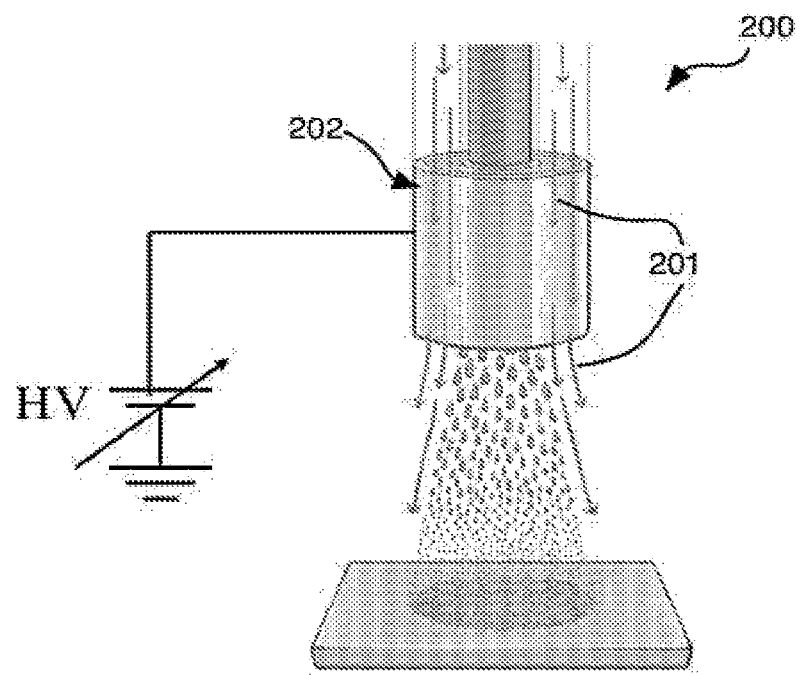
FIG. 2 shows an exemplary illustration of a gas controlled electrospray system and processes provided herein.

In some instances, electrospray techniques (e.g., provided herein) facilitate the formation of high capacity electrodes, such as those described herein. FIG. 2 shows an exemplary illustration of a gas controlled electrospray system provided herein 200.

Figure 3:
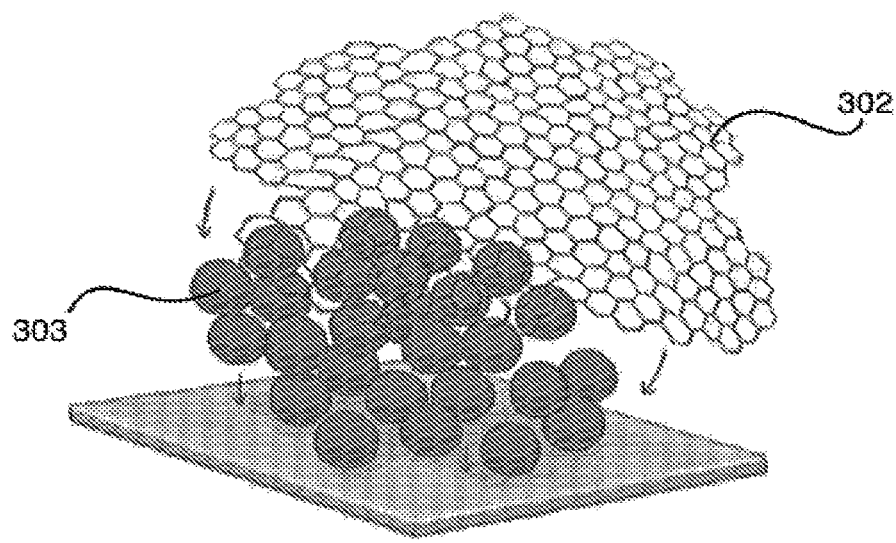
FIG. 3 shows an exemplary illustration of a process of a graphene component securing nanostructures to a substrate.
Figure 4:
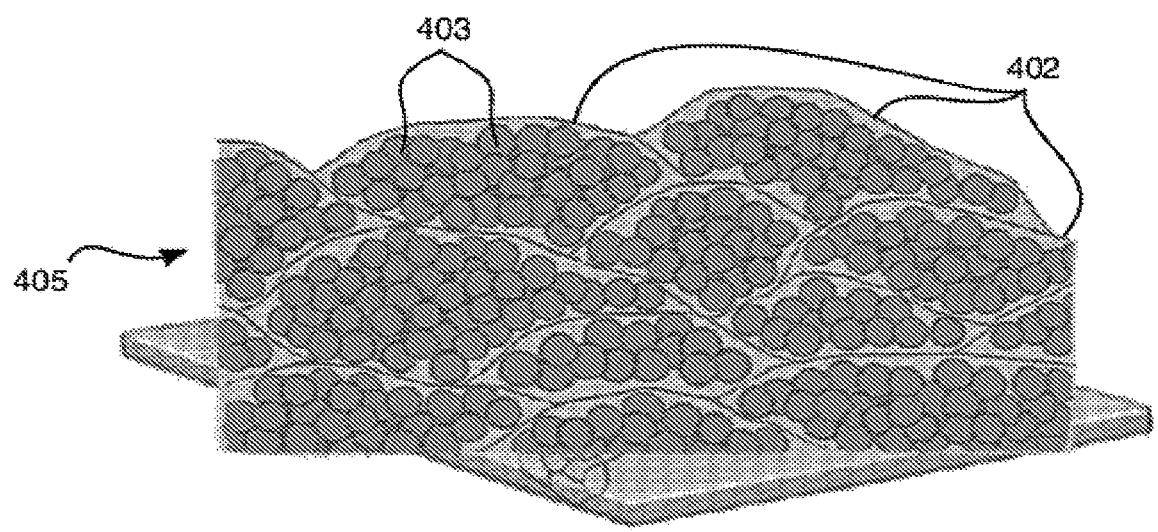
FIG. 4 shows an exemplary illustration of a plurality of carbon inclusions (graphene components) collectively forming a carbon web to secure nanostructures on a substrate.
Figure 5:
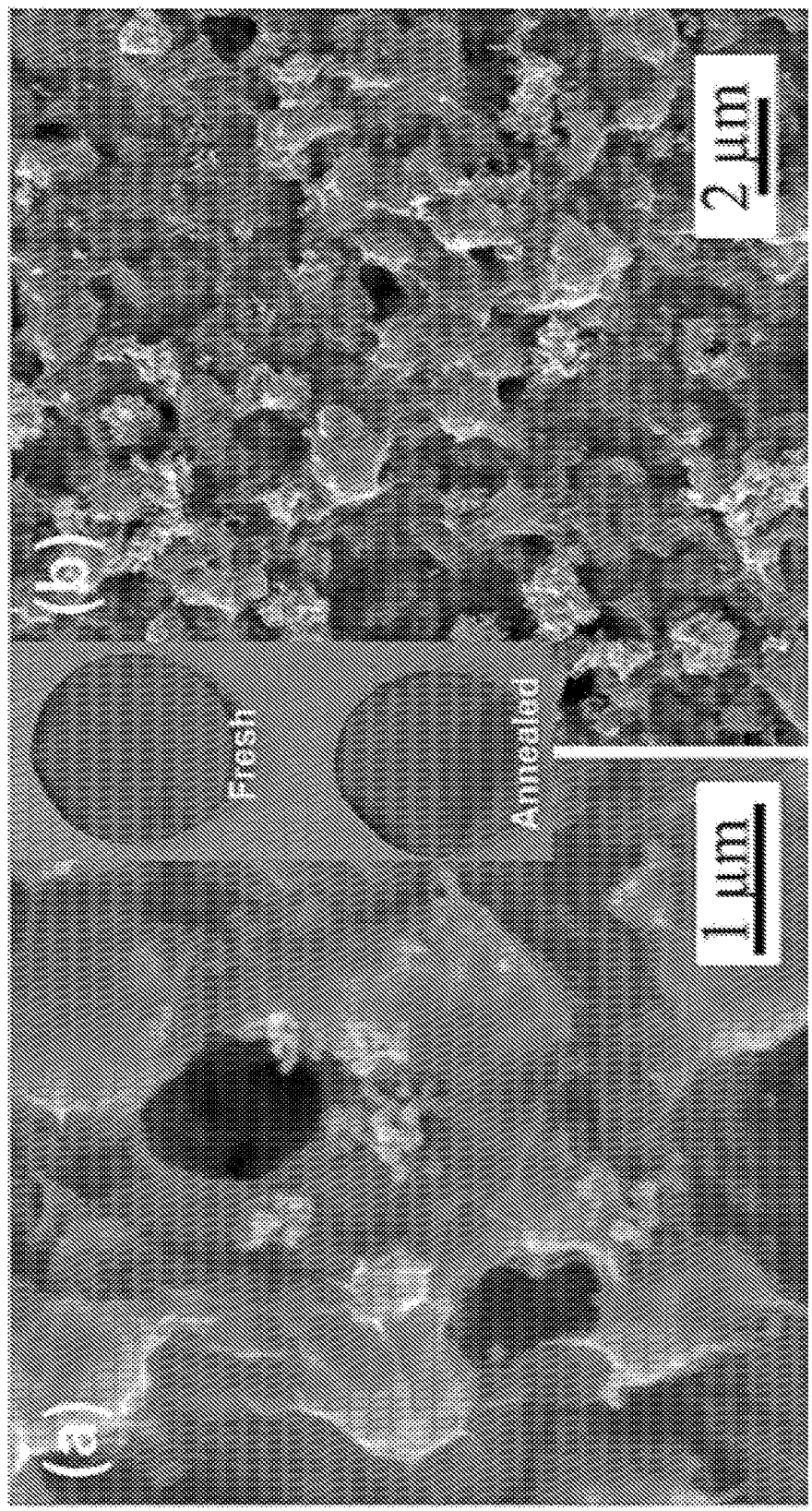
FIG. 5 illustrates exemplary microscopic images of exemplary carbon webs securing active electrode components to a substrate.

In some embodiments, gas-controlled systems (and processes) provided herein provide electrospray (e.g., using $V_{DC}$ or $V_{AC}$) of a fluid stock with a gas (illustrated by the downward arrows) 201 (e.g., having a controlled flow, such as circumferentially configured with the dispensing of the fluid stock) from a nozzle 202 (e.g., coaxially arranged, as illustrated in FIG. 2). In some embodiments, with the flow of air, the droplets proximal to the nozzle are smaller relative to non-gas controlled techniques (e.g., in some instances due to the controlled air flow at the nozzle end), and even smaller still as the droplets move away from the nozzle toward the collector (droplets distal to the nozzle and/or proximal to a collector). In some embodiments, such uniformity (e.g., uniformity of size, horizontal distribution, etc.) of dispersion of small droplets provides for a deposition having a greatly improved uniformity of thickness, dispersion of inclusions, etc. As illustrated in FIG. 3, uniform dispersion of active materials and carbon materials in a fluid stock and resulting electrospray plume facilitate the deposition of a carbon material (e.g., graphene, GO, rGO sheet) 302 over a plurality of active material nanostructures 303, thereby facilitating the wrapping of the active material nanostructures 303 therein. As illustrated in FIG. 4, further deposition of carbon materials 402 and active material nanostructures 403 provides a layered electrode structure 405 comprising a plurality of active material nanostructures 405 wrapped and/or secured within a web of the carbon material 402. Further, FIG. 4 illustrates a plurality of graphene envelopes comprising an external surface and an internal surface. The graphene envelope optionally comprises one or more graphene component, such as illustrated in FIG. 4. In addition, various graphene components of a composition described herein is a part of one or more graphene envelopes described herein. Moreover, as illustrated, in some instances, the external surface of one graphene envelope, or a portion thereof, optionally forms a portion of the internal surface of an adjacent graphene envelope. Further, in some embodiments, the internal surface of a graphene envelope defines a graphene envelope pocket, such as illustrated in FIG. 4. In certain embodiments, within the graphene envelope, one or more particles comprising an electrode active material is configured within the graphene envelope pocket. FIG. 5 illustrates images of exemplary electrodes provided herein comprising electrode active material wrapped within a carbon web—or a plurality of graphene envelopes with active electrode material configured therewithin (such as demonstrated by the illustration of FIG. 4).

A fluid stock (e.g., for electrospraying) provided herein comprises any suitable components. In specific embodiments, the fluid stock comprises a liquid medium and an active electrode material, or a precursor thereof. In specific embodiments, the fluid stock comprises a liquid medium, an active electrode material, or a precursor thereof, and a carbon material (e.g., a carbon inclusion, such as a graphene component, described herein).

Specifically, in certain embodiments, a fluid stock is provided to a first inlet of a first conduit of an electrospray nozzle in processes described herein. In some embodiments, the first conduit has an inlet and an outlet and is enclosed along the length of the conduit by a wall having an interior surface and an exterior surface.

In some embodiments, the fluid stock comprises a carbon inclusion material and a silicon inclusion material. Other additional inclusion materials are optionally included.

Any suitable silicon inclusion material is optionally utilized. Generally, silicon inclusion materials comprise an active silicon electrode material (e.g., Si, SiOx, or the like) or a precursor thereof. In certain embodiments, the silicon material comprises a plurality of structures comprising a silicon material. In specific embodiments, the silicon material is a silicon material that is active in an electrode, such as a negative electrode in a lithium ion battery. In more specific embodiments, the silicon material is, by way of non-limiting example, elemental silicon, and/or a silicon oxide (e.g., having a formula: SiOx, wherein 0≤x<2, e.g., 0≤x≤1.5, or 0<x<1). In specific embodiments, x is 0 to about 1.5. Any suitable inclusion structure is optionally utilized, such as a fiber, particle, sheet, rod, and/or the like.

Generally, the silicon-containing inclusion structures are micron or submicron in size, such as nanoscaled structures. In certain embodiments, silicon-containing inclusions provided herein have an average dimension of less than 100 micron, such as less than 50 micron, or less than 30 micron. In more specific embodiments, the silicon-containing inclusions have an average dimension of less than 25 micron, less than 2 micron, less than 15 micron, less than 10 micron or the like. In certain embodiments, the silicon-containing inclusions have an average dimension of at least 200 nm, e.g., about 200 nm to about 10 micron. In other embodiments, nanostructured inclusions are preferred, such as having an average dimension of about 200 nm or less, such as about 10 nm to about 200 nm. In certain embodiments, silicon-containing inclusions have a high aspect ratio (length divided by width), such as being in a fiber or rod form, or a low aspect ratio, such as in a spherical form. In some embodiments, the silicon-containing inclusions have an average aspect ratio of about 1 to about 100, or more. In specific embodiments, the silicon-containing inclusions have an average aspect ratio of 1 to about 50, or 1 to about 20, or 1 to about 10. In some embodiments, such as wherein silicon containing inclusions have an aspect ratio of about 10 or greater, silicon-containing inclusions provided herein have at least one average dimension of less than 100 micron, such as less than 50 micron, or less than 30 micron. In more specific embodiments, the silicon-containing inclusions have an average dimension of less than 25 micron, less than 2 micron, less than 15 micron, less than 10 micron or the like. In certain embodiments, the silicon-containing inclusions have at least one average dimension of at least 200 nm, e.g., about 200 nm to about 10 micron. In other embodiments, the silicon-containing inclusions have at least one average dimension of about 200 nm or less, such as about 10 nm to about 200 nm (e.g., a high aspect ratio nanofiber or nanorod, wherein the nanofibers or nanorods have an average diameter of about 10 nm to about 200 nm and a length up to 10 times, up to 100 times, or more the diameter). In some instances, such as wherein larger structures are utilized, larger droplets are necessarily formed upon electrospray according to the processes described herein.

Figure 6:
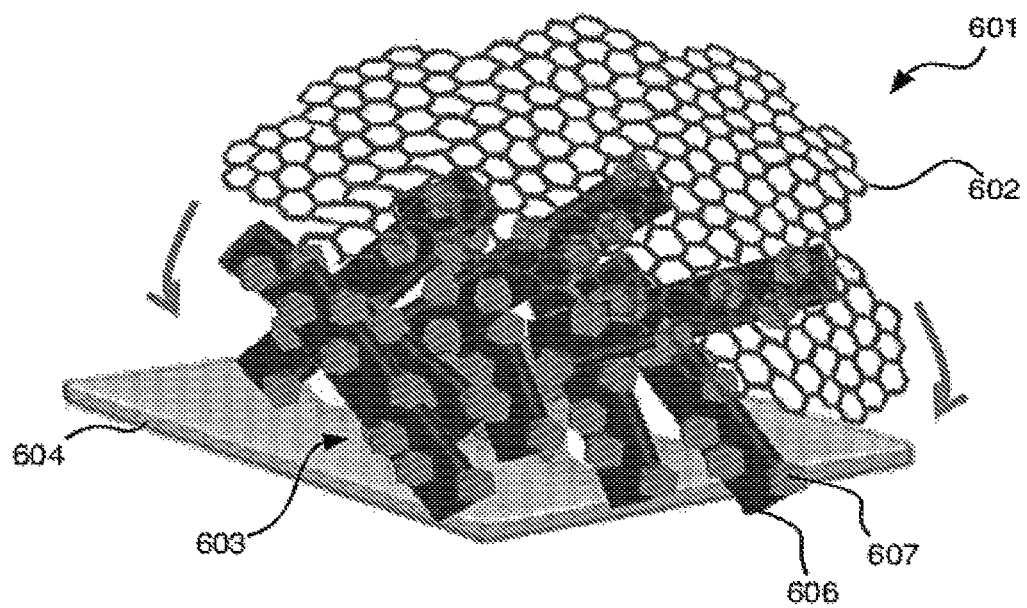
FIG. 6 illustrates an exemplary process of securing composite nanofibers (e.g., comprising a carbon matrix with electrode active material embedded therein) with a carbon web comprising a graphene component.
Figure 7:
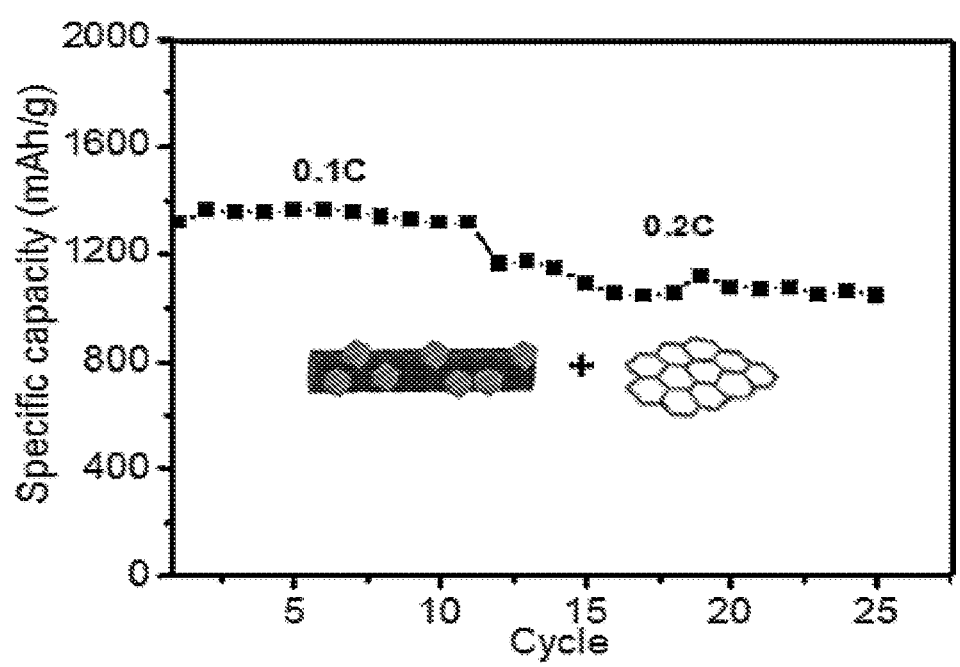
FIG. 7 illustrates exemplary specific capacity data for an exemplary electrode comprising composite nanofibers (comprising a carbon matrix with silicon nanoparticles embedded therein) secured on a current collector with a carbon web comprising a graphene component.

In certain embodiments, silicon-containing inclusions utilized herein further comprise an additional material (e.g., as a composite), such as carbon (e.g., amorphous and/or crystalline carbon). For example, FIG. 6 and FIG. 7 illustrate silicon-containing inclusions comprising a carbon matrix with electrode active silicon materials embedded therein. Silicon-containing inclusions described herein optionally comprise (e.g., on average) any suitable amount of active electrode silicon material (e.g., Si and/or SiOx), such as about 30 wt. % or more of active electrode silicon material, about 50 wt. % or more of active electrode silicon material, about 70 wt. % or more of active electrode silicon material, or the like.

Figure 30:
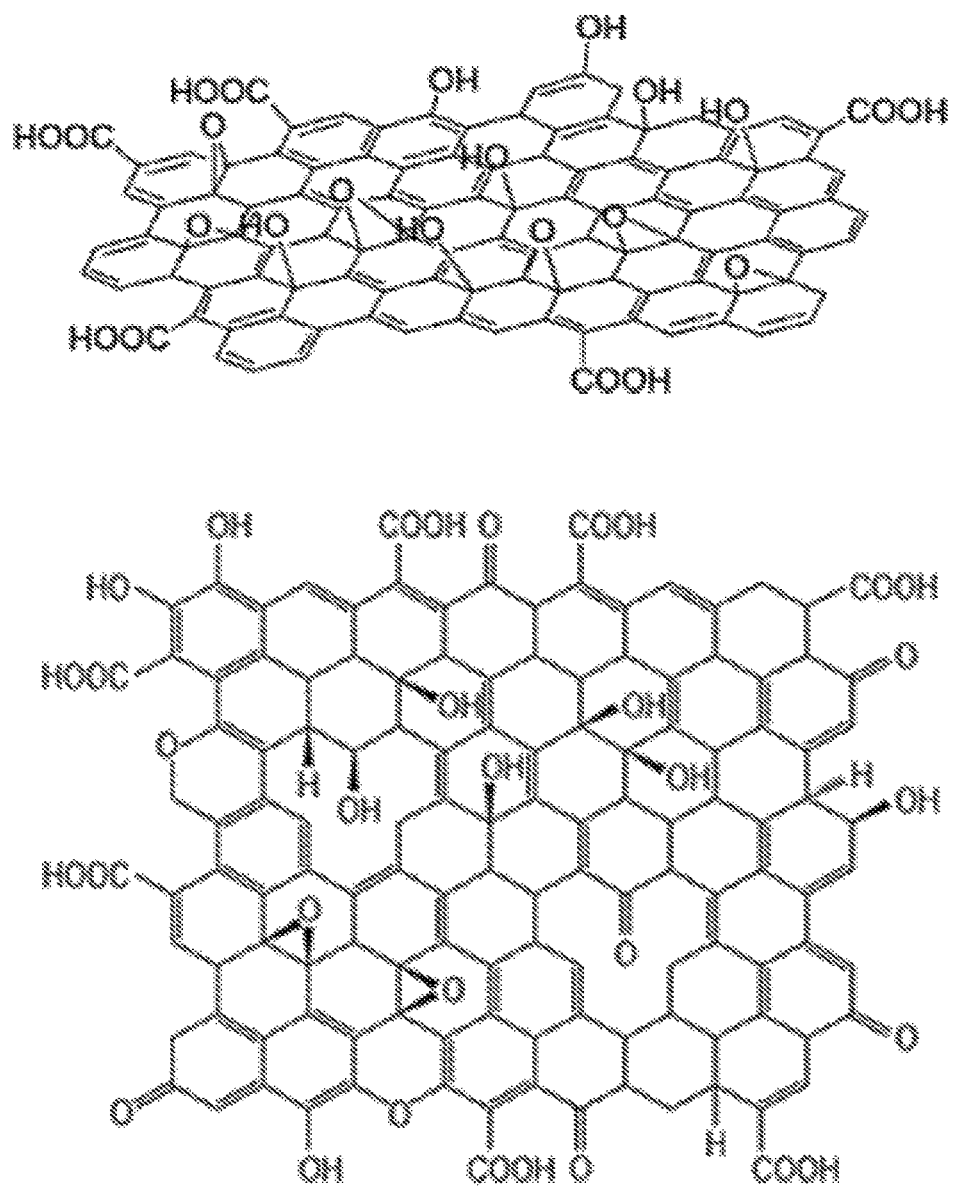
FIG. 30 illustrates exemplary graphene oxide (GO) structures.

Any suitable carbon inclusion material is optionally utilized in the fluid stock. In certain embodiments, the carbon material is any suitable carbon material, such as a nanostructured carbon material. In some instances, the carbon material is a carbon sheet, a carbon ribbon, or the like. In specific embodiments, the carbon inclusion material is a graphene component, e.g., graphene or an analog there, such as graphene that has one or more carbon atom thereof substituted with one or more additional atom, such as oxygen, halide, hydrogen, and/or the like. Generally, graphene or graphenic components herein have a general two-dimensional structure (e.g., with 1-25 layers), with a honeycomb lattice structure (which in some instances, such as in non-pristine graphene, graphene oxide, reduced graphene oxide, or the like, may comprise certain defects therein, such as described and illustrated herein). In specific embodiments, the graphene component is an oxidized graphene component. In some instances, the carbon material is or comprises a graphene component, such as graphene, graphene oxide, reduced graphene oxide, or a combination thereof. In specific embodiments, the oxidized graphene component is a graphene component functionalized with oxygen, such as with carbonyl (C=O) groups, carboxyl groups (e.g., carboxylic acid groups, carboxylate groups, COOR groups, such as wherein R is a C1-C6 alkyl, or the like), —OH groups, epoxide groups, ether (—O—) groups, and/or the like. FIG. 30 illustrates an exemplary oxidized graphene component (graphene oxide) structure including COOH, OH, epoxide, ether, and carbonyl groups. Other graphene oxide structures are also contemplated herein. In certain embodiments, the oxidized graphene component (or graphene oxide) comprises about 60% or more carbon (e.g., 60% to 99%). In more specific embodiments, the oxidized graphene component comprises about 60 wt. % to about 90 wt. % carbon, or about 60 wt. % to about 80 wt. % carbon. In further or alternative specific embodiments, the oxidized graphene component comprises about 40 wt. % oxygen or less, such as about 10 wt. % oxygen to about 40 wt. % oxygen, about 35 wt. % oxygen or less, about 1 wt. % to 35 wt. % oxygen, or the like. In some preferred embodiments, the oxidized graphene component comprises sufficient oxygen so as to facilitate dispersion and opening of the graphene sheets in an aqueous medium. In some embodiments, the total percentage of carbon and oxygen does not constitute 100% of the graphene component or analog, with the additional mass comprising any suitable atoms, such as hydrogen (and/or, e.g., nitrogen (e.g., in the form of amine, alkyl amine, and/or the like). In addition, graphene components utilized in the processes and materials utilized herein optionally comprise pristine graphene sheets, or defective graphene sheets, such as wherein one or more internal and/or external rings are oxidized and/or opened, etc.

In certain embodiments, the fluid stock (and/or electrodes and materials described herein) comprises active electrode material (e.g., silicon-containing particles) and carbon inclusion (e.g., graphene component) in a weight ratio of active electrode material to carbon inclusion of about 1:10 or more, such as about 1:5 or more, about 1:2 or more, about 1:1 or more, or the like. In preferred embodiments, higher ratios of active material to carbon material are preferred in order to improve the capacity of the resultant electrode materials, while not increased to such an extent so as to overly diminish cell cycling performance (e.g., by providing an insufficient amount of carbon inclusion material to sufficiently protect the active electrode material, such as from SEI formation, pulverization, or the like). In some embodiments, the weight ratio of the inclusion comprising the active material to the carbon inclusion in the fluid stock is about 1:1 to about 1000:1, e.g., about 2:1. In some embodiments, the weight ratio of active electrode material to carbon inclusion of about 1:10 to about 20:1. In certain embodiments, the weight ratio of active electrode material to carbon inclusion of about 1:2 to about 10:1, such as about 1:1 to about 5:1, or about 2:1 to about 4:1. In certain embodiments, similar ratios of active material to carbon inclusion are provided herein for the materials and electrodes described herein, though in some instances wherein the carbon inclusion material (e.g., graphene component) is reduced, higher ratios are also contemplated for electrodes and electrode materials herein due to the weight loss resulting from the reduction process (e.g., due to the removal of oxygen from the carbon inclusion material).

Any suitable amount of electrode active material is included in a fluid stock provided herein. In specific embodiments, the concentration of the electrode active material and/or inclusions comprising the electrode active material provided in the fluid stock is about 0.05 wt % or more, e.g., about 0.1 wt % to about 25 wt %, about 0.2 wt % to about 10 wt %, about 0.5 wt % to about 5 wt %, about 1 wt % to about 3 wt %, about 2 wt %, or the like).

Carbon inclusions (e.g., graphene components) and active material (or precursors thereof) are included in the fluid stock in any suitable concentration. In general, concentrations are preferred in order to increase or maximize throughput capabilities, while avoiding clogging the nozzle systems and/or causing unwanted aggregation, clumping, etc. of inclusion materials.

In some embodiments, graphene components are included in the fluid stock in an amount sufficiently low to allow good dispersion and unpacking of the graphene sheets (e.g., to reduce or minimize folding of the graphene sheets onto one another). In certain embodiments, the fluid stock comprises about 0.01 wt. % or more carbon inclusion (e.g., graphene component, such as GO). In certain embodiments, the fluid stock comprises about 0.01 wt. % or more active material (e.g., silicon-containing particles). In more specific embodiments, the fluid stock comprises about 0.1 wt. % to about 10 wt. % carbon inclusion (e.g., graphene component, such as GO). In some embodiments, the fluid stock comprises about 1 wt. % to about 5 wt. % carbon inclusion (e.g., graphene component, such as GO). In more specific embodiments, the fluid stock comprises about 0.1 wt. % to about 30 wt. % active material (e.g., silicon-containing particles). In some embodiments, the fluid stock comprises about 0.2 wt. % to about 20 wt. % (e.g., about 0.2 wt. % to about 10 wt. %) active material (e.g., silicon-containing particles). In some embodiments, the fluid stock comprises about 1 wt. % to about 15 wt. % (e.g., about 5 wt. % to about 10 wt. %) active material (e.g., silicon-containing particles).

Figure 31:
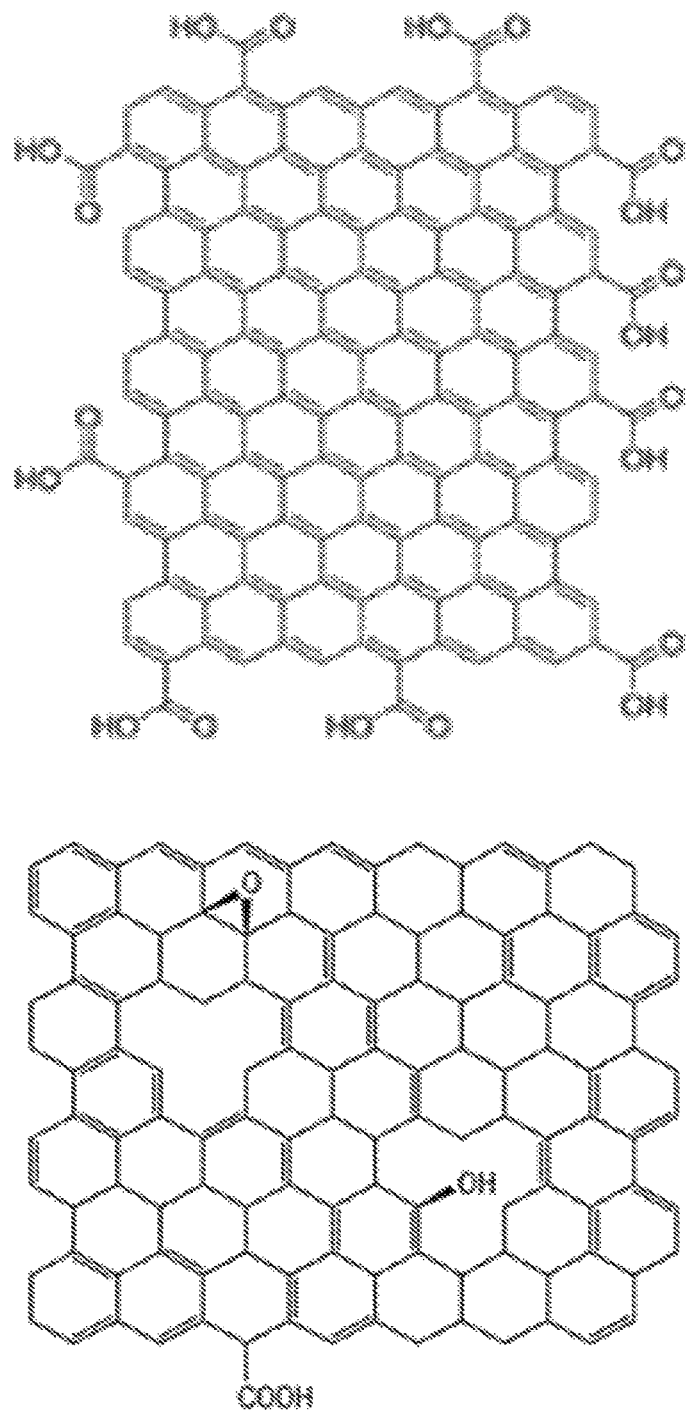
FIG. 31 illustrates exemplary reduced graphene oxide (rGO) structures.

In certain embodiments, a process herein further comprises a step of reducing the graphene component (e.g., decreasing the oxygen content thereof). In some embodiments, a process herein comprises thermally or chemically reducing the graphene component. In certain embodiments, the reduced graphene component is a reduced graphene oxide. In some embodiments, the reduced graphene component or reduced graphene oxide is a graphene (pristine or defective, such as comprising one or more opened internal rings, or the like) that is optionally functionalized with oxygen, such as described for graphene oxides (e.g., wherein the oxygen wt. % is less than the oxygen wt. % of the graphene component of the fluid stock). Generally, reduced graphene component (e.g., reduced graphene oxide (rGO)) is recognized as a graphene oxide material that has been partially or wholly reduced, such as by thermal (e.g., heating, such as to 200° C. or more, such as under inert (e.g., nitrogen, argon, etc. atmosphere) or reductive conditions (e.g., hydrogen gas, mixed inert and hydrogen gas, or the like)), irradiation, chemical (e.g., by treating with hydrazine, hydrogen plasma, urea, or the like), or other (e.g., using strong pulse light) mechanisms. FIG. 31 illustrates various exemplary reduced graphene oxide (rGO) structures. As illustrated, the structure may have a basic two dimensional honeycomb lattice structure of graphene, with (or without) defects and with (or without) other atoms present (e.g., hydrogen and/or oxygen, including, e.g., oxidized structures, such as discussed and illustrated herein). In various embodiments, the reduced graphene component or reduced graphene oxide comprises about 60% or more carbon (e.g., 60% to 99%), such as about 70 wt. % or greater, about 75 wt. % or more, about 80 wt. % or greater, about 85 wt. % or greater, about 90 wt. % or greater, or about 95 wt. % or greater (e.g., up to about 99 wt. % or more). In certain embodiments, the reduced graphene component (e.g., rGO) comprises about 35 wt. % or less (e.g., 0.1 wt. % to 35 wt. %) oxygen, e.g., about 25 wt. % or less (e.g., 0.1 wt. % to 25 wt. %) oxygen, or about, about 20 wt. % or less, about 15 wt. % or less, about 10 wt. % or less (e.g., down to about 0.01 wt. %, down to about 0.1 wt. %, down to about 1 wt. % or the like) oxygen. In specific embodiments, the reduced graphene component (e.g., rGO) comprises about 0.1 wt. % to about 10 wt. % oxygen, e.g., about 4 wt. % to about 9 wt. %, about 5 wt, % to about 8 wt, %, or the like. In some embodiments, the total percentage of carbon and oxygen does not constitute 100% of the reduced graphene component, with the additional mass comprising any suitable atoms, such as hydrogen, or other agents, as discussed for the non-reduced graphene components herein.

In certain embodiments, a carbon inclusion (e.g., graphene component) utilized in fluid stocks and materials herein has any suitable dimension. In some embodiments, the carbon inclusion is a two dimensional material, such as a graphene component (e.g., graphene oxide, reduced graphene oxide, graphene, or the like). In certain embodiments, the two dimensional material (e.g, graphene component) has a first dimension and a second dimension (e.g., length and width), the average of which is the average dimension of the material. In some embodiments, active material inclusions have three dimensions (e.g., length, width, height for particles, or diameter and length for rods/fibers) having an average dimension. In some embodiments, carbon inclusions utilized are of a size sufficient to coat or wrap, such as in an envelope or web, the active material inclusions upon electrospray deposition. In specific embodiments, the average dimension of a (e.g., two dimensional) carbon inclusion is equal to or greater than the average dimension of the active material inclusions. In certain embodiments, larger carbon inclusions provide the ability to wrap or envelop multiple active material inclusions. In some embodiments the average dimension of the carbon inclusion is about 0.1× to about 500× the average dimension of the active material inclusion. In specific embodiments, the average dimension of the carbon inclusion is about 1× to about 200× the average dimension of the active material inclusion. In more specific embodiments, the dimension of the carbon inclusion is about 5× to about 25×, such as about 10×, the average dimension of the active material inclusion (e.g., wherein the electrode active material inclusions have an average dimension of about 200 nm or more). In other specific embodiments, the dimension of the carbon inclusion is about 50× to about 250×, such as about 100×, the average dimension of the active material inclusion (e.g., wherein the electrode active material inclusions have an average dimension of about 200 nm or less). In some embodiments, the average dimension of a two-dimensional carbon inclusion is about 1 micron to about 20 micron (e.g., about 5 micron to about 10 micron).

In specific embodiments, a graphene component (e.g., graphene oxide) is utilized in the fluid stock and, following electrospraying of the fluid stock, the collected deposition is thermally treated (e.g., to a temperature of about 100° C. or more, e.g., about 150° C. to about 350° C., about 200° C. to about 300° C., about 200° C., about 250° C., or any suitable temperature), such as to at least partially reduce the graphene oxide (i.e., decrease the percentage of oxygen relative to carbon in the graphene oxide). In some embodiments, thermal treatment of the graphene web shrinks the graphene web around the particles enclosed within the graphene pocket. In some embodiments, the shrunk web further protects the particles therewithin (e.g., by further minimizing electrolyte interaction with the particle), such as by reducing or minimizing the space within the envelope in which electrolyte can be trapped. In certain embodiments, the pocket, such as the shrunk pocket, retains its flexibility, allowing the particles to expand (e.g., up to at least 200% the original volume, at least 300% the original volume, at least 400% the original volume, or the like), such as within the pocket (e.g., allowing the particles to expand without becoming unnecessarily exposed to electrolyte, which can react with silicon to form a detrimental SEI layer when the silicon is lithiated). In some embodiments, the void space volume (volume within envelope not taken up by particles therewithin) within the shrunk pocket is reduced (e.g., relative to the pre-thermally treated envelope) by at least 10%, at least 20%, at least 30%, at least 50%, or the like following thermal treatment of the web. In certain embodiments, the void space volume within the pocket is any suitable volume, such as less than 100%, less than 50%, less than 25%, less than 10%, or the like of the volume of the particles therein. In various other embodiments, any other suitable technique is optionally utilized to reduce the graphene oxide following deposition. In some instances, reduction of the graphene oxide following deposition improve the performance characteristics of the material (e.g., by, in some instances, increasing conductivity of the carbon inclusion). For example, various figures provided herein illustrate that in some instances, materials provided herein demonstrate improved performance (e.g., specific capacity) characteristics with reduced graphene oxide (rGO), relative to graphene oxide (GO). However, in some instances, such as wherein water is utilized as the liquid medium of the fluid stock, it is preferred to utilize graphene oxide (GO), e.g., for its improved solubility/dispersability and facility in processing. In some embodiments, processes herein omit the reduction steps, such as wherein a graphene component suitable for an electrode material is utilized directly in the fluid stock.

In certain embodiments, the liquid medium comprises any suitable solvent or suspending agent. In some embodiments, the liquid medium is merely utilized as a vehicle and is ultimately removed, e.g., by evaporation during the electrospraying process and/or upon drying of the deposition. In some embodiments, the liquid medium is aqueous. In specific embodiments, the liquid medium comprises water, alcohol ((e.g., n-, tert-, sec-, or iso-) butanol, (e.g., n-, or iso-) propanol, ethanol, methanol, or combinations thereof), tetrahydrofuran (THF), dimethylformamide (DMF), N-methyl-2-pyrrolidone (NMP), Dimethylacetamide (DMAc), or combinations thereof. In more specific embodiments, the liquid medium comprises water.

In a process for manufacturing a material or electrode according to one embodiment of the invention, the fluid stock comprising a nanostructured inclusion, a carbon inclusion, and water may be formed by mixing a (dispersed) solution comprising the carbon inclusion and water with the nanostructured inclusion comprising a silicon active material.

In some instances, if the amount of the graphene component in the (dispersed) solution is too small, the nanostructured inclusions (e.g., silicon active material) cannot be effectively wrapped with the carbon web comprising the graphene component in the electrode or electrode material. Thus, in some of such instances, the properties of the electrode can deteriorate. In some instances, gas-driven systems and processes described herein allow for the production of an aerosol or plume that has enough carbon (e.g., graphene) component to facilitate good formation of protected electrode materials (e.g., SiOx) that would not be possible using conventional techniques. In certain embodiments, the viscosity of the fluid stock fluid stock is at least 200 centipoise (cP), such as at least 500 cP, at least 1000 cP, at least 2000 cP, at least 2,500 cP, at least 3,000 cP, at least 4,000 cP, or the like (e.g., up to 20,000 cP, up to about 10,000 cP, or the like). In preferred embodiments, the viscosity of the fluid stock is about 2,000 cP to about 10,000 cP.

In some embodiments, provided herein is a process for producing a materials and electrodes provided herein (e.g., a thin layer depositions thereof), the process comprising electrospraying a fluid stock provided herein with a gas (e.g., a controlled gas flow). In certain embodiments, the fluid and the gas are ejected from an electrospray nozzle in a similar direction. In some instances, the direction of ejection of the fluid stock and the gas from the electrospray nozzle is within about 30 degrees of one another, or, more preferably within about 15 degrees of one another (e.g., within about 10 degrees or within about 5 degrees of one another). In certain embodiments, the fluid stock and the gas are configured to be ejected from the nozzle in a coaxial configuration. In some instances, configurations and processes described herein allow for an enhanced driving force of electrospray, combining the driving forces of electric field gradient with high speed gas. In certain instances, configurations and processes described herein provided for several improvements in material characteristics described herein, such as illustrated by the figures.

In some instances, electrospray (e.g., using a process and/or system provided herein) of the fluid stock results in the formation of a jet, which subsequently deforms into a plume comprising a plurality of droplets. In certain instances, electrospray (e.g., using a process and/or system provided herein) of a fluid stock, such as provided herein results in the formation of a plume comprising a plurality of droplets (collectively referred to herein so as to encompass, e.g., droplet solutions, droplet suspensions, and/or solid particles in an electrospray plume). In some instances, the processes described herein results in the formation of small droplets (e.g., nanoscale droplets) having highly uniform size distributions.

In certain embodiments, a process provided herein comprises producing an electrostatically charged plume comprising a plurality of particles and/or droplets (e.g., an area or section of air comprising a plurality of particles and/or droplets dispersed therein). In specific embodiments, the plurality of particles and/or droplets are nanoscaled particles and/or droplets. In more specific embodiments, the plurality of particles and/or droplets have an average diameter of about 100 microns or less, about 50 microns or less, less than 30 micron, about 20 microns or less, less than 15 micron, or about 10 microns or less. In still more specific embodiments, the plurality of particles and/or droplets have an average diameter of about 5 microns or less, e.g., about 1 micron or less. In certain embodiments, the size of the particles and/or droplets is highly uniform, with the standard deviation of the particle and/or droplet size being about 50% of the average size of the particles and/or droplets, or less (e.g., about 40% or less, about 30% or less, about 20% or less, about 10% or less, or the like) (e.g., at any given distance from the nozzle, e.g., about 10 cm or more, about 15 cm or more, about 20 cm or more, about 25 cm or more, from the nozzle).

In some embodiments, the fluid stock, the jet, and/or the plume comprises a fluid (e.g., water), a (e.g., micro or nano-structured) inclusion comprising an active material, and a carbon inclusion. In certain embodiments, compositions provided herein comprise a plurality of droplets, a jet, or a fluid stock comprising a fluid (e.g., water), a (e.g., micro or nano-structured) inclusion comprising an active material, and a carbon inclusion. In various embodiments, individual droplets optionally comprise either or both of the active material and/or carbon inclusions. Further, some or all of the fluid of the droplets (of the plume) may be evaporated during the electrospray process (e.g., prior to deposition). In various embodiments, concentrations of inclusion materials in droplets described herein, or a composition comprising the same, are generally higher than the concentrations of such materials in the fluid stock, or even in the jet (where evaporation of the fluid begins). In certain embodiments, droplets or compositions comprising the droplets having inclusions concentrations of at least 1.5×, at least 2×, at least 3×, at least 5×, at least 10×, or the like (e.g., wherein the inclusions make up to 70 wt. % or more, 80 wt. % or more, 90 wt. % or more, or even 100 wt. % of the droplets or composition/plume comprising the same) of the concentrations of the droplets or composition/plume comprising the same.

In specific embodiments, the plume, and/or particles and/or droplets thereof, comprise a carbon inclusion (e.g., graphene component) and/or a plurality of active electrode material containing particles (e.g., micro- and/or nano-particles). In some embodiments, a droplet comprises both carbon inclusion and active electrode material containing inclusion. In certain embodiments, a droplet comprises one of carbon inclusion or active electrode material containing inclusion. In various embodiments, a plume provided herein optionally comprises either or both types of droplet. In certain embodiments, the plume (e.g., particles and/or droplets thereof) further comprises a liquid medium (e.g., wherein the liquid medium of a fluid stock is not completely evaporated). In some instances, the controlled air flow allows for a increase rate and uniformity in dispersion and breaking up of the jet and the plume, allowing for increased fluid stock flow rates, while also increasing deposition uniformity and performance characteristics. In certain embodiments, the fluid stock is provided to the first inlet at a rate (e.g., where a direct current voltage ($V_{DC}$) is applied to the electrospray system) of about 0.01 to about 10 mL/min, e.g., about 0.05 mL/min to about 5 mL/min, or about 0.5 mL/min to about 5 mL/min. In some instances, use of alternating current configurations (e.g., wherein an alternating current voltage ($V_{AC}$) is applied to the electrospray system) allow for higher throughput. In certain embodiments, the fluid stock is provided to the first inlet at a rate of about 0.1 mL/min or more, e.g., about 0.1 mL/min to about 25 mL/min, about 0.3 mL/min or more, about 0.5 mL/min or more, about 1 mL/min or more, about to about 2.5 mL/min, or about 5 mL/min or more.

In specific embodiments, an process described herein comprises providing a fluid stock to a first inlet of a first conduit of an electrospray nozzle, the first conduit being enclosed along the length of the conduit by a wall having an interior surface and an exterior surface, the first conduit having a first outlet. In specific instances, the walls of the first conduit form a capillary tube, or other structure. In some instances, the first conduit is cylindrical, but embodiments herein are not limited to such configurations.

Figure 8:
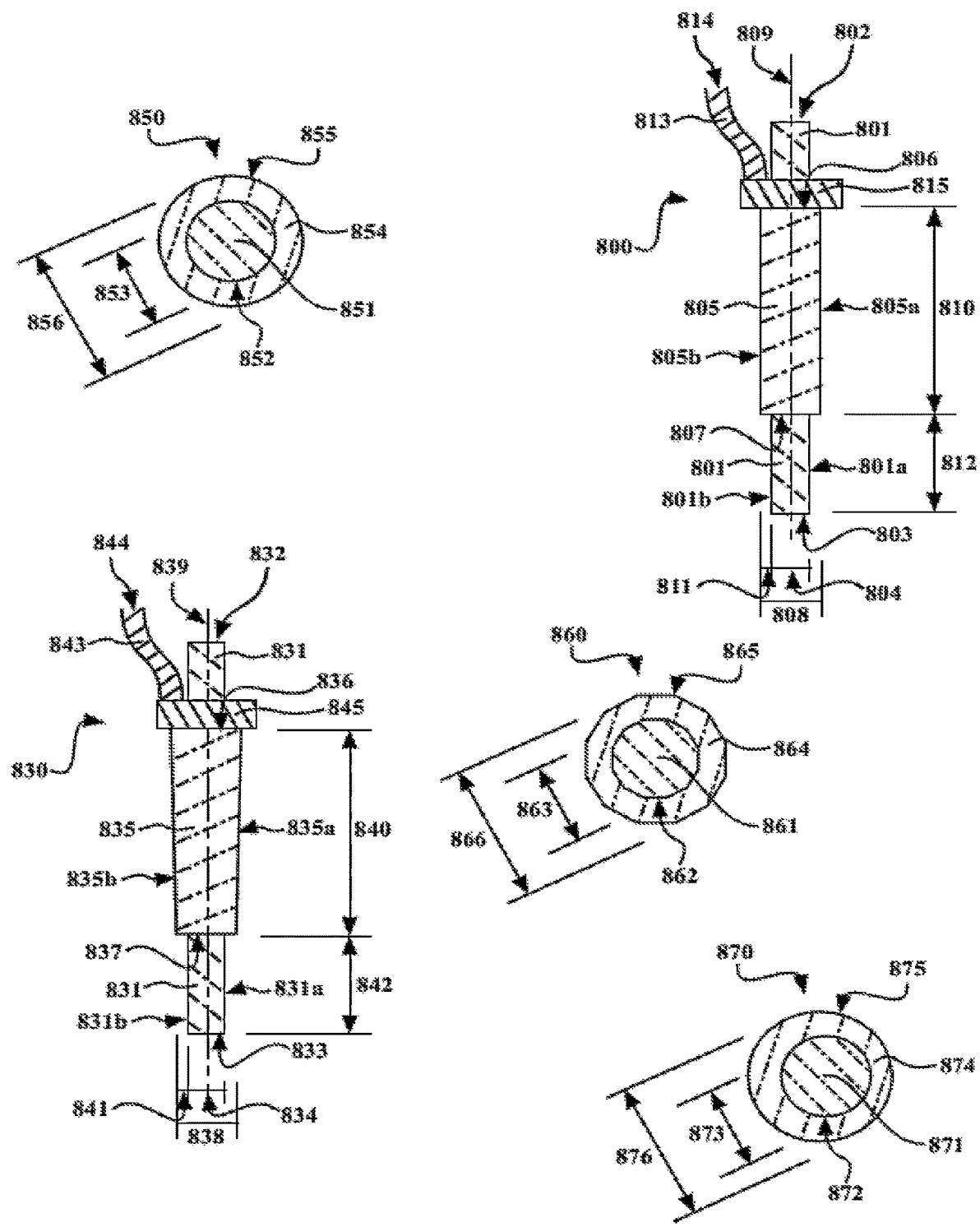
FIG. 8 illustrates exemplary electrospray nozzle apparatuses utilized to manufacture certain electrodes and electrode materials provided herein.

FIG. 8 illustrates exemplary electrospray nozzle apparatuses 800 and 830 provided herein. Illustrated by both nozzle components 800 and 830 some embodiments, the nozzle apparatus comprises a nozzle component comprising a first (inner) conduit, the first conduit being enclosed along the length of the conduit by a first wall 801 and 831 having an interior and an exterior surface, and the first conduit having a first inlet (or supply) end 802 and 832 (e.g., fluidly connected to a first supply chamber and configured to receive a fluid stock) and a first outlet end 803 and 833. Generally, the first conduit has a first diameter 804 and 834 (e.g., the average diameter as measured to the inner surface of the wall enclosing the conduit). In further instances, the nozzle component comprising a second (outer) conduit, the second conduit being enclosed along the length of the conduit by a second wall 805 and 835 having an interior and an exterior surface, and the second conduit having a second inlet (or supply) end 806 and 836 (e.g., fluidly connected to a second supply chamber and configured to receive a gas—such as a high velocity or pressurized gas (e.g., air)) and a second outlet end 807 and 837. In some instances, the second inlet (supply) end 806 and 836 is connected to a supply chamber. In certain instances, the second inlet (supply) end 806 and 836 are connected to the second supply chamber via a supply component. FIG. 8 illustrates an exemplary supply component comprising a connection supply component (e.g., tube) 813 and 843 that fluidly connects 814 and 844 the supply chamber (not shown) to an inlet supply component 815 and 845, which is fluidly connected to the inlet end of the conduit. The figure illustrates such a configuration for the outer conduit, but such a configuration is also contemplated for the inner and any intermediate conduits as well. Generally, the first conduit has a first diameter 808 and 838 (e.g., the average diameter as measured to the inner surface of the wall enclosing the conduit). The first and second conduits have any suitable shape. In some embodiments, the conduits are cylindrical (e.g., circular or elliptical), prismatic (e.g., a octagonal prism), conical (e.g., a truncated cone—e.g., as illustrated by the second (conduit wall 835) (e.g., circular or elliptical), pyramidal (e.g., a truncated pyramid, such as a truncated octagonal pyramid), or the like. In specific embodiments, the conduits are cylindrical (e.g., wherein the conduits and walls enclosing said conduits form needles). In some instances, the walls of a conduit are parallel, or within about 1 or 2 degrees of parallel (e.g., wherein the conduit forms a cylinder or prism). For example, the nozzle apparatus 800 comprise a first and second conduit having parallel walls 801 and 805 (e.g., parallel to the wall on the opposite side of the conduit, e.g., as illustrated by 801a/801b and 805a/805b, or to a central longitudinal axis 809). In other embodiments, the walls of a conduit are not parallel (e.g., wherein the diameter is wider at the inlet end than the outlet end, such as when the conduit forms a cone (e.g., truncated cone) or pyramid (e.g., truncated pyramid)). For example, the nozzle apparatus 830 comprise a first conduit having parallel walls 831 (e.g., parallel to the wall on the opposite side of the conduit, e.g., as illustrated by 831a/831b, or to a central longitudinal axis 839) and a second conduit having non-parallel walls 835 (e.g., not parallel or angled to the wall on the opposite side of the conduit, e.g., as illustrated by 835a/835b, or to a central longitudinal axis 839). In certain embodiments, the walls of a conduit are within about 15 degrees of parallel (e.g., as measured against the central longitudinal axis, or half of the angle between opposite sides of the wall), or within about 10 degrees of parallel. In specific embodiments, the walls of a conduit are within about 5 degrees of parallel (e.g., within about 3 degrees or 2 degrees of parallel). In some instances, conical or pyramidal conduits are utilized. In such embodiments, the diameters for conduits not having parallel walls refer to the average width or diameter of said conduit. In certain embodiments, the angle of the cone or pyramid is about 15 degrees or less (e.g., the average angle of the conduit sides/walls as measured against a central longitudinal axis or against the conduit side/wall opposite), or about 10 degrees or less. In specific embodiments, the angle of the cone or pyramid is about 5 degrees or less (e.g., about 3 degrees or less). Generally, the first conduit wall 801 and 831 and second conduit wall 805 and 835 having a conduit overlap length 810 and 840, wherein the first conduit is positioned inside the second conduit (for at least a portion of the length of the first and/or second conduit). In some instances, the exterior surface of the first wall and the interior surface of the second wall are separated by a conduit gap 811 and 841. In certain instances, the first outlet end protrudes beyond the second outlet end by a protrusion length 812 and 842. In certain instances, the ratio of the conduit overlap length-to-second diameter is any suitable amount, such as an amount described herein. In further or alternative instances, the ratio of the protrusion length-to-second diameter is any suitable amount, such as an amount described herein, e.g., about 1 or less.

FIG. 8 also illustrates cross-sections of various nozzle components provided herein 850, 860 and 870. Each comprises a first conduit 851, 861 and 871 and second conduit 854, 864, and 874. As discussed herein, in some instances, the first conduit is enclosed along the length of the conduit by a first wall 852, 862 and 872 having an interior and an exterior surface and the second conduit is enclosed along the length of the conduit by a second wall 855, 865 and 875 having an interior and an exterior surface. Generally, the first conduit has any suitable first diameter 853, 863 and 864 and any suitable second diameter 856, 866, and 876. The cross-dimensional shape of the conduit is any suitable shape, and is optionally different at different points along the conduit. In some instances, the cross-sectional shape of the conduit is circular 851/854 and 871/874, elliptical, polygonal 861/864, or the like.

In some instances, coaxially configured nozzles provided herein and coaxial gas controlled electrospraying provided herein comprises providing a first conduit or fluid stock along a first longitudinal axis, and providing a second conduit or gas (e.g., pressurized or high velocity gas) around a second longitudinal axis (e.g., and electrospraying the fluid stock in a process thereof). In specific embodiments, the first and second longitudinal axes are the same. In other embodiments, the first and second longitudinal axes are different. In certain embodiments, the first and second longitudinal axes are within 500 microns, within 100 microns, within 50 microns, or the like of each other. In some embodiments, the first and second longitudinal axes are aligned within 15 degrees, within 10 degrees, within 5 degrees, within 3 degrees, within 1 degree, or the like of each other. For example, FIG. 8 illustrates a cross section of a nozzle component 870 having an inner conduit 871 that is off-center (or does not share a central longitudinal axis) with an outer conduit 874. In some instances, the conduit gap (e.g., measurement between the outer surface of the inner wall and inner surface of the outer wall) is optionally averaged—e.g., determined by halving the difference between the diameter of the inner surface of the outer wall 876 and the diameter of the outer surface of the inner wall 872. In some instances, the smallest distance between the inner surface of the outer wall 876 and the diameter of the outer surface of the inner wall 872 is at least 10% (e.g., at least 25%, at least 50%, or any suitable percentage) of the largest distance between the inner surface of the outer wall 876 and the diameter of the outer surface of the inner wall 872.

In some embodiments, the fluid stock has any suitable viscosity. In addition, the process and systems described herein allow for the electrospray manufacture of depositions using highly viscous (and, e.g., highly loaded) fluid stocks, if desired. For example, in some embodiments, fluid stocks utilized in systems and processes herein have a viscosity of about 0.5 centipoise (cP) or more, e.g., about 5 cP or more, or about 1 cP to about 10 Poise. In more specific embodiments, the viscosity is about 10 cP to about 10 Poise.

In some embodiments, a process herein comprises or a system provided herein is configured to provide a voltage (e.g., $V_{DC}$ or $V_{AC}$) to an electrospray nozzle, such as one provided herein. In specific embodiments, the voltage is provided to the inner conduit (e.g., the walls thereof). In certain embodiments, application of the voltage to the nozzle provides an electric field at the nozzle (e.g., at the outlet of the inner conduit thereof). In some instances, the electric field results in the formation of a "cone" (e.g., Taylor cone) at the nozzle (e.g., at the outlet of the inner conduit thereof), and ultimately a jet and/or a plume. In certain instances, after the formation of a cone, the jet and/or plume is broken up into small and highly charged liquid droplets (or particles), which are dispersed, e.g., due to Coulomb repulsion. As used herein, droplets and particles are referred to interchangeably, wherein the particles comprise droplets (e.g., comprising a liquid medium of the fluid stock) or dried particles (e.g., wherein the liquid medium of the fluid stock has been evaporated during the electrospray process).

In some embodiments, any suitable voltage (e.g., direct or alternating current voltage) is applied (e.g., to the nozzle). In specific embodiments, the voltage applied is about 8 $kV_{DC}$ to about 30 $kV_{DC}$, e.g., about 10 $kV_{DC}$ to about 25 $kV_{DC}$. In other specific embodiments, the voltage applied is about 10 $kV_{AC}$ (e.g., wherein the voltage refers to the root mean square voltage ($V_{rms}$)) or more. In more specific embodiments, the voltage applied is about 20 $kV_{AC}$ or more, e.g., about 30 $kV_{AC}$ or more. In some specific embodiments, the voltage applied is about 10 $kV_{AC}$ to about 25 $kV_{AC}$. In certain embodiments, a power supply system is configured to provide the voltage to the nozzle. In some embodiments, the alternating voltage ($V_{AC}$) has any suitable frequency, such as about 25 Hz or more, e.g., about 50 Hz to about 500 Hz. In more specific embodiments, the frequency is about 60 Hz to about 400 Hz, e.g., about 60 Hz to about 120 Hz, or about 60 Hz to about 250 Hz.

In some embodiments, the voltage applied to the nozzle is about 8 $kV_{DC}$ to about 30 $kV_{DC}$. In specific embodiments, the voltage applied to the nozzle is about 10 $kV_{DC}$ to about 25 $kV_{DC}$. In other embodiments, the voltage applied to the nozzle is about 10 $kV_{AC}$ or more (e.g., about 15 $kV_{AC}$ or more, or about 20 $kV_{AC}$ to about 25 $kV_{AC}$). In some embodiments, the alternating voltage ($V_{AC}$) has a frequency of about 50 Hz to about 350 Hz.

In certain embodiments, a process herein provides a pressurized gas to an outer inlet of an outer conduit of an electrospray nozzle. In some embodiments, the outer conduit is enclosed along the length of the conduit by an outer wall having an interior surface, the outer conduit having an outer conduit inlet and an outer conduit outlet. In some instances, the pressurized gas is provided from a pressurized canister, by a pump, or by any other suitable mechanism. Generally, providing pressurized gas to the inlet of the outer channel results in a high velocity gas being discharged from the outlet of the outer channel of the electrospray nozzle.

Any suitable gas pressure or gas velocity is optionally utilized in processes and/or systems herein. In specific embodiments, the gas pressure applied (e.g., to the inlet of the outer channel) is about 15 psi or more. In more specific embodiments, the gas pressure is about 20 psi or more, about 25 psi or more, about 35 psi or more, about 45 psi or more, or any other suitable pressure. In certain embodiments, the velocity of the gas at the nozzle (e.g., the outlet of the outer channel thereof) is about 0.5 m/s or more, about 1 m/s or more, about 5 m/s or more, about 10 m/s or more, about 25 m/s or more. In more specific embodiments, the velocity is about 50 m/s or more. In still more specific embodiments, the velocity is about 100 m/s or more, e.g., about 200 m/s or more, or about 300 m/s. In certain embodiments, the gas is any suitable gas, such as comprising air, oxygen, nitrogen, argon, hydrogen, or a combination thereof.

In certain embodiments, the inner and outer conduits have any suitable diameter. In some embodiments, the diameter of the outer conduit is about 0.1 mm to about 10 mm, e.g., about 1 mm to about 10 mm. In more specific embodiments, the diameter of the outer conduit is about 0.1 mm to about 5 mm, e.g., about 1 mm to about 3 mm. In certain embodiments, the diameter of the inner conduit is about 0.01 mm to about 8 mm, e.g., about 0.5 mm to about 5 mm, e.g., about 1 mm to about 4 mm. In systems using $V_{AC}$, even larger diameters (e.g., with inner diameters of up to 2.5 cm, or more, with outer diameters being about 1.05 times or more of the inner diameter, about 1.1 times or more of the inner diameter, or the like) are optionally utilized. Generally, as discussed herein, the inner conduit is configured inside the outer conduit, preferably along an identical axis, but slight offset configurations are also considered to be within the scope of the instant disclosure. In some embodiments, an outer wall surrounds the outer conduit, the outer wall having an interior surface (e.g., defining the outer conduit). In some embodiments, the average distance between the exterior surface of the inner wall and the interior surface of the outer wall (referred to herein as the conduit gap) is any suitable distance. In specific instances, the conduit gap is about 0.1 mm or more, e.g., about 0.5 mm or more, or about 1 mm or more. In certain embodiments, the gap is small enough to facilitate a high velocity gas at the nozzle and to facilitate sufficient disruption of the charged fluid (jet) ejected from the nozzle (e.g., such as to provide sufficiently small droplet sizes and sufficiently uniform inclusion dispersion in the plume and on the collection substrate). In some embodiments, the conduit gap is about 0.01 mm to about 30 mm, such as about 0.05 mm to about 20 mm, about 0.1 mm to about 10 mm, or the like. In more specific embodiments, the conduit gap is about 0.5 mm to about 5 mm. In some embodiments, the inner conduit and the outer conduit run along an identical or similar longitudinal axis, the length of which both the inner and outer conduit running along that axis being the conduit overlap length. In some embodiments, the inner conduit length, the outer conduit length, and the conduit overlap length is about 0.1 mm or more, e.g., about 0.1 mm to about 100 mm, or more. In specific embodiments, the inner conduit length, the outer conduit length, and the conduit overlap length is about 0.5 mm to about 100 mm, e.g., about 1 mm to about 100 mm, about 1 mm to about 50 mm, about 1 mm to about 20 mm, or the like. In certain embodiments, the ratio of the conduit overlap length to the first diameter being about 1 to about 100 (e.g., about 10), or about 0.1 to about 10, e.g., about 0.1 to about 5 or about 1 to about 10. In some embodiments, the inner conduit is longer than the outer conduit, the inner conduit protruding beyond the outer conduit, e.g., as illustrated in FIG. 8. In some embodiments, the protrusion length is about −0.5 mm to about 1.5 mm, e.g., about 0 mm to about 1.5 mm, or about 0 mm.

In certain embodiments, processes herein comprise collecting and/or systems herein are configured to collect nanoscale particles and/or droplets of the plume onto a substrate. In specific embodiments, collection of these small particles/droplets allows for the formation of a uniform deposition on the substrate. Further, given the small size of the particles and/or droplets formed by systems and processes described herein, it is possible to form depositions having thin and/or uniform layers, and to have good control of the thickness thereof. In some embodiments, the substrate is positioned opposite the outlet of the nozzle.

As discussed herein, processes and systems described herein allow for good control of the thickness of films or depositions provided for and described herein. In some embodiments, a film or deposition provided herein is a thin layer film or deposition, e.g., having an average thickness of about 1 mm or less, e.g., about 1 micron to about 1 mm. In specific embodiments, the deposition has a thickness of about 500 micron or less, e.g., about 1 micron to about 500 micron, about 1 micron to about 250 micron, or about 10 micron to about 200 micron, about 20 micron or less, about 0.5 micron to about 20 micron, or the like. Further, the processes and systems described herein not only allow for the manufacture of thin layer depositions, but of highly uniform thin layer films or depositions. In some embodiments, the films or depositions provided herein have an average thickness, wherein the thickness variation is less than 50% of the average thickness, e.g., less than 30% of the average thickness, or less than 20% of the average thickness.

Figure 19:
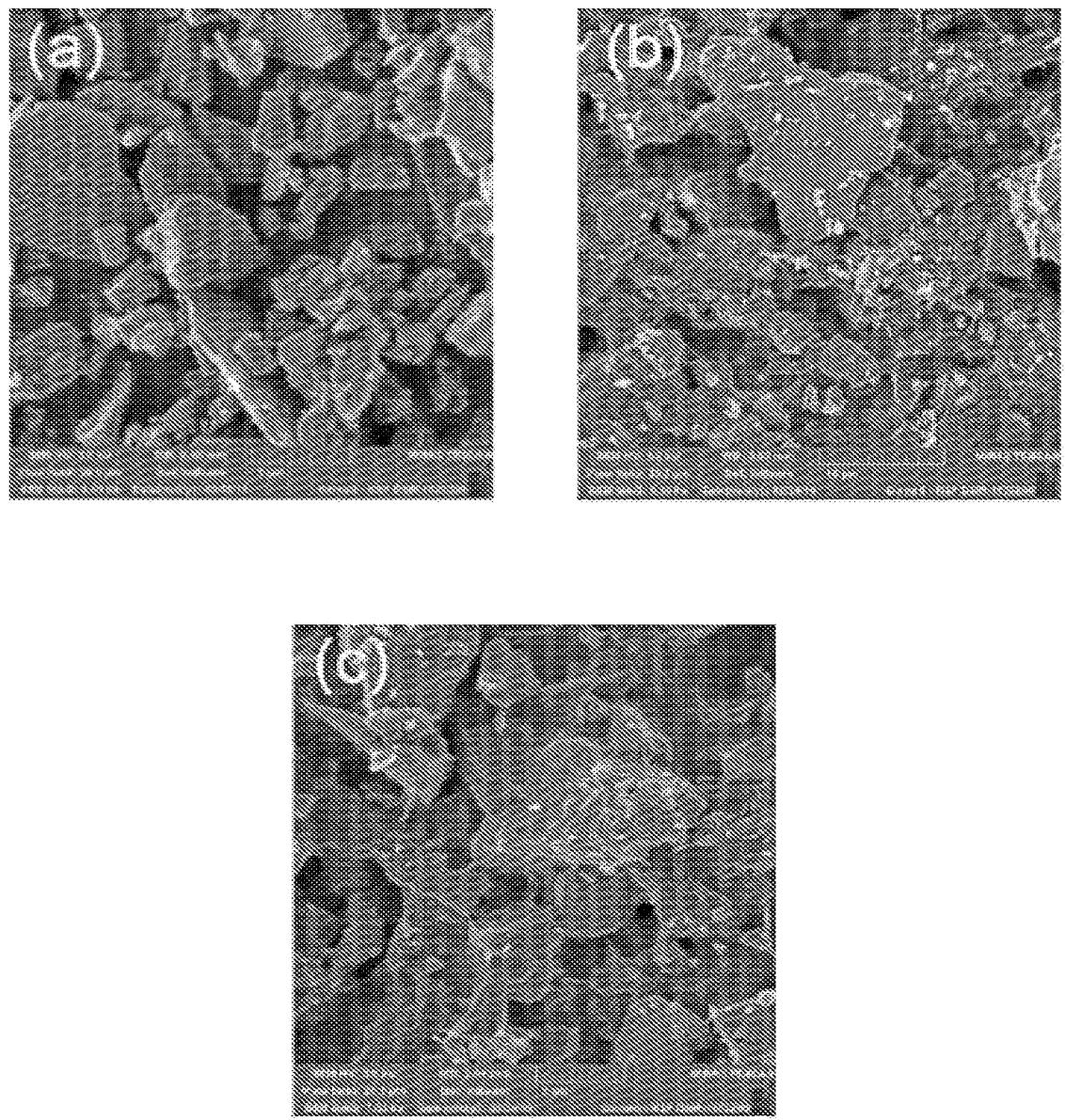
FIG. 19 illustrates exemplary microscaled particles comprising active material in (a) pristine form, as well as (b) and (c) covered by carbon (at various zoom levels).
Figure 20:
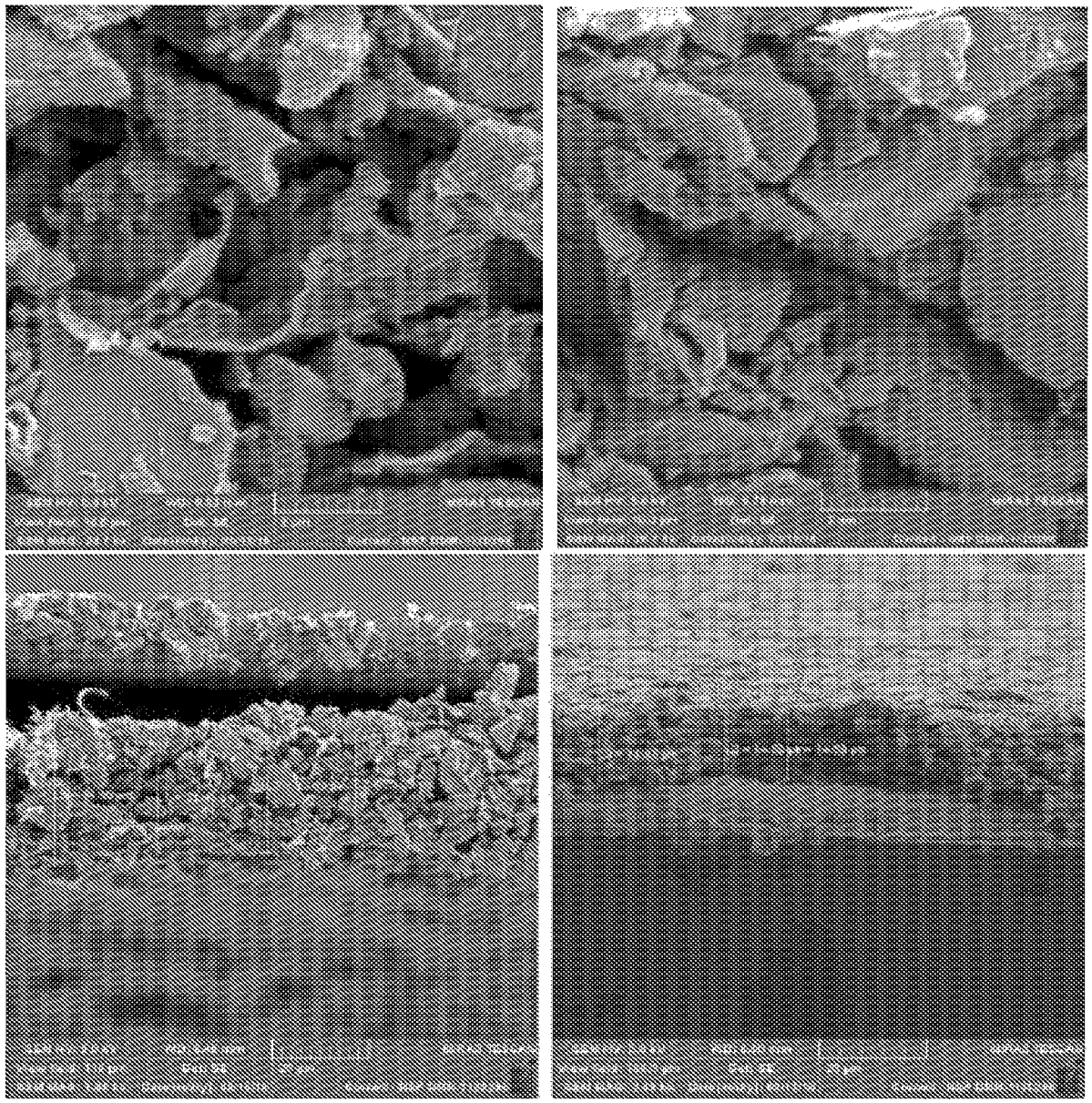
FIG. 20 illustrates exemplary depositions (electrodes) provided herein using microstructured active materials in combination with carbon provided herein (top left: more zoomed view of non-compressed deposition; top right: more zoomed view of compressed deposition; bottom left: less zoomed view of non-compressed deposition; bottom right: less zoomed view of compressed deposition).
Figure 21:
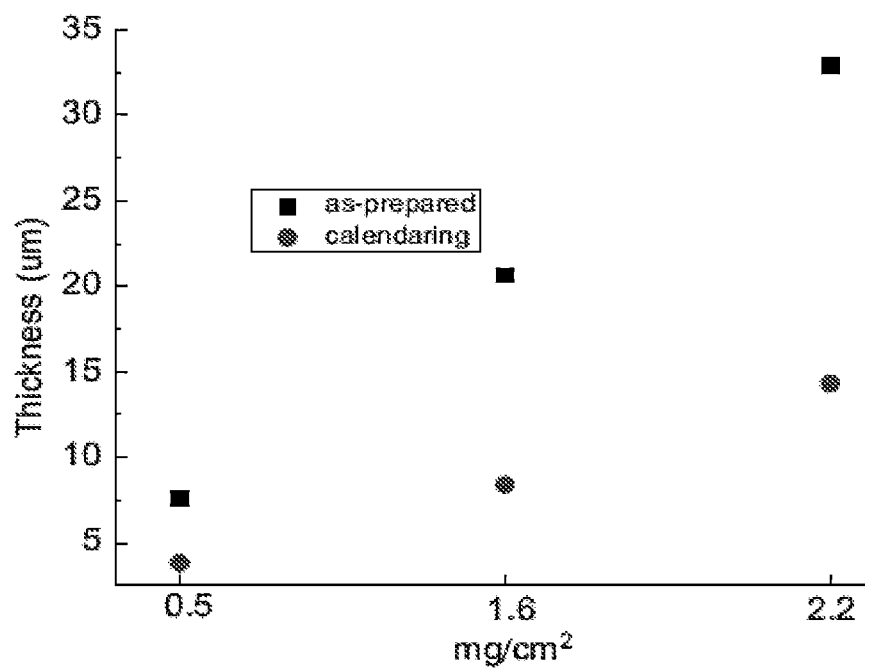
FIG. 21 demonstrates that compression of the deposition is able to greatly decrease the thickness of the electrode depositions (e.g., decreasing the thickness of the deposition by up to 2× or more).

In certain embodiments, a process provided herein further comprises compressing (e.g., calendering or otherwise compressing) a film or deposition (e.g., an electrosprayed deposition) provided herein. In certain embodiments, compression of the deposition provides increased electrode density and/or a thinner electrode, which, in some instances, provides improved volumetric energy density of the electrode. In certain embodiments, the volumetric energy density of the electrode is improved by at least 1.1 times, e.g., about 1.2× or more, about 1.25× or more, or about 1.5× or more, such as up to about 2× or more. In certain embodiments, volumetric energy density (of the anode) provided herein is about 500 mAh/cubic cm (cc) or more, such as about 750 mAh/cc or more, about 1000 mAh/cc or more, or the like. In specific embodiments, such a compression step is utilized when electrode active material (e.g., comprising SiOx) structures are micron scale (e.g., that is about 1 micron or greater, such as about 2 micron or greater, or about 2 micron to about 100 micron, or as otherwise described herein) dimension (or, e.g., an average dimension). In certain instances, compression of electrode materials comprising active electrode materials of the micron scale are particularly useful in increasing density of the material as the micron scaled structures can leave larger voids during deposition (e.g., relative to nanoscaled structures). In some embodiments, the film or deposition is compressed to a thickness about 90% or less, about 80% or less, about 70% or less, about 60% or less, or about 50% or less of the pre-compressed deposition thickness. FIG. 20 illustrates exemplary depositions provided herein using microstructured active materials in combination with carbon provided herein. As similarly illustrated in FIG. 19, the carbon component provides good coverage of the particles illustrated in FIG. 20. As can be seen in FIG. 20, in some instances, when a graphene component has an average dimension (e.g., average of length and/or width) that is closer in size to the average dimension of the particles, the average number of particles enclosed within a carbon envelope is decreased (e.g., as compared to the relatively larger graphene components of FIG. 19). As illustrated in the zoomed in view on the top left, the as prepared depositions are not optimally packed, leaving a number of voids. The zoomed in view of the compressed depositions (top right) demonstrates fewer voids and increased density of the deposition upon compression. Similarly, compressed depositions (bottom right) can be seen to have increased density relative to the as prepared depositions (bottom left). FIG. 21 demonstrates that compression of the deposition is able to greatly decrease the thickness of the electrode depositions (e.g., decreasing the thickness of the deposition by up to 2× or more).

Further, in some embodiments, it is desirable that any additives in the fluid stock are dissolved and/or well dispersed prior to electrospray, e.g., in order to minimize clogging of the electrospray nozzle (and/or other system components), ensure good uniformity of dispersion of any inclusions in the resulting deposition, and/or the like. In specific embodiments, the fluid stock is agitated prior to being provided to the nozzle (e.g., inner conduit inlet thereof), or the system is configured to agitate a fluid stock prior to being provided to the nozzle (e.g., by providing a mechanical stirrer or sonication system associated with a fluid stock reservoir, e.g., which is fluidly connected to the inlet of the inner conduit of an electrospray nozzle provided herein).

In alternative embodiments, an electrode and/or electrode material, such as comprising the component parts described herein, is optionally prepared by steps comprising electrospraying a fluid stock comprising a liquid medium and a nanostructured inclusion comprising an electrode active material, followed by electrospraying a second fluid stock comprising a liquid medium and a carbon inclusion (e.g., nanostructured carbon inclusion, such as a graphene component described herein). In some embodiments, the process is optionally repeated until a desired loading and/or thickness is achieved. Further, in some embodiments, an electrode and/or electrode material, such as provided herein, is optionally prepared by steps comprising electrospraying a fluid stock comprising a liquid medium, a nanostructured inclusion comprising an electrode active material, and a carbon inclusion (e.g., nanostructured carbon inclusion, such as a graphene component described herein), followed by electrospraying a second fluid stock comprising a liquid medium and a carbon inclusion (e.g., nanostructured carbon inclusion, such as a graphene component described herein). In some instances, the later process of electrospraying the second fluid stock facilitates securing in increased amount of active electrode material on the substrate (e.g., current collector), which may, in some instances, improve performance of the electrode and/or electrode material, such as by reducing capacity loss upon cycling. Such fluid stocks comprise any suitable components, concentrations, etc., such as described for the various fluid stocks described herein.

In certain embodiments, the substrate is any suitable substrate (e.g., a grounded substrate, or a substrate located between the electrospray nozzle and a grounded plate). In some embodiments, collected depositions are optionally removed from the substrate to provide a powdered material. In certain embodiments, the deposition is optionally removed prior to or following reductive (e.g., thermal reductive) treatment (e.g., following which, a powdered electrode material is provided). In some embodiments, such as wherein an electrode material is manufactured directly on a current collector, the substrate is a current collector material (e.g., a metal, such as copper or aluminum, foil or sheet). In such cases, any reductive (e.g., thermal reductive) treatment is optionally performed without removing the deposited material from the substrate.

Provided in certain embodiments herein is an electrode or electrode material comprising a carbon inclusion and an active material inclusion. In specific embodiments, the carbon inclusion is a two dimensional carbon inclusion or a graphene component, such as described herein. In certain embodiments, an active material inclusion is a structure comprising an active electrode material, such as micro- or nano-structures comprising silicon and/or a silicon oxide (SiOx), such as described herein.

In certain embodiments, the carbon inclusion has dimensions such as described herein. In specific embodiments, the carbon inclusion is a nanostructured carbon having a nanoscale (e.g., less than 2 micron, less than 1 micron, or less than 200 nm) structure in any one or more dimension, such as nanostructured fibers, particles, sheets, rods, and/or the like). In specific embodiments, the active electrode material comprises a silicon material (e.g., an active electrode, such as a negative electrode in a lithium ion battery, material).

In some instances, material or films/depositions (e.g., electrode materials deposited on a current collector) provided herein are high density (e.g., about 0.4 g/cm$^3$ or more, about 0.5 g/cm$^3$ or more, such as about 0.7 g/cm$^3$ to about 2 g/cm$^3$) (e.g., about 1 g/cm$^3$ or more, about 1.5 g/cm$^3$ or more, or the like), flexible, and/or thin layer films or depositions. As discussed herein, in some embodiments, calendered films are utilized, providing further increased density of the films. In certain embodiments, such materials or films/depositions are suitable for any number of energy storage applications, including, e.g., as negative electrodes in lithium ion batteries.

In various embodiments, the electrode (e.g., electrode deposition) comprises a carbon material and a silicon material. In specific embodiments, the (e.g., nanostructured) carbon material comprises a graphene component, structure or analog (e.g., graphene (e.g., graphene sheets and/or graphene nanoribbons), graphene oxide, reduced graphene oxide, or the like).

In some embodiments, a (e.g., micro- or nano-structured) silicon material is dispersed in and/or on a carbon (e.g., graphene) matrix, web (e.g., wherein the graphene matrix or web comprises a graphene structure or analog as described herein), and/or envelopes. In certain embodiments, the carbon web (e.g., comprising envelopes thereof) is about 25 wt. % or more (e.g., about 50 wt % or more, about 60 wt % or more, about 75 wt % or more, about 85 wt % or more, about 90 wt % or more, or about 95 wt % or more) graphene component. In certain embodiments, the silicon material comprises a plurality of nanostructures (e.g., such nanostructures comprising a nanoscale (e.g., having an average dimension of less than 2 micron, or less than 1 micron) structure in any one or more dimension, such as nanostructured fibers, particles, sheets, rods, and/or the like) comprising a silicon material. In some embodiments, the silicon material comprises a plurality of larger structures, such as microstructures (e.g., having an average dimension of less than 100 micron, less than 50 micron, or less than 30 micron, preferably less than 25 micron, less than 20 micron, less than 15 micron, less than 10 micron, or the like, such as down to about 200 nm). Other details of the suitable electrode active materials and/or silicon-containing or based materials, inclusions, or structures are as described herein. Further, in some instances, such as wherein larger structures are utilized, larger droplets or particles are necessarily formed upon electrospray according to the processes described herein.

Figure 25:
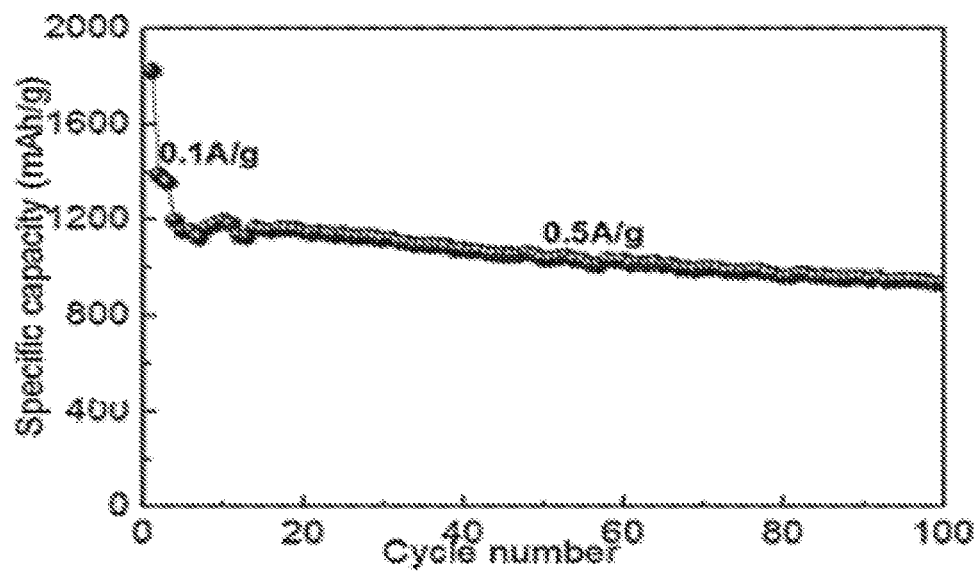
FIG. 25 illustrates the capacity of exemplary half cells using SiOx inclusions in the anode during cycling.

In certain embodiments, silicon materials included herein include a silicon material that is active in an electrode, such as a negative electrode in a lithium ion battery, such as elemental silicon, and/or a silicon oxide (e.g., having a formula: SiOx, wherein 0≤x<2, e.g., 0≤x≤1.5, 0<x<1, or x≈0). In specific embodiments, silicon materials and/or inclusions included in the compositions, materials, and electrodes described herein comprise silicon (elemental silicon), such as crystalline silicon. In some embodiments, silicon-containing particles provided herein comprise 40 wt. % or more electrode active silicon material (e.g., SiOx, e.g., wherein 0≤x<2). In specific embodiments, silicon-containing particles provided herein comprise 50 wt. % (e.g., 60 wt % or more, 70 wt. % or more, 80 wt % or more, or the like) or more electrode active silicon material (e.g., SiOx). In some embodiments, silicon-containing particles provided herein comprise 40 wt. % or more electrode active silicon (Si). In specific embodiments, silicon-containing particles provided herein comprise 50 wt. % (e.g., 60 wt % or more, 70 wt. % or more, about 70 wt. % to about 80 wt %, 80 wt % or more, or the like) or more silicon (Si). In certain embodiments, higher amounts of silicon (Si) and lesser amounts of SiOx (wherein 0<x≤2) is desired, such as to minimize impedance of lithiation. FIG. 25 illustrates the capacity of exemplary half cells using SiOx inclusions in the anode during cycling.

Provided in certain embodiments herein are compositions (or materials) comprising a plurality of active electrode inclusions (e.g., silicon-containing particles) and a plurality of carbon inclusions (e.g., graphene components, such as a reduced graphene oxide component, such as rGO). In certain embodiments, the carbon inclusions (e.g., graphene components) collective form a web, a plurality of carbon envelopes (e.g., graphene envelopes), or a web comprising a plurality of carbon envelopes. In certain embodiments, each envelope comprises one or more (e.g., at least 2) carbon inclusions (e.g., graphene components, such as a reduced graphene oxide component, such as rGO). In general, each envelope comprises an internal surface and an external surface, the internal surface defining an envelope pocket. In some instances, individual carbon inclusions optionally form all or part of one or more envelope, such as illustrated in FIG. 4. In certain instances, the external surface of one envelope forms all or part of the internal surface of a second envelope. In various embodiments, the web and/or envelopes taken together with active electrode materials comprise a plurality of composite domains within the composition or material. In specific embodiments, composite domains comprise an envelope and active material (e.g., inclusions, such as particles thereof).

In specific embodiments provided herein is a composition or material comprising a graphene component, such as an oxidized graphene component (e.g., graphene oxide). In certain embodiments, a composition or material herein comprises a plurality of graphene envelopes, the graphene envelopes comprising one or more oxidized graphene components (e.g., graphene oxide). In some embodiments, such compositions or materials are precursor materials to electrode materials described herein. In certain embodiments, such precursor materials are converted to electrode materials via reductive reaction conditions, such as through thermal, chemical, or other processes described herein. In specific embodiments, the oxidized graphene component is a graphene component functionalized with oxygen, such as with carbonyl groups, carboxyl groups (e.g., carboxylic acid groups, carboxylate groups, COOR groups, such as wherein R is a C1-C6 alkyl, or the like), —OH groups, epoxide groups, and/or the like. In certain embodiments, the oxidized graphene component (or graphene oxide) comprises about 60% or more carbon (e.g., 60% to 99%). In more specific embodiments, the oxidized graphene component comprises about 60 wt. % to about 90 wt. % carbon, or about 60 wt. % to about 80 wt. % carbon. In further or alternative specific embodiments, the oxidized graphene component comprises about 40 wt. % oxygen or less, such as about 10 wt. % oxygen to about 40 wt. % oxygen, about 35 wt. % oxygen or less, about 1 wt. % to 35 wt. % oxygen, or the like.

In some embodiments, the weight ratio of active electrode material or silicon-containing particles to carbon inclusion of compositions or materials (e.g., precursor materials, such as comprising graphene oxide) is about 1:10 to about 20:1. In certain embodiments, the weight ratio of active electrode material or silicon-containing particles to carbon inclusion of about 1:4 to about 10:1, such as about 1:2 to about 5:1, or about 1:1 to about 3:1.

In other specific embodiments provided herein is a composition or material comprising a graphene component, such as an oxidized graphene component that has been reduced (e.g., reduced graphene oxide). In certain embodiments, a composition or material herein comprises a plurality of graphene envelopes, the graphene envelopes comprising one or more (oxidized or reduced oxidized) graphene components (e.g., reduced graphene oxide). In some embodiments, such compositions or materials are electrode materials prepared from precursor materials described herein. In certain embodiments, such electrode materials are converted from precursor materials via reductive reaction conditions, such as through thermal, chemical, or other processes described herein. In specific embodiments, the (e.g., reduced oxidized) graphene component is a graphene component functionalized with oxygen, such as with carbonyl groups, carboxyl groups (e.g., carboxylic acid groups, carboxylate groups, COOR groups, such as wherein R is a C1-C6 alkyl, or the like), —OH groups, epoxide groups, and/or the like. While oxidized graphene components generally comprise less oxidation that oxidized graphene components, residual oxidation and defects remain present in some instances. In certain embodiments, the graphene component (e.g., reduced graphene oxide) comprises about 60% or more carbon (e.g., 60% to 99%), such as about 70 wt. % or greater, about 75 wt. % or more, about 80 wt. % or greater, about 85 wt. % or greater, about 90 wt. % or greater, or about 95 wt. % or greater (e.g., up to about 99 wt. % or more). In certain embodiments, the graphene component (e.g., rGO) comprises about 35 wt. % or less (e.g., 0.1 wt. % to 35 wt. %) oxygen, e.g., about 25 wt. % or less (e.g., 0.1 wt. % to 25 wt. %) oxygen, or about, about 20 wt. % or less, about 15 wt. % or less, about 10 wt. % or less (e.g., down to about 0.01 wt. %, down to about 0.1 wt. %, down to about 1 wt. % or the like) oxygen. In specific embodiments, the graphene component (e.g., rGO) comprises about 0.1 wt. % to about 10 wt. % oxygen, e.g., about 4 wt. % to about 9 wt. %, about 5 wt, % to about 8 wt, %, or the like.

In certain embodiments, e.g., wherein a carbon inclusion material (e.g., graphene component) is reduced, higher ratios of active electrode material or silicon-containing particles to carbon inclusion are contemplated for compositions, materials, and electrodes described herein. In some embodiments, the weight ratio of active electrode material or silicon-containing particles to carbon inclusion of compositions or materials (e.g., electrode materials, such as comprising reduced graphene oxide) is about 1:5 to about 20:1. In certain embodiments, the weight ratio of active electrode material or silicon-containing particles to carbon inclusion of about 1:2 to about 20:1, such as about 1:1 to about 10:1, or about 2:1 to about 9:1.

In certain embodiments, envelopes of compositions, materials, and electrodes described herein comprise any suitable number of active material inclusions (or precursors thereof) in the pockets thereof. In some embodiments, individual envelopes comprise one or more inclusions therein. In specific embodiments, individual envelopes comprise 2 or more (e.g., 2-10, 2-5, or the like) inclusions therein. In certain instances, such as wherein larger inclusions (e.g., micro-structured inclusions, such as having a particle size (or average dimension) of greater than about 200 nm on average, about 1 micron to about 10 micron, or the like are utilized, fewer inclusions are found within the envelope pockets, such as about 1 to about 10, or about 2 to about 5 inclusions on average, or 1 to 10, e.g., 2 to 5, in individual envelopes. In some instances, such as wherein smaller inclusions (e.g., nano-structured inclusions, such as having one or more, or an average dimension, of less than 200 nm, more inclusions may be found within the envelope pockets, such as about 1 to about 1000 on average (e.g., about 50 to about 200, such as about 100), or 1 to 1000 (e.g., 50 to 20, such as about 100) in individual envelopes.

Also provided in some embodiments herein are articles of manufacture comprising a silicon/carbon deposition described herein, e.g., a thin-layered deposition, manufactured or capable of being manufactured according to the processes described herein. In certain embodiments, provided herein is a substrate, such as a conductive substrate (e.g., current collector), comprising an electrode or deposition described herein on the surface thereof. In addition, provided herein are devices, such as energy storage devices, including, e.g., batteries, such as lithium ion batteries, comprising such materials described herein.

In certain embodiments, provided herein is an electrode (or, e.g., a lithium ion battery comprising such an electrode) comprising a carbon web securing a plurality of nanostructured inclusions, the nanostructured inclusions comprising an electrode active material (e.g., a negative electrode active material, such as a silicon material described herein). FIG. 1 illustrates an electrode deposition 101 on a current collector 104. As illustrated, the electrode may comprise carbon web 102 securing a plurality of electrode active nanostructures 103. As illustrated in FIG. 1, in some instances, the carbon material 102, such as carbon sheets or ribbons (e.g., graphene, graphene oxide (GO), reduced graphene oxide (rGO), or other graphene analogs), wrap and secure the electrode active nanostructures 103. In some instances, the carbon material 102 securing the electrode active material 103 functions to protect the electrode active material 103 from interactions with electrolyte, from pulverization, and/or or the like. In addition, in some instances, such as wherein low electron conductivity electrode active materials are utilized, the carbon material 102 facilitates electron conductivity in the electrode.

Figure 28:
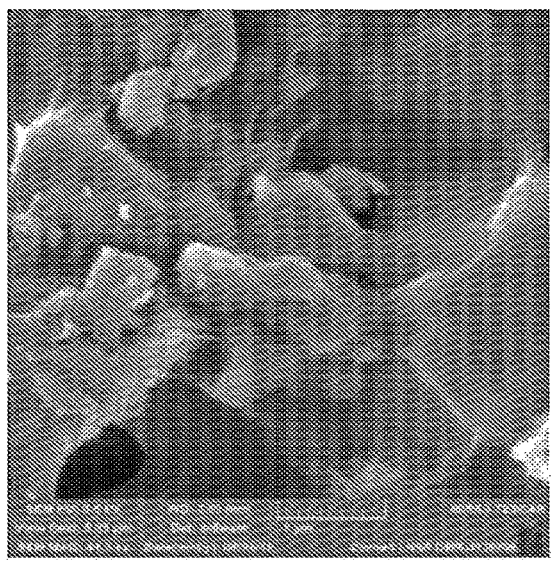
FIG. 28 illustrates SEM images that show good coverage of the silicon microparticles using larger graphene component (at varying zoom levels).
Figure 28:
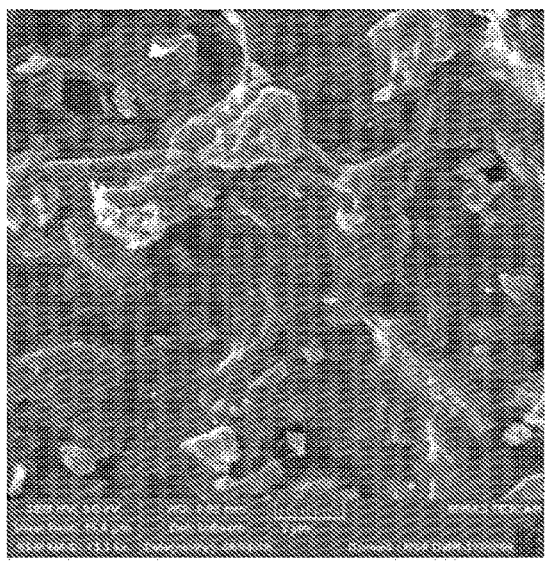
Figure 29:
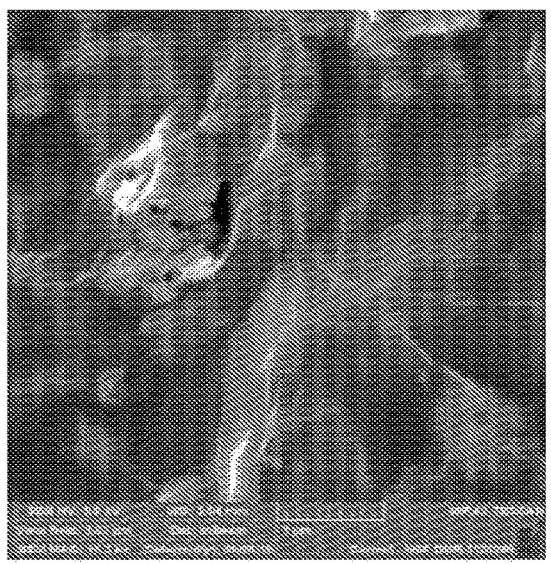
FIG. 29 illustrates SEM images that show poor coverage of the silicon microparticles using smaller graphene components (at varying zoom levels).
Figure 29:
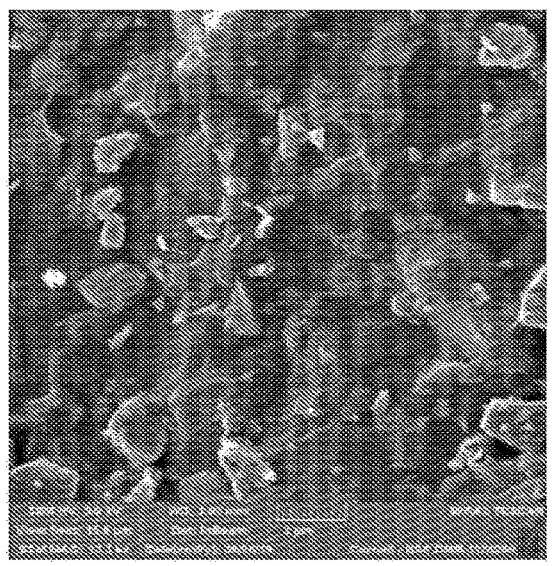

In some embodiments, the active electrode material is included in the form of or as a part of a particulate inclusion (e.g., nanoscaled—such as less than about 2 micron in at least one dimension—particulate (e.g., nanoparticles being less than about 2 micron in all dimensions, and nanorods and nanofibers being less than about 2 micron in diameter and greater or less than about 2 micron in a second dimension); or other small structured particle, such as having an average dimension as described herein, such as less than 30 micron, less than 20 micron, less than 15 micron, or the like (e.g., particles, rods or other structure configuration). In specific embodiments, nano-inclusions (e.g., nanoparticles) have nanoscale morphologies that are about 1 micron or less, about 500 nm or less, about 250 nm or less, or about 100 nm or less. In more specific embodiments, at least one dimension (e.g., all dimensions for a nanoparticle) is about 50 nm or less, or about 25 nm or less or about 10 nm or less, or about 5 nm to about 10 nm, or any other suitable size. In some specific embodiments, the particulate inclusion is in the form of a high aspect ratio structures, such as a nanorod or nanofiber. In specific embodiments, the high aspect structures have a first dimension that is about 2 microns or less, such as about 1 micron or less, about 0.5 micron or less, or about 0.1 micron to about 0.2 micron. In specific embodiments, such high aspect ratio structures have an aspect ratio of about 10 or more, about 20 or more, about 25 or more, or about 50 or more, such as up to about 250. In certain embodiments, the second dimension of the high aspect ratio structures is about 50 micron or less, such as about 1 micron to about 50 micron, about 2 micron to about 25 micron, or the like. FIG. 19 illustrates microscaled particles comprising active material (e.g., SiOx) in (a) pristine form, as well as (b) and (c) covered by carbon (e.g., graphene oxide) (at various zoom levels). As can be seen in the image, very good coverage of the particles with the carbon is achieved. Further, as can be seen in FIG. 19, the use of graphene components that have an average dimension (length and/or width) of greater than the average or smallest dimension (e.g., diameter or length, width, height) of the particle provides good coverage for multiple particles (e.g., provides a carbon envelope enclosing multiple particles). Further, FIG. 28 illustrates good coverage of the silicon microparticles using larger graphene component (at varying zoom levels), whereas FIG. 29 illustrates poor coverage of the silicon microparticles using the smaller graphene components (at varying zoom levels). As illustrated in FIG. 29, several silicon microparticle components remain unprotected by graphene component (some of which are denoted within the circled regions) when smaller graphene components are utilized.

In certain embodiments, the active electrode material comprises a high energy capacity material (e.g., having a capacity of greater than graphite, such as >400 mAh/g, >500 mAh/g, >750 mAh/g, >1,000 mAh/g, or more). In specific embodiments, the active electrode material is not graphite (non-graphitic). In some embodiments, the active electrode material comprises a material having high volume expansion upon lithiation (e.g., >150%, or >200%). In some instances, the active electrode material comprises Si, Ge, Sn, Co, Cu, Fe, any oxidation state thereof, or any combination thereof. In certain embodiments, the anode or high energy capacity material comprises Si, Ge, Sn, Al, an oxide thereof, a carbide thereof, or an alloy thereof. In specific embodiments, the anode or high energy capacity material comprises SiOx (e.g., wherein $0 \leq x \leq 2$, or $0 < x < 1.5$), $SiO_aN_bC_c$ (e.g., wherein $0 \leq a \leq 2$, $0 \leq b \leq 4/3$, and $0 \leq c \leq 1$, and, e.g., wherein $a/2+3b/4+c$ is about 1 or less), Sn, SnOx (e.g., wherein $0 \leq x \leq 2$, or $0 < x < 1.5$), Si, Al, Ge, or an Si alloy.

In certain embodiments, the carbon material is any suitable carbon material, such as a nanostructured carbon material. In some instances, the carbon material is a carbon sheet, a carbon ribbon, or the like. In specific instances, the carbon material is or comprises a graphene component, such as graphene, graphene oxide, reduced graphene oxide, or a combination thereof. In specific embodiments, the graphene oxide is a graphene functionalized with oxygen, such as with carbonyl groups, carboxyl groups (e.g., carboxylic acid groups, carboxylate groups, COOR groups, such as wherein R is a C1-C6 alkyl, or the like), —OH groups, epoxide groups, and/or the like. In some embodiments, reduced graphene oxide is a graphene (pristine or defective, such as comprising one or more opened internal rings, or the like) that is optionally functionalized with oxygen, such as described for graphene oxides. Generally, reduced graphene oxide rGO is recognized as a graphene oxide material that has been partially or wholly reduced, such as by thermal (e.g., heating, such as to 200° C. or more), chemical (e.g., by treating with hydrazine, hydrogen plasma, urea, or the like), or other (e.g., using strong pulse light) mechanisms. In various embodiments, graphene oxide, or reduced graphene oxide provided herein comprises, e.g., about 60% or more carbon (e.g., 60% to 99%) and about 35% or less (e.g., 1% to 35%) oxygen, e.g., about 75% or more (e.g., 75% to 99%) carbon and about 25% or less (e.g., 1% to 25%) oxygen (e.g., as a weight %). In some embodiments, the total percentage of carbon and oxygen does not constitute 100% of the graphene analog, with the additional mass comprising any suitable atoms, such as hydrogen (and/or, e.g., nitrogen). In certain embodiments, a graphene oxide is utilized in the fluid stock and, following electrospraying of the fluid stock, the collected deposition is thermally treated (e.g., to a temperature of about 100° C. or more, e.g., 150° C. to 400° C., about 150° C. to about 350° C., about 200° C. to about 300° C., about 200° C., about 250° C., or any suitable temperature), such as to at least partially reduce the graphene oxide (i.e., decrease the percentage of oxygen relative to carbon in the graphene oxide). In various other embodiments, any other suitable technique is optionally utilized to reduce the graphene oxide following deposition. In some instances, reduction of the graphene oxide following deposition improve the performance characteristics of the material (e.g., by, in some instances, increasing conductivity of the carbon inclusion). For example, various figures provided herein illustrate that in some instances, materials provided herein demonstrate improved performance (e.g., specific capacity) characteristics with reduced graphene oxide (rGO), relative to graphene oxide (GO). However, in some instances, such as wherein water is utilized as the liquid medium of the fluid stock, it is preferred to utilize graphene oxide (GO), e.g., for its improved solubility/dispersability and facility in processing.

Figure 23:
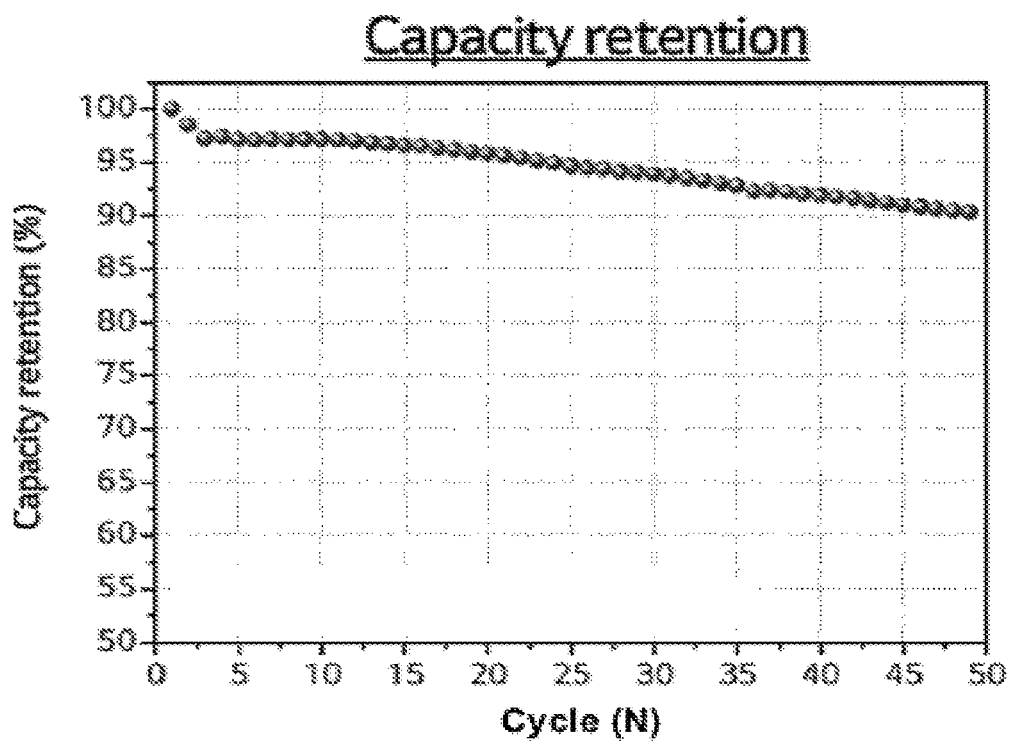
FIG. 23 illustrates the capacity retention of half cells prepared using exemplary anode materials described herein.
Figure 24:
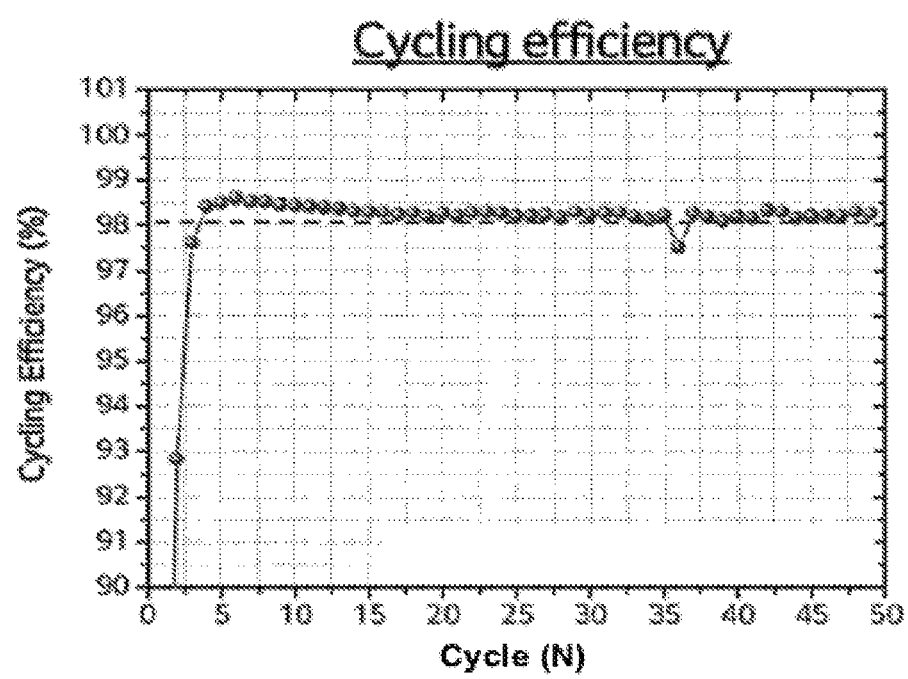
FIG. 24 illustrates the cycling efficiencies of half cells prepared using exemplary anode materials described herein.

In some embodiments, an inclusion (e.g., in the fluid stock, droplets, and/or electrode or deposition) comprises a composite of an active electrode material. In specific embodiments the inclusion further comprises a second material (e.g., carbon, ceramic, or the like). In some embodiments, the inclusions are nanoscale inclusions, such as nanofibers, nanorods, or nanoparticles. In specific embodiments, the inclusion is a composite (e.g., nanofiber) comprising carbon and a silicon material (e.g., having the formula SiOx, wherein 0≤x≤2, or other active silicon material, such as described herein). In certain embodiments, such materials are optionally manufactured according to any suitable technique, with exemplary techniques being described in U.S. patent application Ser. No. 14/382,423, entitled "Silicon Nanocomposite Nanofibers," U.S. patent application Ser. No. 14/457,994, entitled "Carbon and Carbon Precursors in Nanofibers," and U.S. Patent Application No. 62/111,908, entitled "Silicon-Carbon Nanostructured Composites," all of which are incorporated herein for the disclosure of such materials and methods of manufacturing such materials. For example, in certain embodiments, nanostructures comprising electrode active material provided herein are manufactured by dispersing silicon nanoparticles (i.e., nanoparticles comprising silicon, and, in some instances, oxides thereof) in a fluid stock (e.g., with a polymer and liquid medium), electrospinning (e.g., gas-assisted electrospinning) the fluid stock, carbonizing the product (e.g., nanofibers) thereof. In some embodiments, the inclusion is a carbon nanostructure (e.g., a carbon nanotube or a hollow carbon nanofiber) infused with a silicon material described herein (e.g., silicon or an SiOx material described herein). FIG. 23 illustrates the capacity retention and FIG. 24 illustrates the cycling efficiencies of half cells prepared using exemplary silicon-carbon composite fiber materials as the active electrode containing inclusion material in the anode materials described herein.

Figure 17:
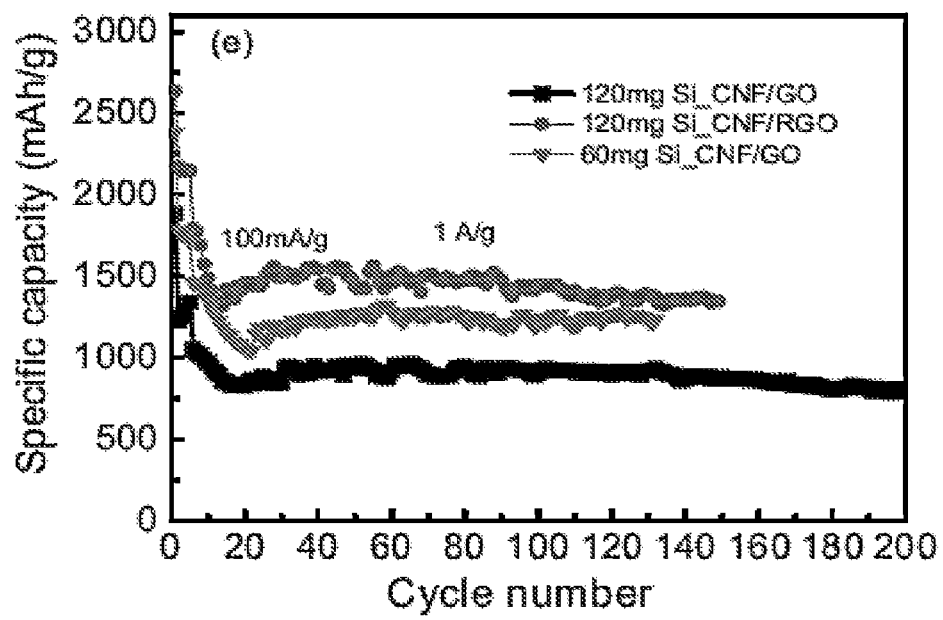
FIG. 17 illustrates exemplary specific capacity data for various exemplary electrodes provided herein comprising composite nanofibers (comprising a carbon matrix with silicon nanoparticles embedded therein) secured on a current collector with a carbon web comprising a graphene component

FIG. 6 illustrates the inclusion of composite nanostructures (e.g., nanofibers) 603 comprising a matrix of carbon 606, with silicon inclusions (e.g., nanoparticles) 607 embedded therein, in a process and electrode/deposition 601 provided herein. As illustrated, a carbon web (e.g., comprising a carbon sheet) 602 secures the nanostructured inclusions (e.g., nanofibers) 603, such as to a current collector 604. FIG. 7 illustrates specific capacity data of such an exemplary material (e.g., a nanostructured (nanofiber) composite comprising SiOx domains (e.g., silicon nanoparticles) embedded therein). FIG. 17 illustrates additional specific capacity data for an exemplary material provided herein comprising a nanostructured (nanofiber) composite (e.g., comprising SiOx domains, such as silicon nanoparticles, embedded in a carbon matrix) with a carbon inclusion, including graphene oxide (GO) and reduced graphene oxide (rGO).

Figure 11:
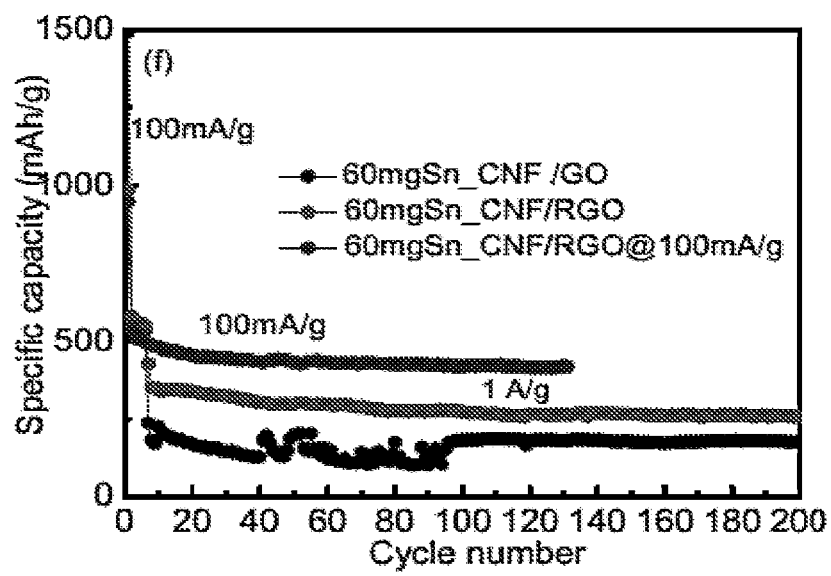
FIG. 11 illustrates exemplary specific capacity data for various exemplary electrodes provided herein comprising composite nanofibers (comprising a carbon matrix with tin embedded therein) secured on a current collector with a carbon web comprising a graphene component.

FIG. 11 illustrates specific capacity data of another exemplary material (e.g., a nanostructured composite comprising Sn embedded within a carbon matrix). As is illustrated, high capacities and good cycling characteristics are demonstrated.

Figure 18:
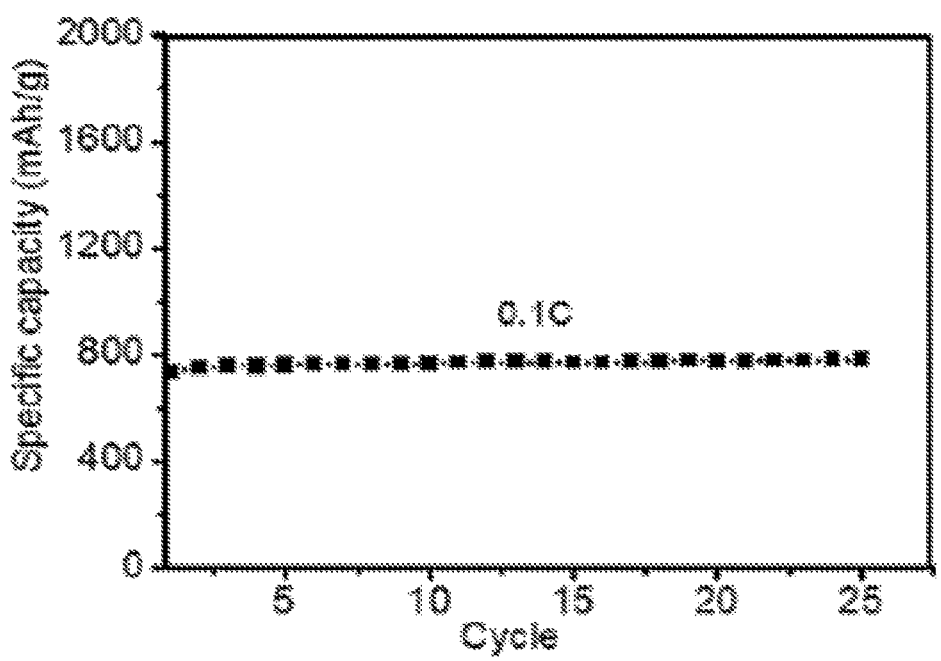
FIG. 18 illustrates exemplary specific capacity data for an exemplary electrode comprising nanostructures comprising SiOx secured on a current collector with a carbon web comprising a graphene component.

In other exemplary embodiments, nanostructures comprising electrode active material provided herein are manufactured by dispersing a silicon precursor in a fluid stock (e.g., with a polymer and liquid medium/solvent), electrospinning (e.g., gas-assisted electrospinning) the fluid stock, and carbonizing the product (e.g., nanofibers) thereof (e.g., which, in some instances, also serves to calcine the silicon precursor to an active silicon material, such as having the SiOx or $SiO_aN_bC_c$ formula described herein). FIG. 18 illustrates specific capacity data in a full cell of an exemplary material (e.g., a nanostructured composite comprising SiOx embedded within a carbon matrix), e.g., prepared or preparable according to such techniques. As is illustrated, high capacities are demonstrated, with very good cycling characteristics.

In still other exemplary embodiments, inclusions (e.g., nanostructures) comprising electrode active material provided herein comprise inclusions (e.g., nanostructures) comprising or of the electrode active material. In various instances, such materials are manufactured for the purpose of including in such an electrode or deposition, or are used from commercial sources.

In specific embodiments, an inclusion (e.g., micro- or nano-structure) comprising electrode active material provided herein is a particle (e.g., micro or nano-particle) comprising an active silicon material, such as SiOx (e.g., as described herein). In specific embodiments, the active silicon material is silicon (Si). In some embodiments, the inclusions (e.g., nanostructures) are silicon nanoparticles.

Figure 9:
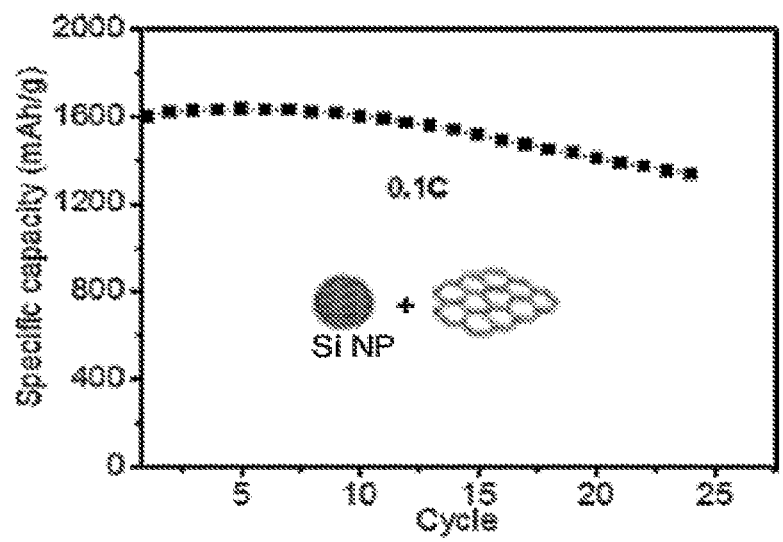
FIG. 9 illustrates exemplary specific capacity data for an exemplary electrode comprising silicon nanoparticles secured on a current collector with a carbon web comprising a graphene component.
Figure 15:
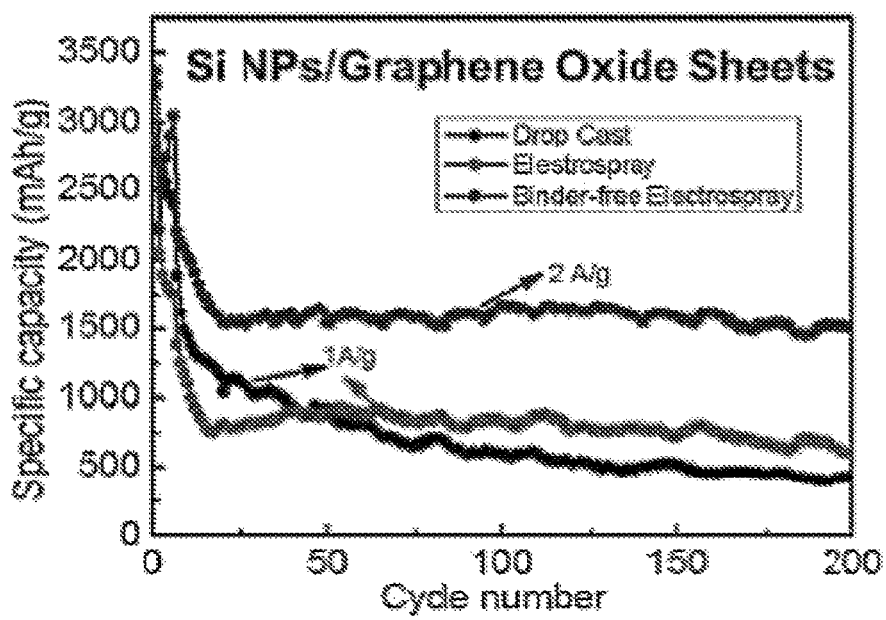
FIG. 15 illustrates exemplary specific capacity data for a lithium ion battery negative electrode comprising silicon nanoparticles secured on a current collector with a carbon web comprising a graphene component compared to other lithium ion battery negative electrodes comprising silicon nanoparticles and a graphene component.
Figure 16:
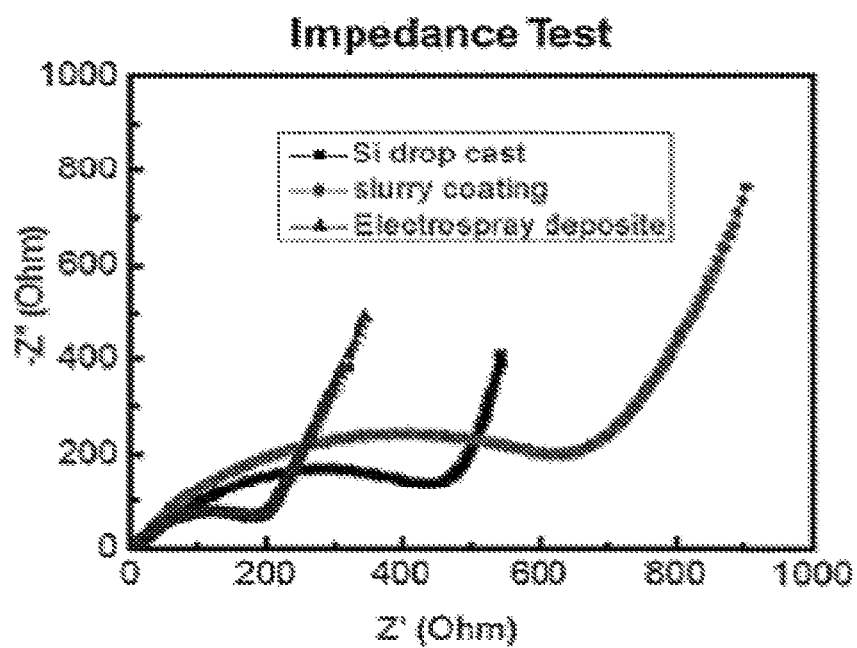
FIG. 16 illustrates exemplary impedance data for various electrodes.

FIG. 9 illustrates specific capacity data in a full cell using silicon nanoparticles (as nanostructures comprising electrode active material) and graphene oxide (as carbon inclusion material). As is illustrated, high capacities are demonstrated, with good cycling characteristics. FIG. 15 illustrates specific capacity data of exemplary materials and comparative materials (electrode prepared by drop casting) comprising nanostructures comprising electrode active material (e.g., silicon nanoparticles) and carbon inclusions (e.g., graphene oxide sheets). As illustrated, even at a higher charge rate, negative electrode materials prepared according to processes described herein have a much higher specific capacity than electrode materials prepared utilizing drop cast techniques, but otherwise comprising similar component parts. In addition, as illustrated, even at a higher charge rate, negative electrode materials prepared according to processes described herein have a much higher specific capacity than electrode materials prepared utilizing non-gas controlled electrospray techniques, but otherwise comprising similar component parts. Further, in some instances—as illustrated, the materials provided herein have greatly improved capacity retention over electrode materials prepared using drop cast and non-gas controlled electrospray techniques. FIG. 16 illustrates improved impedance values for anodes prepared according to the instant techniques (e.g., gas controlled electrospray) compared to other anodes prepared using similar components.

Figure 10:
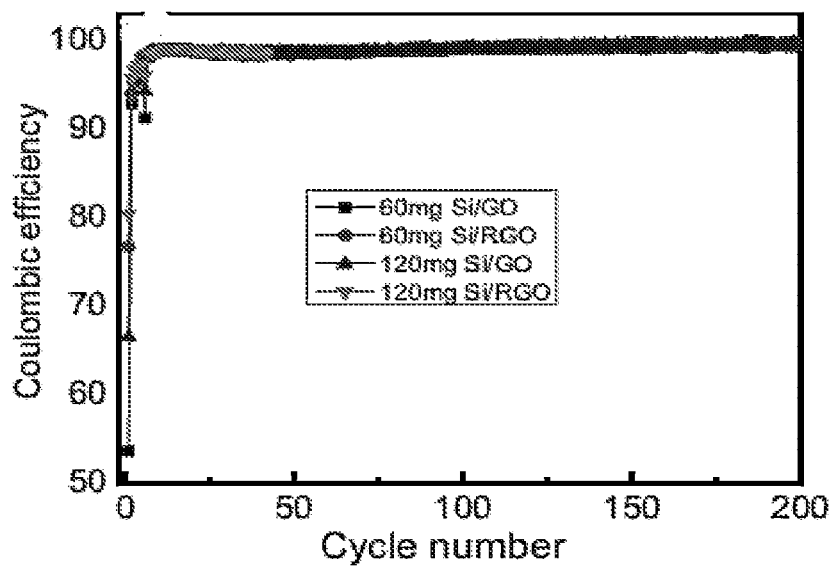
FIG. 10 illustrates exemplary Coulombic efficiency data for various exemplary electrodes comprising silicon nanoparticles secured on a current collector with a carbon web comprising a graphene component.
Figure 12:
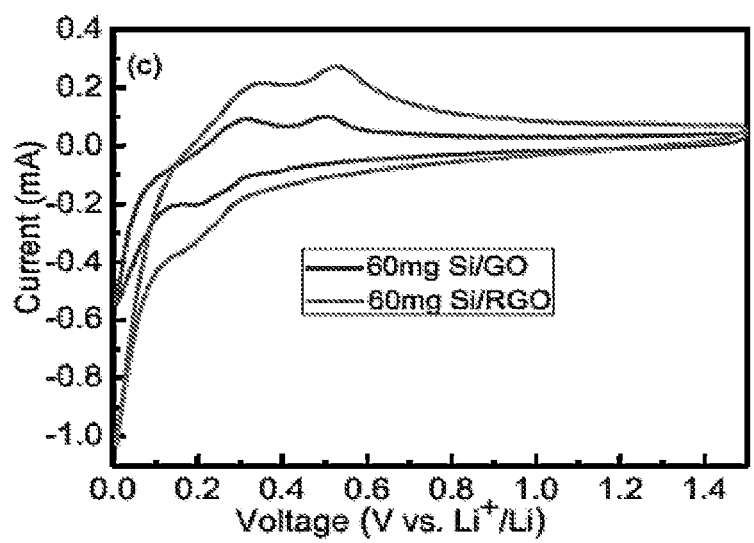
FIG. 12 illustrates exemplary cyclic voltammetry (CV) curves for various exemplary electrodes comprising silicon nanoparticles secured on a current collector with a carbon web comprising a graphene component.

FIG. 10 illustrates Coulombic efficiency values of exemplary lithium ion battery negative electrodes (anodes) provided herein, using silicon nanoparticles and various carbon inclusions (e.g., graphene oxide and reduced graphene oxide). As is illustrated, materials provided herein demonstrate good Coulombic efficiency. FIG. 12 illustrates cyclic voltammetry (CV) curves of direct deposited silicon nanoparticles and graphene oxide or reduced graphene oxide on an electrode. In certain instances, high Coulombic efficiency ($\eta_c$) values, particularly on first cycle Coulombic efficiencies, are important to commercial battery applications ($\eta_c = Q_{out}/Q_{in}$ wherein $Q_{out}$ is the amount of charge that exits the battery during the discharge cycle, and $Q_{in}$ is the amount of charge that enters the battery during the charging cycle). In some instances, poor first cycle Coulombic efficiencies of an anode results in a capacity loss and/or capacity mismatch between anode and cathode. For example, if an anode irreversibly loses more than 15% of its capacity during the first cycle, there can be a large capacity mismatch between the anode and cathode. In some instances, excess electrode material is optionally utilized to make up for a mismatch, but typical commercial battery applications require a first cycle Coulombic efficiency of about 85% or more for a lithium ion battery anode material. In certain embodiments, electrodes and/or electrode materials (e.g., films) provided herein have a first cycle Coulombic efficiency of about 80% or more, more preferably about 85% or more. In more preferred embodiments, the electrodes and/or electrode materials (e.g., films) provided herein have a first cycle Coulombic efficiency of about 88% or more, more preferably about 90% or more.

Figure 13:
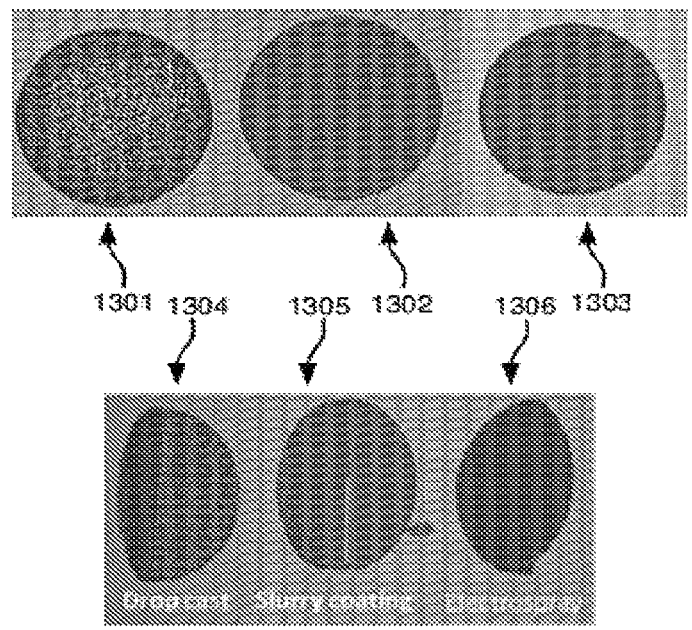
FIG. 13 shows images of substrates coated with an active material and a carbon inclusion, using various techniques, including exemplary techniques described herein.
Figure 14:
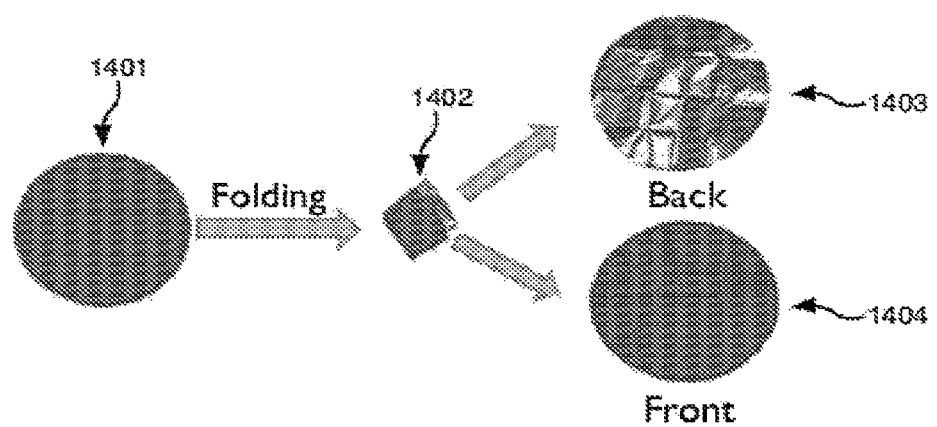
FIG. 14 shows images of substrates coated with an active material and a carbon inclusion using exemplary techniques described herein, and illustrative effects of folding such coated substrates.

In certain embodiments, provided herein is a thin layer electrode (e.g., comprising an electrode material provided herein) deposited on a current collector. In some embodiments, the electrode is well adhered to the current collector. In specific embodiments, the electrode is adheres to the current collector such that after at least two times (e.g., at least three times, at least five times, or the like) folding the electrode/current collector at an angle of at least 90 degrees (e.g., at least 135 degrees), there is less than 10% (e.g., less than 5%, less than 3%, less than 1%, or the like) exfoliation of the electrode (e.g., wherein the exfoliation is the % separation of the electrode from the current collector, e.g., by area). FIG. 13 shows images of various current collectors coated with a nanostructure electrode active material and a carbon inclusion, such as those described herein. Illustrated is an electrode deposited onto the current collector using drop cast techniques 1301, slurry coating/doctor blade techniques 1302, and electrospray techniques 1303 described herein, with each being folded 1304, 1305, 1306. As illustrated, in some instances, provided herein are electrodes having smooth and/or uniform surfaces, with good coverage compared, e.g., to drop casting, which has poor coverage and exfoliation upon folding, as illustrated in FIG. 14. FIG. 14 shows images of an electrode deposited onto the current collector using electrospray techniques 1401, and being repeatedly folded 1402, and unfolded, with both front 1403 and back 1404 images. As is illustrated, in some embodiments, despite heavy folding, the electrode retains its structure well, with minimal or no exfoliation.

In some embodiments, relatively small amounts of carbon inclusion are required to form a carbon web, securing the active material of the electrode material and/or electrode. In certain instances, such low carbon loading requirements, provide for very high capacities of the overall electrode, not just high capacities of the active material of the electrode. Further, with the inclusion of the carbon inclusion configured to secure the active material (e.g., to the current collector), the electrode comprises very high concentrations of active material and, e.g., does not require the use of additional binders (e.g., forming a binder-free electrode), fillers, or the like. In some instances, such high concentrations of active electrode material in the electrode and/or electrode material provided herein allows for the manufacture of electrodes having the desired capacities while using very little material. In some instances, processes provided herein are well designed to not only manufacture high capacity materials, but to also manufacture thin electrode materials having very good uniformity and very low defect characteristics (e.g., which defects may result in reduced capacity upon cycling).

In some embodiments, the carbon inclusion comprises about 20 wt % or less (e.g., about 10 wt % or less, about 5 wt % or less, or about 0.5 wt % to about 3 wt %) of the deposition, or about 20 wt % or less (e.g., about 10 wt % or less, about 5 wt % or less, or about 0.5 wt % to about 3 wt %) of the additives of the fluid stock (i.e., of the non-liquid medium components of the fluid stock).

In some embodiments, the weight ratio of inclusions (e.g., micro- and/or nano-structures) comprising active material to carbon inclusion (e.g., in a fluid stock, deposition, and/or material provided herein) is about 8:2 to about 999:1, e.g., about 85:15 to about 995:5, about 9:1 to about 99:1. In certain embodiments, the percentage of inclusions (e.g., micro- and/or nano-structures) comprising active material in the electrode or electrode material is about 25 wt % or more, e.g., about 50 wt % or more, about 75 wt % or more, about 80 wt % or more, about 85 wt % or more, about 90 wt % or more, about 95 wt % or more, or the like. Further, in some embodiments, the amount of active material in the electrode or electrode material is about 20 wt % or more, e.g., about 40 wt % or more, about 50 wt % or more, about 60 wt % or more, about 70 wt % or more, about 80 wt % or more, about 90 wt % or more, or the like.

Figure 26:
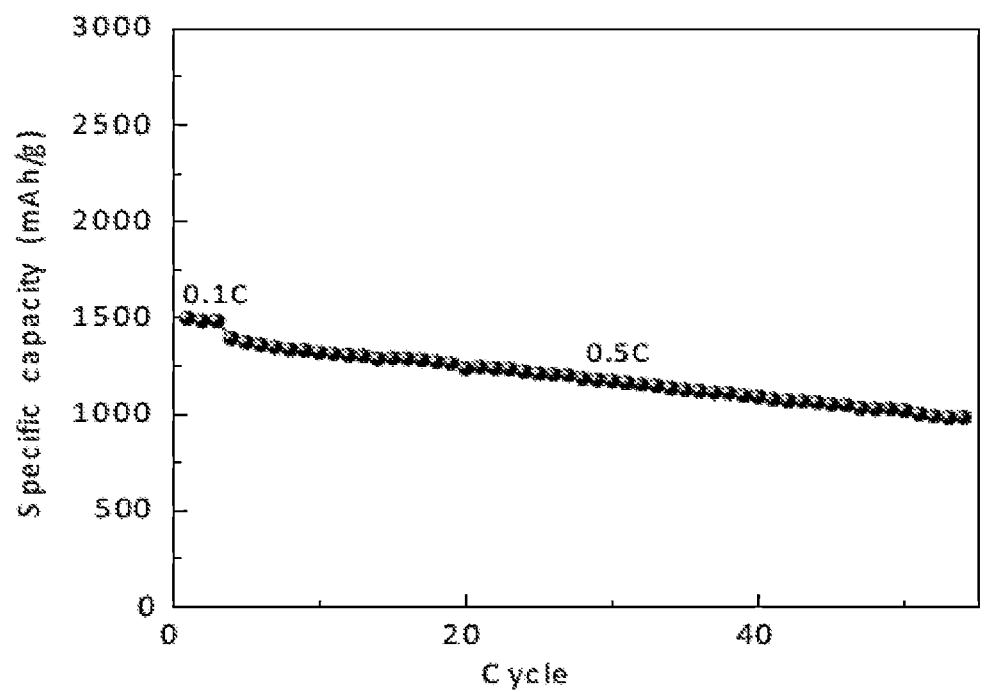
FIG. 26 illustrates capacity retention and cycling efficiencies of full cells prepared using highly loaded exemplary anode materials described herein.

In certain embodiments, the electrode is a thin layer electrode (e.g., deposited on a current collector). In specific embodiments, the electrode has a thickness of about 500 microns or less, e.g., about 250 microns or less, about 200 microns or less, about 25 microns to about 500 microns, about 50 microns to about 200 microns, or the like. In some embodiments, the electrode has a mass loading on a substrate of about 10 mg/cm$^2$ or less, such as about 0.1 mg/cm$^2$ to about 10 mg/cm$^2$, about 5 mg/cm$^2$ or less, about 4 mg/cm$^2$ or less, about 3 mg/cm$^2$ or less, about 1 mg/cm$^2$ to about 2 mg/cm$^2$. In certain embodiments, despite thin films being utilized, high areal density materials are utilized, such as about 0.1 mg/cm$^2$ or more, about 0.5 mg/cm$^2$ or more, or about mg/cm$^2$ or more (such as about 0.5 mg/cm$^2$ to about 5 mg/cm$^2$, e.g., about 1 mg/cm$^2$ to about 5 mg/cm$^2$). In certain embodiments, electrodes and/or materials provided herein have good capacity by area of electrode. For example, in some embodiments, electrodes and materials provided herein have an areal capacity of at least 1 mAh/cm$^2$, such as about 2 mAh/cm$^2$ or more, about 3 mAh/cm$^2$ or more, or about 2 mAh/cm$^2$ to about 5 mAh/cm$^2$. FIG. 26 illustrates capacities and capacity retention of exemplary full cells having an anode with a capacity of about 3 mAh/cm$^2$, up to about 2 times greater than exhibited in conventional lithium ion battery full cells.

In various embodiments, the current collector is any suitable material, such as a metal (e.g., aluminum, copper, or the like) (such as a metal foil) or a carbon substrate (e.g., carbon cloth, carbon paper, or the like). In certain embodiments, a carbon substrate provides improved flexibility to the combined electrode and current collector product.

In various embodiments, electrode materials and electrodes provided herein have high capacities (e.g., specific capacities in a lithium ion cell, such as a half cell or full cell). In specific embodiments, the electrode material and/or electrode has a specific capacity of about 500 mAh/g or more at a charge rate of about 1 A/g. In more specific embodiments, the electrode material and/or electrode has a specific capacity of about 600 mAh/g or more at a charge rate of about 1 A/g. In still more specific embodiments, the electrode material and/or electrode has a specific capacity of about 700 mAh/g or more at a charge rate of about 1 A/g. In yet more specific embodiments, the electrode material and/or electrode has a specific capacity of about 800 mAh/g or more at a charge rate of about 1 A/g. In more specific embodiments, the electrode material and/or electrode has a specific capacity of about 1000 mAh/g or more (e.g., about 1100 mAh/g or more, or about 1200 mAh/g or more) at a charge rate of about 1 A/g. In some embodiments, the electrode material and/or electrode has a specific capacity of about 500 mAh/g or more at a charge rate of about 2 A/g. In more specific embodiments, the electrode material and/or electrode has a specific capacity of about 600 mAh/g or more at a charge rate of about 2 A/g. In still more specific embodiments, the electrode material and/or electrode has a specific capacity of about 700 mAh/g or more at a charge rate of about 2 A/g. In yet more specific embodiments, the electrode material and/or electrode has a specific capacity of about 800 mAh/g or more at a charge rate of about 2 A/g. In more specific embodiments, the electrode material and/or electrode has a specific capacity of about 1000 mAh/g or more (e.g., about 1100 mAh/g or more, or about 1200 mAh/g or more) at a charge rate of about 2 A/g. In certain embodiments, such capacities are observed on the initial cycle (charge and/or discharge cycle), on or after the $2^{nd}$ cycle, on or after the $5^{th}$ cycle, on or after the $10^{th}$ cycle, on or after the $50^{th}$ cycle, on or after the $100^{th}$ cycle, on or after the $150^{th}$ cycle, on or after the $200^{th}$ cycle, on or after the $250^{th}$ cycle, or a combination thereof. In certain embodiments, the specific capacity of the electrode material and/or electrode on or after the $200^{th}$ and/or $250^{th}$ cycle (e.g., charge and/or discharge cycle) is about 80% or more (e.g., 85% or more) of the specific capacity of the electrode material and/or electrode on the $1^{st}$ cycle, the $5^{th}$ cycle, and/or the $10^{th}$ cycle.

In some embodiments, provided herein is a battery (e.g., a lithium battery, such as a lithium ion battery) comprising an electrode or electrode material described herein. In specific embodiments, a battery provided herein comprises a positive electrode and a negative electrode, at least one electrode thereof being an electrode described herein In some embodiments, provided herein is a battery comprising a negative electrode comprising a direct deposit electrode described herein, an electrode material described herein, and/or a carbon-silicon web and/or envelope described herein. In more specific embodiments, provided herein is a lithium ion battery comprising a negative electrode, a positive electrode, a separator, and an electrolyte, the negative electrode comprising an electrode described herein (e.g., a carbon web securing a plurality of nanostructured inclusions therein, the nanostructured inclusions comprising an active (electrode) material).

In some embodiments, provided herein are binder-free electrodes, such as made possible by the manufacturing processes described herein. Provided in some embodiments herein is a general method of manufacturing such electrodes using any suitable materials. In some instances, provided herein is a general approach to manufacturing very uniform electrodes, in a very efficient manner. In specific instances, processes described herein provide for the direct deposition of electrode on a conductive substrate (e.g., current collector) without the need for downstream processing, such as drop casting, slurry casting, undergoing long or high temperature drying steps, and/or the like.

In various embodiments herein, inclusions and materials are described as having specific characteristics. It is to be understood that such disclosures include disclosures of a plurality of such inclusions having an average equal to the specific characteristics identified, and vice-versa.

In various embodiments, "electrodes" referred to herein as comprising certain characteristics, functionality, and/or component parts includes a disclosure of electrode materials with the same characteristics, functionality, and/or component parts. In addition, reference to a solution herein, includes liquid compositions wherein inclusion parts are dissolved and/or dispersed therein.

EXAMPLES

Example 1

A fluid stock is prepared by combining silicon nanoparticles, graphene oxide, and water, at a weight ratio of Si NP (7.5%):GO (2.5%):water (90%). The fluid stock is then electrosprayed by injecting the fluid stock into a gas stream, such as using a gas-controlled electrospray nozzle described herein, in the direction of a substrate (e.g., a metal current collector) at a flowrate of 0.2 mL/min under 2 kV/cm. A deposition (electrode) with a mass loading of about 1 to 2 mg/cm$^2$ is collected on the substrate, without the need for adding a binder, or the need for further processing.

Other electrode/current collector systems are also prepared using silicon nanoparticles and graphene oxide, by blending with Super P (Timcal) and poly(acrylic acid) (PAA, MW=3,000,000) in a weight ratio of 80 (active material):10 (super P):10 PAA in N-methyl-2-pyrrolidinone (NMP) in order to make a slurry. In one example, the slurry is drop cast onto a current collector; in another example, the slurry is cast onto a current collector using a doctor blade.

FIG. 13 illustrates images of electrode/current collector compositions prepared according to processes such as those described above, as well as images of such compositions following folding. While the electrospray compositions are instantly, or nearly instantly, dry, the drop cast and doctor blade compositions require up to 6 hours or more to dry in an oven at 120° C. In addition, the electrospray compositions are observed to exhibit excellent uniformity and adhesive properties (i.e., good adhesion of the electrode to the current collector upon folding. The drop cast composition however, has very poor uniformity, with only partial coverage of the current collector in the middle, but exhibits decent adhesion of the electrode to the current collector upon folding. The slurry (doctor blade) composition exhibits good uniformity as illustrated in FIG. 13, but also exhibits very poor adhesion (i.e., it exfoliates or delaminates from the current collector upon folding).

In addition, such compositions use much higher amounts of non-active (or lower active) electrode materials during manufacturing and exhibit much lower specific capacities. 2032 Coin cell-typed Li-ion batteries are fabricated by using various negative electrode/current collector systems described herein. For fabricating the half cells, Li metal is used as a counter electrode and polyethylene (ca. 25 μm thickness) is inserted as a separator between working electrode and counter electrode. The coin cell-typed Li-ion batteries are assembled in Ar-filled glove box with electrolyte. A home-made 1M hexafluorophosphate ($LiPF_6$) solution with dimethyl carbonate and fluoroethylene carbonate (50:50 wt/wt %) was used as electrolyte. Half cells were galvanostatically charged and discharged in a voltage window of 0.01-1.5 V vs. Li/Li+, while full cells are operated at 2.5-4.2 V.

FIG. 15 illustrates specific capacities of electrode materials prepared using drop cast and electrospray techniques, such as described above. As is illustrated, the electrodes prepared using the electrospray techniques described herein demonstrate significantly higher specific capacity than electrodes prepared using drop cast techniques, even at a higher charge/discharge rate. Further, FIG. 16 illustrates the improved impedance characteristics of the electrospray manufactured electrode.

Example 2

Full cells are prepared using a mixed lithium cobalt oxide (LCO) cathode and the anode of Example 1. FIG. 9 illustrates full cell data therefor at a charge/discharge rate of 0.1 C. As is illustrated, initial specific capacity of the anode is about 1600 mAh/g, with good cycling retention.

Example 3

Electrodes are prepared according to the electrospray techniques described in Example 1. The electrodes are then thermally treated at a temperature of about 200° C. (e.g., to at least partially reduce and/or remove defects of the graphene oxide thereof, thereby converting the graphene oxide to what is referred to herein as reduced graphene oxide). FIG. 5 shows images of the electrosprayed electrode at various magnifications, as well as images of non-thermally treated electrode and thermally treated electrode. FIG. 10 illustrates Coulombic efficiency of various loadings for both thermally treated and non-thermally treated electrodes. As is illustrated, for both loadings, the thermally treated samples (referred to in the figure as "RGO") demonstrate improved Coulombic efficiency, especially at the first cycle, relative to the non-thermally treated analogs. FIG. 12 illustrates a CV curve for both thermally and non-thermally treated electrodes.

Example 4

Figure 34:
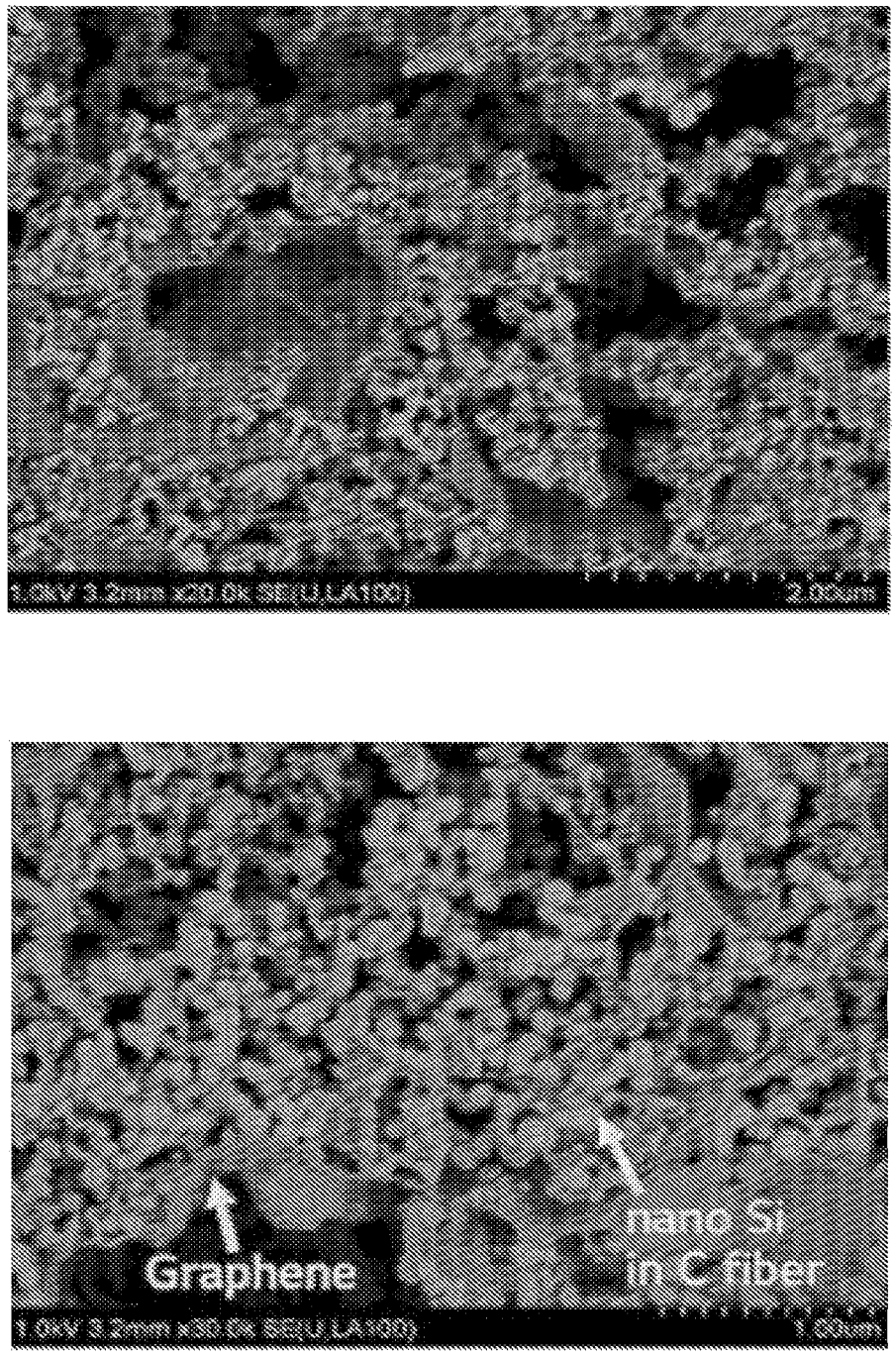
FIG. 34 illustrates exemplary cross-sectional (microtomed) SEM images (the bottom panel being more zoomed in than the top panel) of the graphenic web trapping the carbon and silicon fibers within the graphenic pockets thereof.

Using a processes similar as that described in Example 1, an electrode is prepared using a nanofiber and a composite comprising carbon and silicon (e.g., a carbon matrix with silicon nanoparticles embedded therein). Both thermally treated and non-thermally treated anodes are prepared, such as described in Example 3. Further, half-cells are prepared according to a processes similar to that described in Example 1. FIG. 34 illustrates exemplary cross-sectional (microtomed) SEM images of the graphenic web trapping the carbon and silicon fibers within the graphenic pockets thereof.

FIG. 17 illustrates specific capacity data for such electrodes. As illustrated, good specific capacities and good retention is obtained, with the thermally treated (denoted with "RGO") samples demonstrating even higher specific capacities.

In addition, a full cell is prepared using the electrode using a method such as described in Example 2. FIG. 7 illustrates the specific capacity of the electrode thereof, with good capacities and retention observed.

Example 5

Using a processes similar as that described in Example 1, an electrode is prepared using a nanofiber and a composite comprising carbon and a tin material (e.g., a carbon matrix with a tin embedded therein). Both thermally treated and non-thermally treated anodes are prepared, such as described in Example 3. Further, half-cells are prepared according to processes similar to that described in Example 1.

FIG. 11 illustrates specific capacity data for such electrodes. As is illustrated, good specific capacities and good retention is obtained, with the thermally treated (denoted with "RGO") samples demonstrating even higher specific capacities.

Example 6

Figure 22:
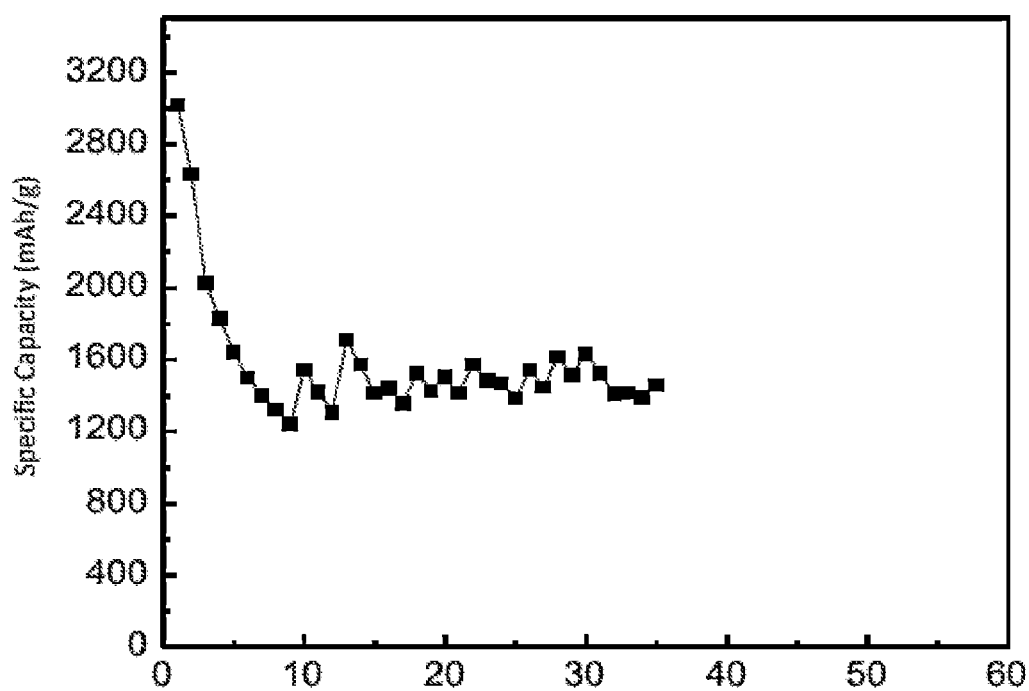
FIG. 22 illustrates specific capacities of an exemplary electrode provided herein.

Using a processes similar as that described in Example 1, an electrode is prepared using microstructured silicon and graphene oxide to form a deposition on a current collector. A half cell is prepared, using the prepared deposition as a first electrode and lithium metal as the counter electrode. As illustrated in FIG. 22, a specific capacity of about 1,400 mAh/g at 1 A/g is achieved. Capacity retention is good, with a first cycle Coulombic efficiency of about 89%.

Example 7

Various electrodes and electrode materials were prepared using active materials (silicon or silicon oxide (SiOx)). 3.0 g of GO aqueous suspension was diluted in 5.0 g of DI water. After sonicating the suspension for 1 hr, 60 mg or 120 mg active materials (1:1 or 2:1 weight ratio with graphene oxide) were added. Silicon nanoparticle (70-100 nm), SiOx micro size particles (3-10 μm), silicon micro particles (1-3 micron, polycrystalline, 99.99% purity) were utilized as active material in separate examples. The mixture of active material and graphene oxide was then sonicated for another hour and stirred overnight before spraying. Air-controlled electrospray was applied for manufacture of electrode materials, including directly depositing binder-free electrodes. The electrospray was carried out under ambient condition using a Harvard Apparatus PHD 2000 Infusion syringe pump with a coaxial needle set. Solution was supplied through the inner 17G needle and gas through outer 12G needle. The working voltage was set at 20 kV, working distance at 20 cm, solution feeding rate between 0.05 mL min$^{-1}$-0.1 mL min$^{-1}$, and gas pressure at 28 psi. To obtain active materials/RGO electrodes, the as sprayed active materials/GO were annealed at 400° C. in $N_2$ atmosphere (tube furnace) for 1 hr to reduce GO, ramp 5° C./min. Direct deposit electrodes were deposited on copper foil.

The structure and morphology of the samples were characterized by scanning electron microscopy (SEM, LEO 1550) and transmission electron microscopy (TEM, FEI T12 Spirit). The active material and carbon ratio was decided by thermogravimetric analysis (TA instruments Q500). Electrochemical measurement was conducted using CR-2032 coin cell. The electrodes prepared above were directly used without any further treatment. 1 M LiPF6 in a mixture of ethylene carbonate, diethyl carbonate and dimethyl carbonate (2:1:2 by vol %) with an additive of 10 wt % fluoroethylene carbonate was used as electrodes for silicon related materials. In half cell, a lithium foil was used as counter electrode. $LiCoO_2$ electrode (MTI.) was used as cathode in full cells. Cell assembly was carried out in an argon-filled glove-box. The galvanostatic charge/discharge measurements were performed using a Land battery testing system in the voltage cutoff window of 0.01-1.5V for half cells, and 2.5-4.2V for full cells. The current density and specific capacity are based on the total mass of electrode materials. Cyclic voltammetry was measured using a PARSTAT 4000 (Princeton Applied Research) electrochemical work station. In some instances, the cells are stabilized with a 3-10 pre-cycles (i.e., cycles prior to initial cycles; 1$^{st}$ cycle coulombic efficiencies refer, however, to the absolute first cycle, whether it is a pre-cycle or otherwise). Unless otherwise noted, cycling rates are typically 1 C.

Example 8

Using a process similar to that set forth in Example 7, direct deposit anode was prepared using nanofibers having a carbon matrix backbone with silicon nanoparticles embedded therein. The direct deposit anode has a loading of 1.93 mg/cm$^2$, a capacity loading of 4.52 mAh/cm$^2$, a gravimetric capacity of 2,338 mAh/g, a 1$^{st}$ cycle Coulombic efficiency of 80%, an electrode density of 0.46 g/cc, and a volumetric energy density of 1061 mAh/cc. Prepared half cells provided the capacity retention set forth in FIG. 23 and the cycling efficiencies set forth in FIG. 24. As illustrated in the figures, despite having a gravimetric capacity of well over 2,000 mAh/g, the materials exhibit very good capacity retention while exhibiting a good 1$^{st}$ cycle Coulombic efficiency.

Example 9

Using a process as described in Example 7, direct deposited anodes are prepared using silicon oxide (SiOx) microparticles. Half cells are prepared and as illustrated in FIG. 25, exhibit an initial capacity of about 1,200 mAh/g after 3 pre-cycles and have good capacity retention (about 1,000 mAh/g) after 100 cycles.

Example 10

Using a process as described in Example 7, direct deposited anodes are prepared using silicon (Si) microparticles in an initial Si MP:GO weight ratio of 2:1, and having a final SiMP:rGO weight ratio of about 4:1. Half cells are prepared and exhibit an initial capacity of about 1,600 mAh/g (after a few pre-cycles) and have good capacity retention (>85%) after 100 cycles (at 1A/g). In addition, an extremely high 1$^{st}$ cycle Coulombic efficiency is achieved (>88%), which is much higher than the 1$^{st}$ cycle Coulombic efficiency achieved for otherwise similar systems using silicon nanoparticles (about 80% for Si NPs, >85% is typically required for industrially applications).

Full cells were also prepared using the direct deposit anode, using very high loading of anode material (3.16 mg) and 40 mg lithium cobalt oxide (about 20 mg/cm$^2$). Capacity of anode to cathode in the prepared cell is 100:95. As illustrated in FIG. 26, resulting cells exhibit an initial capacity of about 1300 mAh/g with at least 1,000 mAh/g after 65 cycles at 0.5 C. In addition, such cells exhibited a capacity of about 3 mAh/cm$^2$, up to about 2 times greater than exhibited in conventional lithium ion battery full cells.

Example 11

Using a process as described in Example 10, direct deposited anodes are prepared using silicon (Si) microparticles in an initial Si MP:GO weight ratio of 8:1, and having a final SiMP:rGO weight ratio of about 16:1. Half cells are prepared and exhibit an initial capacity of about 1,600 mAh/g. In addition, an extremely high 1$^{st}$ cycle Coulombic efficiency is achieved (91%).

Example 12

Using a process described in Example 7, electrode materials are prepared using silicon oxide (SiOx) microparticles and graphene oxide in a weight ratio of about 1:1. Instead of preparing direct deposit anode, however, the anode materials are removed from the substrate and an anode is prepared using a paste process (with about 5 wt % binder, such as polyvinylidene fluoride (PVDF)). Half cells are prepared similarly as described in Example 7, resulting in a battery having an anode with a capacity of about 800 mAh/g after 200 cycles at 1 A/g and a very high capacity retention.

Electrode materials are similarly prepared using silicon oxide (SiOx) microparticles and graphene oxide in a weight ratio of about 2:1 and 4:1. Following thermal treatment, such anode materials have a silicon oxide (SiOx) microparticles and graphene oxide in a weight ratio of about 4:1 and 8:1, respectively. Initial capacities (after pre-cycling) of about 1250 mAh/g are observed for both materials, with good cycling retention.

Example 13

Figure 27:
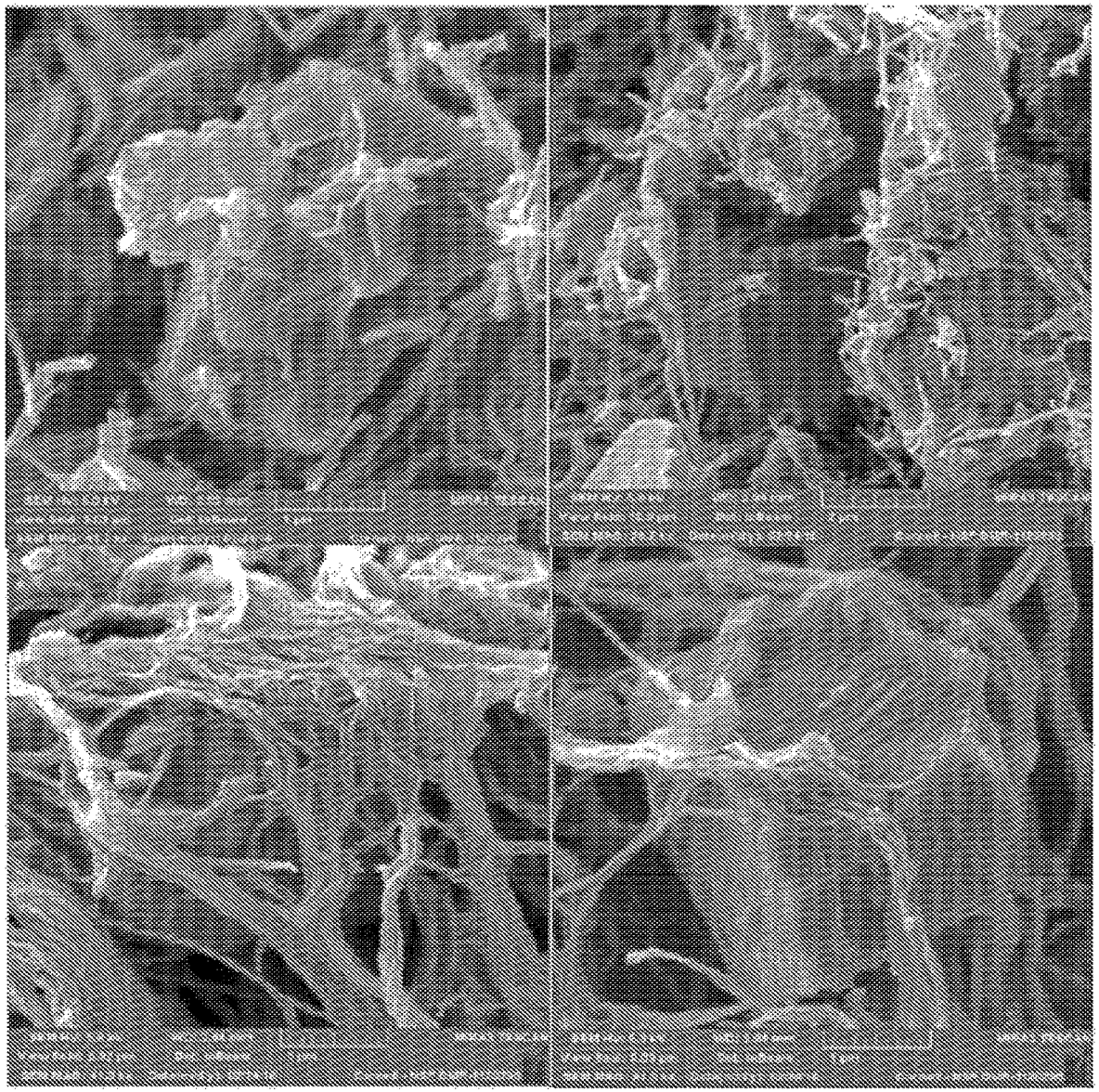
FIG. 27 illustrates various SEM images of silicon oxide microparticles coated with carbon nanofibers.

Similar anode materials, anodes and batteries as described in Example 12 are also prepared using carbon nanofibers instead of graphene oxide. FIG. 27 illustrates silicon oxide microparticles coated with carbon nanofibers accordingly. Resultant half cells using anode prepared by processing a binder with powder comprising SiOx MP coated with carbon NF demonstrated an anode having a capacity of about 500 mAh/g after 200 cycles for MP:NF weight ratios of 1:1, and about 400 mAh/g after 200 cycles for MP:NF weight ratios of about 4:1.

Example 14

Using a process as described in Example 7, film materials are prepared using silicon (Si) microparticles and graphene oxides having a lateral size of about 5 to about 25 micron, and a lateral size of about 0.5 to about 5 micron. FIG. 28 illustrates good coverage of the silicon microparticles using the larger graphene component (at varying zoom levels), whereas FIG. 29 illustrates poor coverage of the silicon microparticles using the smaller graphene components (at varying zoom levels). As illustrated in FIG. 29, several silicon microparticle components remain unprotected by graphene component when smaller graphene components are utilized.

While both films demonstrate good initial capacities, the anode material with good silicon coverage (using the larger graphene component) has good capacity retention (e.g., almost no capacity fade over 75 cycles), whereas the anode material with less optimal silicon coverage (using the smaller graphene component) has demonstrable capacity fade (e.g., about 50% capacity fade over 75 cycles).

Example 15

Using a process similar to that described in Example 7, film materials are attempted to be prepared using silicon (Si) microparticles and graphene oxides (including input Si:GO weight ratios of about 2:1 and about 1:1), in the absence of a gas being applied to the outer needle of the nozzle. The resulting depositions are characterized by non-continuous co-aggregations of silicon and graphene component, with poor deposition uniformity, poor silicon coverage and poor graphenic pocket formation. Used as an electrode, the deposition produces little or no capacity, with little or no cycling capability.

Figure 32:
FIG. 32 illustrates images of a deposition formed (panel A) after 30 seconds of gas controlled electrospraying of a graphene oxide stock, and (panel B) after 30 seconds of electrospraying of the graphene stock without air.
Figure 32:
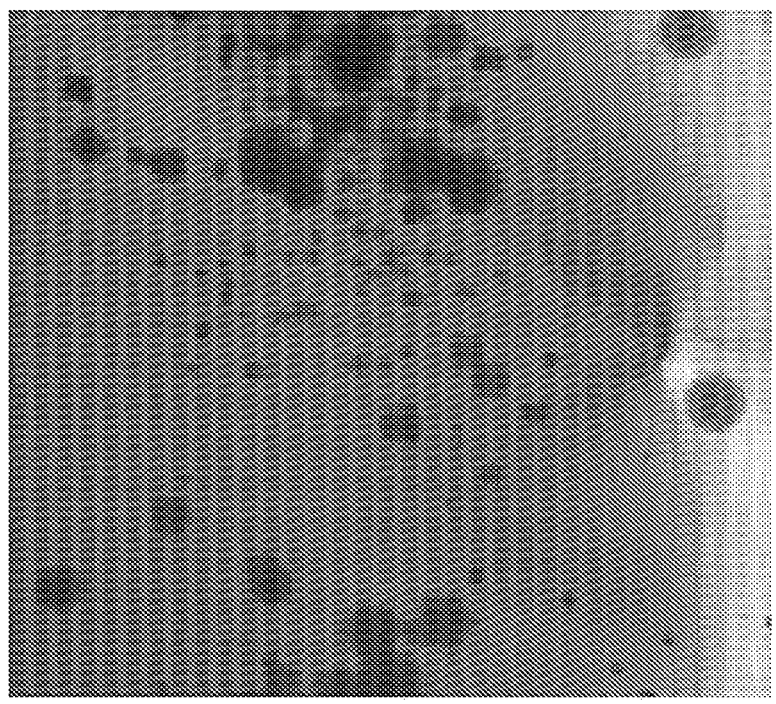
Figure 33:
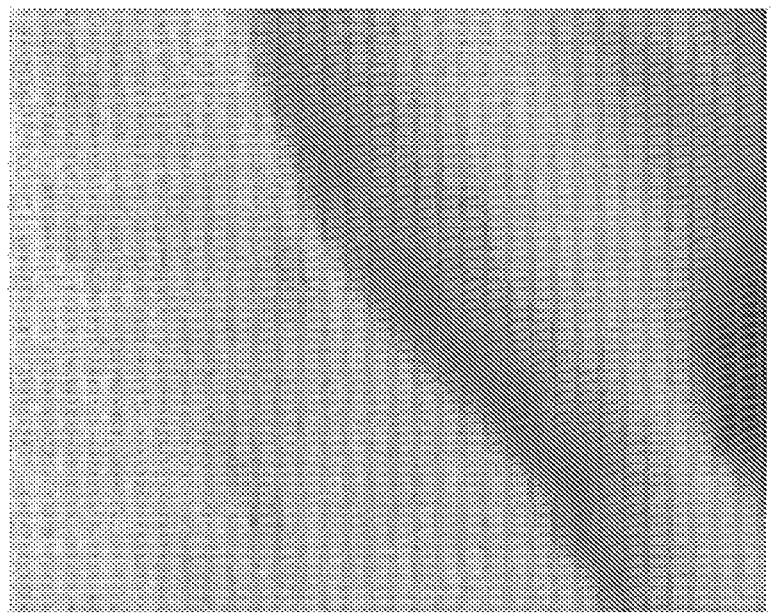
FIG. 33 illustrates images of a deposition formed (panel A) after 1 minute of gas controlled electrospraying of a graphene oxide stock, and (panel B) after 1 minute of electrospraying of the graphene stock without air.
Figure 33:
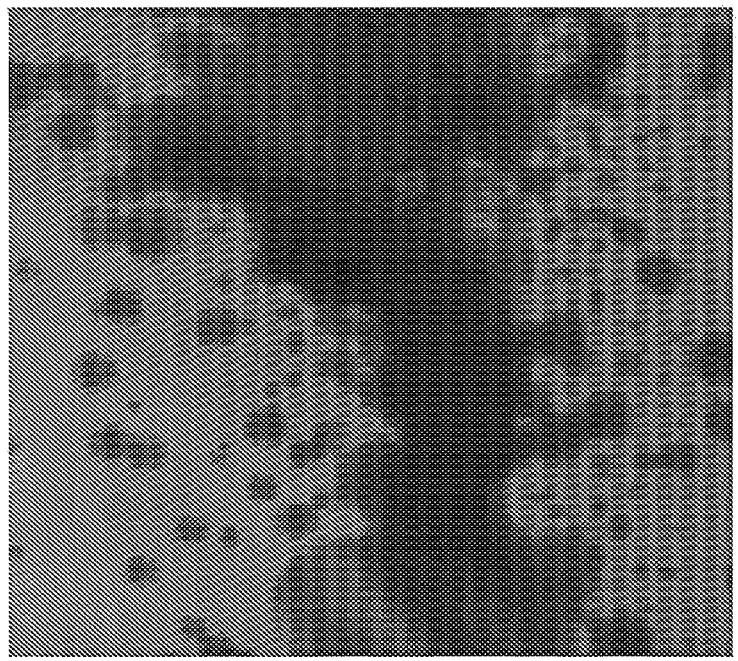

For comparison, a system using graphene oxide (0.75 wt %) in water is electrosprayed with and without a high velocity gas stream. Similar conditions are utilized, with a working voltage of 25 kV, a distance from the nozzle to the collector of 20 cm, and a flow rate of 0.07 mL/min. As illustrated in FIG. 32 (panel A) after 30 seconds of gas controlled electrospraying of the stock, the beginning of the formation of a fine film of graphene oxide is observed. By contrast as illustrated in FIG. 32 (panel B) after only 30 seconds of electrospraying of the stock without air, large droplets and collections of graphene oxide are observed on the substrate. As illustrated in FIG. 33 (panel B), after just 1 minute, the droplets coalesce and begin to run, while, as illustrated in FIG. 33 (panel A), good film formation is continued to be observed when spraying the stock with a high velocity gas.

What is claimed is:

1. A process for manufacturing an electrode or electrode material, the process comprising:
    a. producing a plume or aerosol comprising a plurality of droplets from a fluid stock by:
    providing the fluid stock to an inlet of a conduit of an electrospray nozzle wherein the fluid stock comprising a plurality of inclusions and a liquid medium, the inclusions comprising a graphenic material and a plurality of particles wherein the plurality of graphenic material having an average length and/or width that is at least 2 times greater than an average of a smallest diameter, length and/or width of the particles; and
    b. collecting a film comprising a first composition wherein the first composition comprising one or more particles wrapped and secured within one or more graphenic web of the plurality of graphenic material.

2. The process of claim 1, wherein the graphenic material is selected from graphene, graphene oxide, reduced graphene oxide, or graphene analog.

3. The process of claim 1, wherein the particles comprise microparticles and/or nanoparticles.

4. The process of claim 1, wherein the particles comprise active electrode material.

5. The process of claim 4, wherein the active electrode material comprises a high energy capacity material.

6. The process of claim 5, wherein the high energy capacity material has a capacity of greater than 400 mAh/g.

7. The process of claim 4, wherein the active electrode material comprises a material having a volume expansion upon lithiation.

8. The process of claim 7, wherein the active electrode material comprises a material having a volume expansion upon lithiation of greater than 150%.

9. The process of claim 4, wherein the active electrode material comprises Si, Ge, Sn, Co, Al, Cu, Fe, any oxidation state thereof, any carbide thereof, any alloy thereof, or any combination thereof.

10. The process of claim 1, further comprising thermally treating the collected first composition to form a second composition.

11. The process of claim 10, wherein the first composition is treated to a temperature of at least 100° C.

12. The process of claim 10, wherein the first composition is treated to a temperature in a range of about 100° C. to about 400° C.

13. The process of claim 1, wherein the one or more graphenic web in the first composition shrink around one or more of the plurality of particles to form a second composition such that the one or more graphenic web form one or more graphene pockets or envelopes to enclose the one or more particles within the one or more graphene pockets or envelopes.

14. The process of claim 1, wherein the average size of the graphenic material is about 2 to about 20 times greater than the average size of the smallest dimension of the particles.

15. The process of claim 1, wherein the graphenic material has one or more carbon atoms substituted with one or more additional atoms.

16. The process of claim 1, wherein the one or more additional atoms are selected from oxygen, halide, hydrogen, or any combination thereof.

17. The process of claim 1, wherein the particles comprise nanofibers and/or carbon matrix.

18. The process of claim 1, wherein the plume or aerosol is deposited on a conductive substrate.

19. The process of claim 1, wherein the film comprises a continuous graphenic web defining a plurality of graphenic pockets and wherein each graphenic pocket comprises one or more particles enclosed or wrapped therein.

* * * * *